United States Patent
Li et al.

(10) Patent No.: US 9,848,372 B2
(45) Date of Patent: Dec. 19, 2017

(54) CODING METHODS OF COMMUNICATING IDENTIFIERS IN PEER DISCOVERY IN A PEER-TO-PEER NETWORK

(71) Applicant: QUALCOMM Incorporated, San Diego, CA (US)

(72) Inventors: Junyi Li, Chester, NJ (US); Rajiv Laroia, Far Hills, NJ (US); Saurabha R. Tavildar, Jersey City, NJ (US); Thomas J. Richardson, South Orange, NJ (US); Xinzhou Wu, Monmouth Junction, NJ (US); Leonard Henry Grokop, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 13/953,512

(22) Filed: Jul. 29, 2013

(65) Prior Publication Data
US 2013/0315100 A1 Nov. 28, 2013

Related U.S. Application Data

(62) Division of application No. 11/775,799, filed on Jul. 10, 2007, now Pat. No. 8,520,704.

(51) Int. Cl.
*H04W 48/16* (2009.01)
*H04W 8/00* (2009.01)

(52) U.S. Cl.
CPC .......... *H04W 48/16* (2013.01); *H04W 8/005* (2013.01)

(58) Field of Classification Search
None
See application file for complete search history.

(56) References Cited

U.S. PATENT DOCUMENTS 4,639,550 A 1/1987 Yamagawa et al.
5,414,721 A * 5/1995 Fukui .................. G06F 7/02
714/799

(Continued)

FOREIGN PATENT DOCUMENTS

EP 1202515 A2 5/2002
EP 1411679 A1 4/2004

(Continued)

OTHER PUBLICATIONS

Doi Y., "Peer group rendezvous using intersection among peer groups on DHT", 2004 International Symposium on Applications and the Internet Workshops, 2004. SAINT 2004 Workshops., United States, IEEE, Jan. 26, 2004, pp. 552-559.

(Continued)

*Primary Examiner* — Huy D Vu
*Assistant Examiner* — Hong Shao
(74) *Attorney, Agent, or Firm* — James K. O'Hare

(57) ABSTRACT

Systems and methodologies are described that facilitate identifying peers based upon encoded signals during peer discovery in a peer to peer network. For example, direct signaling that partitions a time-frequency resource into a number of segments can be utilized to communicate an identifier within a peer discovery interval; thus, a particular segment selected for transmission can signal a portion of the identifier, while a remainder can be signaled based upon tones communicated within the selected segment. Moreover, a subset of symbols within the resource can be reserved (e.g., unused) to enable identifying and/or correcting timing offset. Further, signaling can be effectuated over a plurality of peer discovery intervals such that partial identifiers communicated during each of the peer discovery intervals can be linked (e.g., based upon overlapping bits and/or bloom filter information).

28 Claims, 34 Drawing Sheets

(56) References Cited

U.S. PATENT DOCUMENTS

| | | | |
|---|---|---|---|
| 6,192,026 | B1 | 2/2001 | Pollack et al. |
| 6,289,016 | B1 | 9/2001 | Subbiah et al. |
| 6,657,535 | B1 | 12/2003 | Magbie et al. |
| 6,771,706 | B2 | 8/2004 | Ling et al. |
| 6,839,007 | B2 | 1/2005 | Zhao et al. |
| 7,272,191 | B2 | 9/2007 | Taffin et al. |
| 7,437,409 | B2 | 10/2008 | Danieli |
| 7,542,485 | B2 | 6/2009 | Bingham et al. |
| 7,630,383 | B2 | 12/2009 | Noel et al. |
| 7,664,087 | B2 | 2/2010 | Cho et al. |
| 7,675,403 | B2 | 3/2010 | Quan et al. |
| 7,715,464 | B2 | 5/2010 | Jonsson et al. |
| 7,743,013 | B2 * | 6/2010 | Mityagin .......... G06F 17/30011 |
| 7,961,708 | B2 | 6/2011 | Li et al. |
| 8,068,841 | B2 | 11/2011 | Laroia et al. |
| 8,666,383 | B1 | 3/2014 | Mauer et al. |
| 2002/0167962 | A1 | 11/2002 | Kowalski |
| 2004/0093521 | A1 * | 5/2004 | Hamadeh ................ H04L 29/06 726/22 |
| 2004/0095904 | A1 | 5/2004 | Laroia et al. |
| 2004/0255032 | A1 | 12/2004 | Danieli |
| 2005/0108368 | A1 | 5/2005 | Mohan et al. |
| 2005/0135429 | A1 | 6/2005 | Bingham et al. |
| 2005/0169219 | A1 * | 8/2005 | Serpa ................ H04L 29/12254 370/338 |
| 2005/0176371 | A1 | 8/2005 | Palin et al. |
| 2005/0223102 | A1 * | 10/2005 | Zhang .................... H04L 45/00 709/228 |
| 2006/0083319 | A1 | 4/2006 | Giannakis et al. |
| 2006/0146887 | A1 | 7/2006 | Muguruma et al. |
| 2006/0166688 | A1 | 7/2006 | Sun et al. |
| 2006/0168343 | A1 | 7/2006 | Ma et al. |
| 2006/0171332 | A1 | 8/2006 | Barnum |
| 2006/0215590 | A1 | 9/2006 | Sharma et al. |
| 2006/0222016 | A1 | 10/2006 | Noel et al. |
| 2007/0017754 | A1 | 1/2007 | Kakinuma et al. |
| 2007/0096877 | A1 | 5/2007 | Quan et al. |
| 2007/0129076 | A1 | 6/2007 | Cho et al. |
| 2007/0140106 | A1 | 6/2007 | Tsai et al. |
| 2007/0141988 | A1 | 6/2007 | Kuehnel et al. |
| 2007/0177554 | A1 | 8/2007 | Yang et al. |
| 2007/0183306 | A1 | 8/2007 | Akita et al. |
| 2007/0286136 | A1 * | 12/2007 | Rittle .................... H04W 8/005 370/338 |
| 2008/0037487 | A1 | 2/2008 | Li et al. |
| 2008/0056269 | A1 * | 3/2008 | Madhani .......... H04L 29/12122 370/395.2 |
| 2008/0086653 | A1 | 4/2008 | Wang |
| 2009/0016249 | A1 | 1/2009 | Li et al. |
| 2009/0016250 | A1 | 1/2009 | Li et al. |
| 2009/0016353 | A1 | 1/2009 | Li et al. |
| 2014/0098807 | A1 | 4/2014 | Li et al. |

FOREIGN PATENT DOCUMENTS

| | | |
|---|---|---|
| GB | 2420051 | 5/2006 |
| JP | 11220459 A | 8/1999 |
| JP | 2001028583 A | 1/2001 |
| JP | 2002198936 A | 7/2002 |
| JP | 2006005753 A | 1/2006 |
| JP | 2008219482 A | 9/2008 |
| TW | I230525 | 4/2005 |
| TW | I257788 | 7/2006 |
| TW | I258963 | 7/2006 |
| WO | 2005009019 A2 | 1/2005 |
| WO | 2005107207 | 11/2005 |
| WO | 2005109917 A1 | 11/2005 |
| WO | 2007026745 A1 | 3/2007 |
| WO | 2007082242 | 7/2007 |

OTHER PUBLICATIONS

European Search Report—EP08006406—Search Authority—Berlin—dated Nov. 4, 2008.

European Search Report—EP08006419—Search Authority—The Hague—dated Feb. 23, 2009.

European Search Report—EP08006438—Search Authority—Munich—dated Oct. 10, 2008.

International Search Report—PCT/US08/068945—International Search Authority, European Patent Office—dated Oct. 17, 2008.

International Search Report and Written Opinion—PCT/US2008/068944, International Search Authority—European Patent Office—dated Mar. 2, 2009.

International Search Report and Written Opinion—PCT/US2008/068989, International Search Authority—European Patent Office—dated Mar. 12, 2008.

International Search Report, PCT/US08/068992, International Search Authority, European Patent Office, dated Oct. 27, 2008.

Joshua Schachter Maciej Ceglowski, LOAF, Internet Homepage, U.S.A., May 7, 1998, URL, http://pages.cs.wisc.edu/~cao/papers/summary-cache/node8.html.

Park B, et al., "A Novel Timing Estimation Method for OFDM Systems," IEEE Communications Letters, vol. 7, No. 5, pp. 239-241, May 2003.

Pham H., et al.,"An Adaptive Mobility-Aware MAC Protocol for Sensor Networks (MS-MAC)", IEEE International Conference on Mobile Ad-hoc and Sensor Systems, pp. 558-560, year 2004.

Taiwan Search Report—TW097126083—TIPO—dated Jul. 13, 2012.

Taiwan Search Report—TW097126129—TIPO—dated Jan. 11, 2012.

Taiwan Search Report—TW097126142—TIPO—dated Feb. 5, 2012.

Taiwan Search Report—TW097126155—TIPO—dated Jan. 24, 2013.

Takahashi Y., et al., "An Improvement of Bloom-Filter-Based Index Dissemination in P2P Networks," Technical Report of the Institute of Electronics, Information and Communication Engineers, NS, Network System, Japan, The Institute of Electronics, Information and Communication Engineers, May 11, 2006, 106(41), pp. 1-4.

Written Opinion—PCT/US2008/068945—International Search Authority, European Patent Office—dated Oct. 17, 2008.

Written Opinion, PCT/US08/068992, International Search Authority, European Patent Office, dated Oct. 27, 2008.

Yin Z., et al., "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005 (Oct. 3, 2005), pp. 902-911, XP010890303.

* cited by examiner

CODING METHODS OF COMMUNICATING IDENTIFIERS IN PEER DISCOVERY IN A PEER-TO-PEER NETWORK

CROSS-REFERENCE TO RELATED APPLICATIONS

This application is a division of U.S. application Ser. No. 11/775,799 now U.S. Pat. No. 8,520,704 filed on Jul. 10, 2007 entitled "CODING METHODS OF COMMUNICATING IDENTIFIERS IN PEER DISCOVERY IN A PEER-TO-PEER NETWORK" which is hereby incorporated in its entirety by reference.

BACKGROUND

I. Field

The following description relates generally to wireless communications, and more particularly to identifying peers based upon encoded signals during peer discovery in a peer-to-peer network.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus, a significant subset of spectrum may be unused in a given geographic location or in a given time interval.

According to another example, wireless communication systems oftentimes employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range, power may be inefficiently utilized, and so forth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating identification of peers based upon encoded signals during peer discovery in a peer to peer network. For example, direct signaling that partitions a time-frequency resource into a number of segments can be utilized to communicate an identifier within a peer discovery interval; thus, a particular segment selected for transmission can signal a portion of the identifier, while a remainder can be signaled based upon tones communicated within the selected segment. Moreover, a subset of symbols within the resource can be reserved (e.g., unused) to enable identifying and/or correcting timing offset. Further, signaling can be effectuated over a plurality of peer discovery intervals such that partial identifiers communicated during each of the peer discovery intervals can be linked (e.g., based upon overlapping bits and/or bloom filter information).

According to related aspects, a method that facilitates signaling an identifier over a plurality of peer discovery intervals is described herein. The method can include transmitting a first partial identifier during a first peer discovery interval. Further, the method can include transmitting a second partial identifier during a second peer discovery interval where X bits overlap within the first partial identifier and the second partial identifier, X is an integer.

Another aspect relates to a wireless communications apparatus. The wireless communications apparatus can include a memory that that retains instructions related to transmitting a first partial identifier during a first peer discovery interval and transmitting a second partial identifier during a second peer discovery interval where X bits overlap within the first partial identifier and the second partial identifier, X is an integer. Further, the wireless communications apparatus can include a processor, coupled to the memory, configured to execute the instructions retained in the memory.

Yet another aspect relates to a wireless communications apparatus that enables signaling an identifier over a plurality of peer discovery intervals. The wireless communications apparatus can include means for transmitting a first partial identifier during a first peer discovery interval; and means for transmitting a second partial identifier during a second peer discovery interval where X bits overlap within the first partial identifier and the second partial identifier, X is an integer.

Still another aspect relates to a machine-readable medium having stored thereon machine-executable instructions for transmitting a first partial identifier during a first peer discovery interval, and transmitting a second partial identifier during a second peer discovery interval where X bits overlap within the first partial identifier and the second partial identifier, X is an integer.

In accordance with another aspect, an apparatus in a wireless communication system can include a processor, wherein the processor can be configured to transmit a first partial identifier during a first peer discovery interval. Further, the processor can be configured to transmit a second partial identifier during a second peer discovery interval where X bits overlap within the first partial identifier and the second partial identifier, X is an integer.

According to other aspects, a method that facilitates linking partial identifiers obtained during differing peer discovery intervals based upon overlapping information is described herein. The method can include receiving a first set of partial identifiers during a first peer discovery interval. Further, the method can comprise receiving a second set of partial identifiers during a second peer discovery interval. Moreover, the method can include matching partial identifiers from the first set and the second set based upon bit overlap.

Yet another aspect relates to a wireless communications apparatus that can include a memory that retains instructions related to receiving a first set of partial identifiers during a first peer discovery interval, receiving a second set of partial identifiers during a second peer discovery interval, and matching partial identifiers from the first set and the second set based upon bit overlap. The wireless communications apparatus can further include a processor, coupled to the memory, configured to execute the instructions retained in the memory.

Another aspect relates to a wireless communications apparatus that enables linking partial identifiers obtained during differing peer discovery intervals based upon overlapping information. The wireless communications apparatus can include means for receiving a first set of partial identifiers during a first peer discovery interval. Further, the wireless communications apparatus can include means for receiving a second set of partial identifiers during a second peer discovery interval. Moreover, the wireless communications apparatus can include means for matching partial identifiers from the first set and the second set based upon bit overlap.

Still another aspect relates to a machine-readable medium having stored thereon machine-executable instructions for receiving a first set of partial identifiers during a first peer discovery interval; receiving a second set of partial identifiers during a second peer discovery interval; and matching partial identifiers from the first set and the second set based upon bit overlap.

In accordance with another aspect, an apparatus in a wireless communication system can include a processor, wherein the processor can be configured to receive a first set of partial identifiers during a first peer discovery interval. Further, the processor can be configured to receive a second set of partial identifiers during a second peer discovery interval. Moreover, the processor can be configured to match partial identifiers from the first set and the second set based upon bit overlap.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
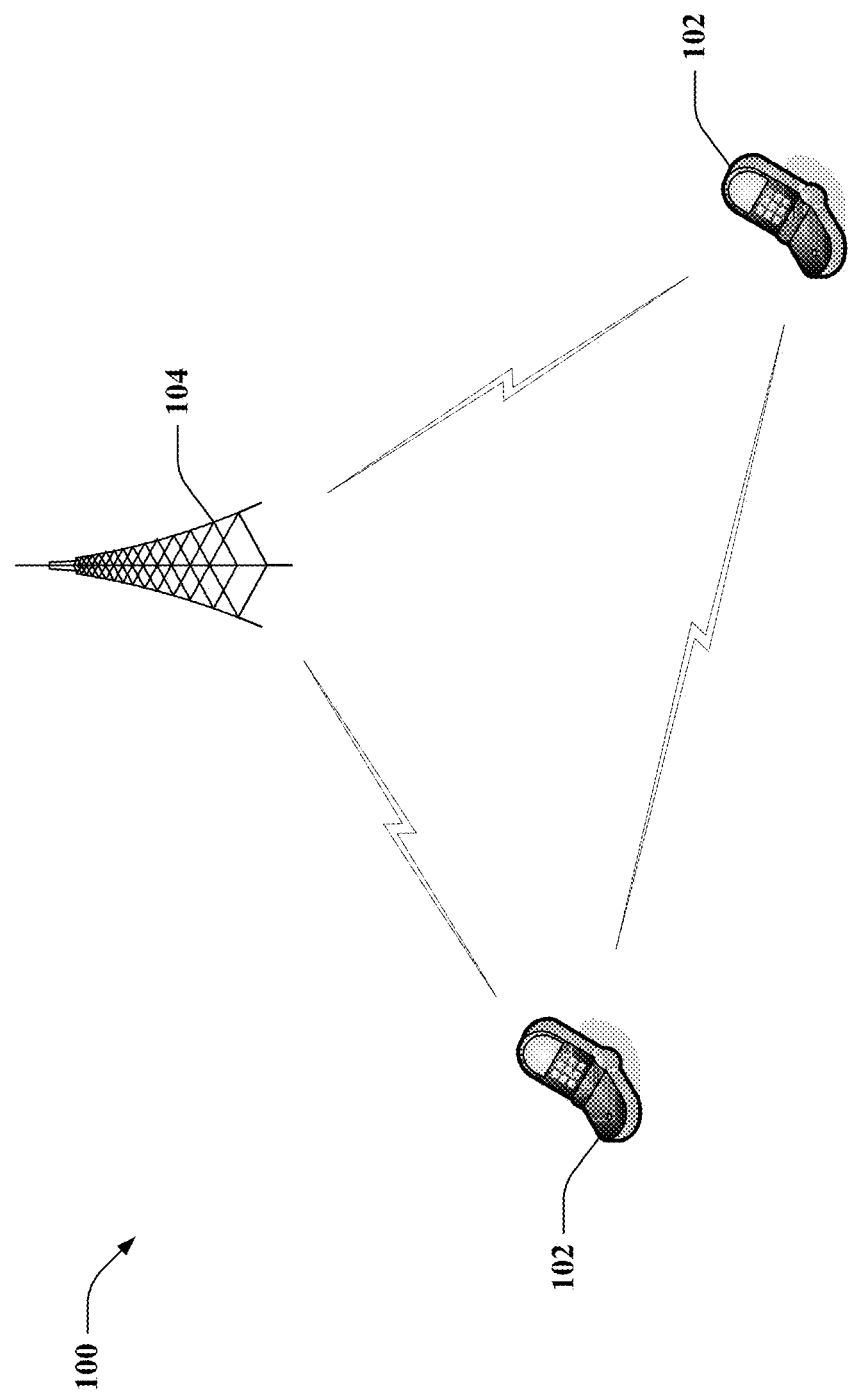
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more wireless terminals 102. Although two wireless terminals 102 are depicted, it is to be appreciated that system 100 may include substantially any number of wireless terminals 102. Wireless terminals 102 can be, for example, cellular phones, smart phones, laptops, handheld communication devices, handheld computing devices, satellite radios, global positioning systems, PDAs, and/or any other suitable device for communicating over wireless communication system 100. Wireless terminals 102 can communicate directly with each other via a local area peer-to-peer (P2P) network (e.g., ad hoc network). Peer-to-peer communication may be effectuated by directly transferring signals between wireless terminals 102; thus, the signals need not traverse through a base station (e.g., base station 104). The peer-to-peer network may provide short range, high data rate communication (e.g., within a home, office, etc. type setting).

Further, system 100 may support a wide area network (WAN). System 100 may include a base station 104 (e.g., access point) and/or any number of disparate base stations (not shown) in one or more sectors that receive, transmit, repeat, etc. wireless communication signals to each other and/or to one or more wireless terminals 102. Base station 104 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Wireless terminal(s) 102 may transmit signals to and/or receive signals from base station 104 when communicating via the wide area infra-structure network supported by system 100.

Peer-to-peer communication between wireless terminals 102 may be synchronous. For example, wireless terminals 102 may utilize a common clock reference to synchronize performance of distinct functions. Wireless terminals 102 may obtain timing signals from base station 104 (and/or a transmitter (not shown) that provides less functionality) utilized to synchronize operation of wireless terminals 102. Wireless terminal 102 may obtain timing signals from other sources, such as GPS satellites. According to an illustration, time may be meaningfully partitioned in a peer-to-peer network for functions such as peer discovery, paging, and traffic. Further, it is contemplated that each peer-to-peer network may set its own time.

Before communication in a peer-to-peer network can take place, wireless terminals 102 (e.g., peers) may detect and identify each other. The process by which this mutual detection and identification between peers takes place may be referred to as peer discovery. System 100 may support peer discovery by providing that peers desiring to establish peer-to-peer communication periodically transmit short messages and listen to the transmissions of others.

Transmissions for peer discovery may periodically occur during specified times referred to as peer discovery intervals, the timing of which may be predetermined by a protocol and known to wireless terminals 102. Peers may be synchronized to a common clock reference. For example, wireless terminals 102 may decode a small amount of broadcast information from locally positioned base station 104. Synchronization may allow for peers in a given geographic location to recognize a start and a finish of each discovery interval.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

Figure 2:
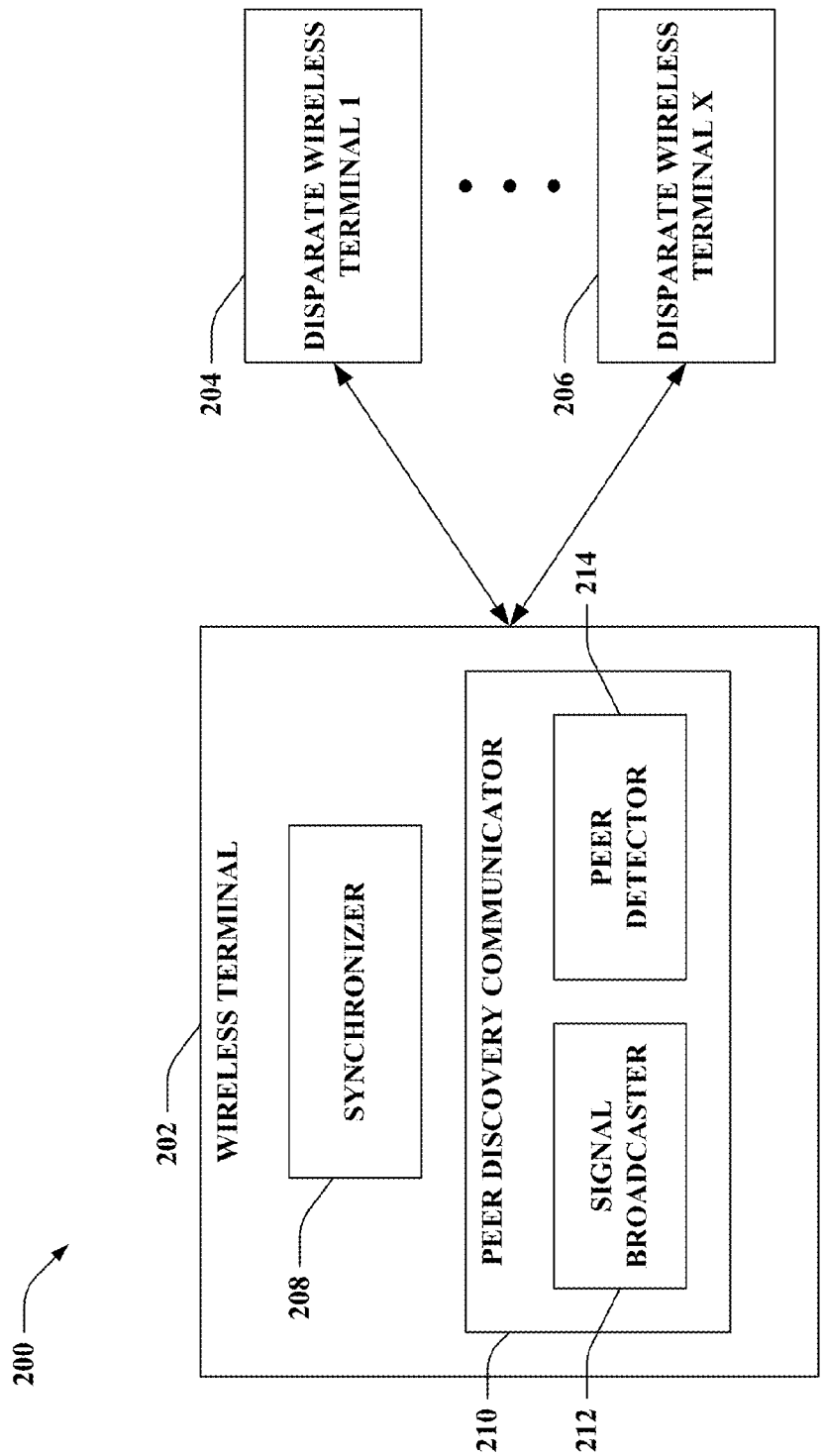
FIG. 2 is an illustration of an example system that synchronizes communication between wireless terminals in a peer-to-peer network.

Now turning to FIG. 2, illustrated is a system 200 that synchronizes communication between wireless terminals in a peer-to-peer network. System 200 includes a wireless terminal 202 that communicates directly with substantially any number of disparate wireless terminals (e.g., disparate wireless terminal 1 204, . . . , disparate wireless terminal X 206, where X may be any integer). Although the following provides further detail with regards to wireless terminal 202, it is to be appreciated that such illustrations may similarly apply to disparate wireless terminals 204-206.

Wireless terminal 202 may further include a synchronizer 208 that conforms timing between wireless terminal 202 and disparate wireless terminals 204-206. Synchronizer 208 may obtain its timing from a common clock reference. Similar synchronizers (not shown) of disparate wireless terminals 204-206 may obtain their respective timing from the same common clock reference. Further, synchronizer 208 may utilize a predetermined protocol to evaluate the common clock reference to identify a type of function to be effectuated at the time associated with the common clock reference (e.g., current time). Thus, for example, synchronizer 208 and similar synchronizers (not shown) of disparate wireless terminals 204-206 may determine that a time period identified from the common clock reference may be employed for one of peer discovery, paging, or traffic. The time period identified will be substantially the same or similar for synchronizer 208 and similar synchronizers (not shown) of disparate wireless terminals 204-206, even though wireless terminals 202-206 have not directly communicate with each other.

The common clock reference utilized by synchronizer 208 may be broadcast information from a base station (not shown) in a vicinity of wireless terminal 202 and disparate wireless terminals 204-206. Another common clock reference may include GPS satellite signals. For example, the broadcast information may be a Beacon, a PN (pseudo random) sequence signal, a pilot signal or other broadcast signal. Further, the broadcast signal may be periodically received from the base station. Moreover, timing information may be determined from the broadcast signal by synchronizer 208. By way of illustration, wireless terminal 202 and disparate wireless terminals 204-206 may receive and synchronize to the same broadcast signal, and therefore, have a common understanding of time. The common notion of time may be utilized to partition a timeline into distinct periods for each type of function (e.g., peer discovery, paging, traffic) according to a predetermined pattern defined by the air interface protocol.

Additionally, wireless terminal 202 may include a peer discovery communicator 210 that effectuates peer discovery during a peer discovery interval as determined by synchronizer 208. Peer discovery communicator 210 may further comprise a signal broadcaster 212 and a peer detector 214. Signal broadcaster 212 may transmit a message, in a first portion of the peer discovery interval, to disparate wireless terminals 204-206 that enables disparate wireless terminals 204-206 to detect and identify wireless terminal 202. Further, in a second portion of the peer discovery interval, peer detector 214 may receive message(s) sent from disparate wireless terminal(s) 204-206; peer detector 214 may analyze the received message(s) to detect and identify disparate wireless terminal(s) 204-206 to which the message(s) correspond. In some embodiments, the first and the second portions of the peer discovery interval may not overlap in time. Further, a transmit/receive switch guard time may be reserved between the first and the second portions of the peer discovery interval.

By way of example, wireless terminal 202 may enter into a peer-to-peer network that includes disparate wireless terminal 1 204 and disparate wireless terminal X 206. Upon entering the network, synchronizer 208 may determine timing associated with peer-to-peer communications (e.g., based upon a received common clock reference). Further, at a time partitioned for peer discovery, signal broadcaster 212 may broadcast a signal to disparate wireless terminals within range (e.g., disparate wireless terminals 204-206). The signal may be utilized by disparate wireless terminals 204-206 to detect that wireless terminal 202 has entered the network and/or determine an identity of wireless terminal 202. Moreover, peer detector 214 may obtain broadcast signals from disparate wireless terminals 204-206. Peer detector 214 may analyze the obtained signals to detect disparate wireless terminals 204-206 and/or identify disparate wireless terminals 204-206.

Peer discovery effectuated by peer discovery communicator 210 may be passive. Further, peer discovery may be symmetric; thus, wireless terminal 202 may detect and identify disparate wireless terminal 1 204 and disparate wireless terminal 1 204 may detect and identify wireless terminal 202. However, it is contemplated that a first wireless terminal may detect and identify a second wireless terminal, but the second wireless terminal may fail to detect and identify the first wireless terminal. Moreover, the defined time interval utilized for peer discovery may be much shorter than the time between peer discovery intervals. Additionally, upon detection and identification, further communication (e.g., paging, traffic) between wireless terminal 202 and disparate wireless terminal(s) 204-206 may, but need not, be effectuated.

Figure 3:
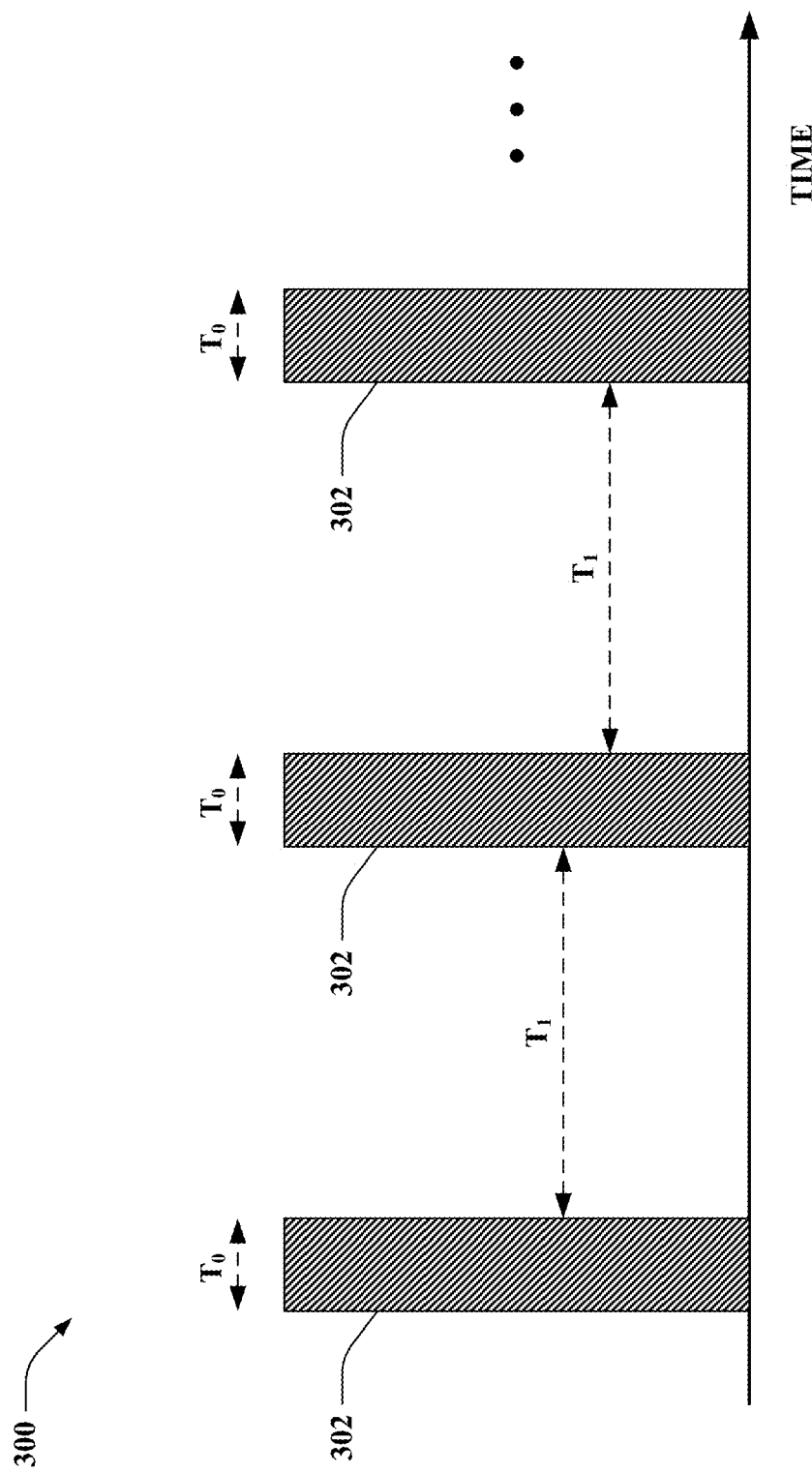
FIG. 3 is an illustration of an example timing diagram utilized by synchronized peers communicating within a peer-to-peer environment.

Referring to FIG. 3, illustrated is an example timing diagram 300 utilized by synchronized peers communicating within a peer-to-peer environment. Timing diagram 300 may be partitioned with intervals for peer discovery as well as intervals for differing functions such as paging and communicating traffic. As noted above, peers may be synchronized with one another based upon a common clock reference; thus, the peers may have a common notion of timing diagram 300. Peer discovery intervals 302 are illustrated. Each peer discovery interval 302 may have a duration of $T_0$. Peer discovery intervals 302 may be dedicated for detecting and identifying peers. Further, the time between peer discovery intervals 302 may be $T_1$. Any number of paging and/or traffic intervals may be included during $T_1$ between adjacent peer discovery intervals 302. The terminal may transition to a sleep mode (e.g., for power saving) during $T_1$ interval, for example, when the terminal does not find any peer in the peer discovery interval or does not find any peer of interest.

The amount of time allocated for peer discovery may be a small fraction of the overall time. For instance, the time ($T_1$) between peer discovery intervals may be at least 5 times larger than the time ($T_0$) allotted for each peer discovery interval 302. Pursuant to another example, the ratio of $T_1$ to $T_0$ may be 10, 50, 100, 200, 300, and so forth. According to a further example, peer discovery intervals 302 may have a duration, $T_0$, on the order of 2 ms (e.g., around 10 ms, 50 ms, . . . ). By way of further illustration, $T_1$, the time between peer discovery intervals, may be on the order of a few seconds or 1 minute. Allocating a small portion of overall time for peer discovery provides efficient utilization of power, since peers not involved in communicating pages and/or traffic may sleep during the time, $T_1$, in between each peer discovery interval 302.

Figure 4:
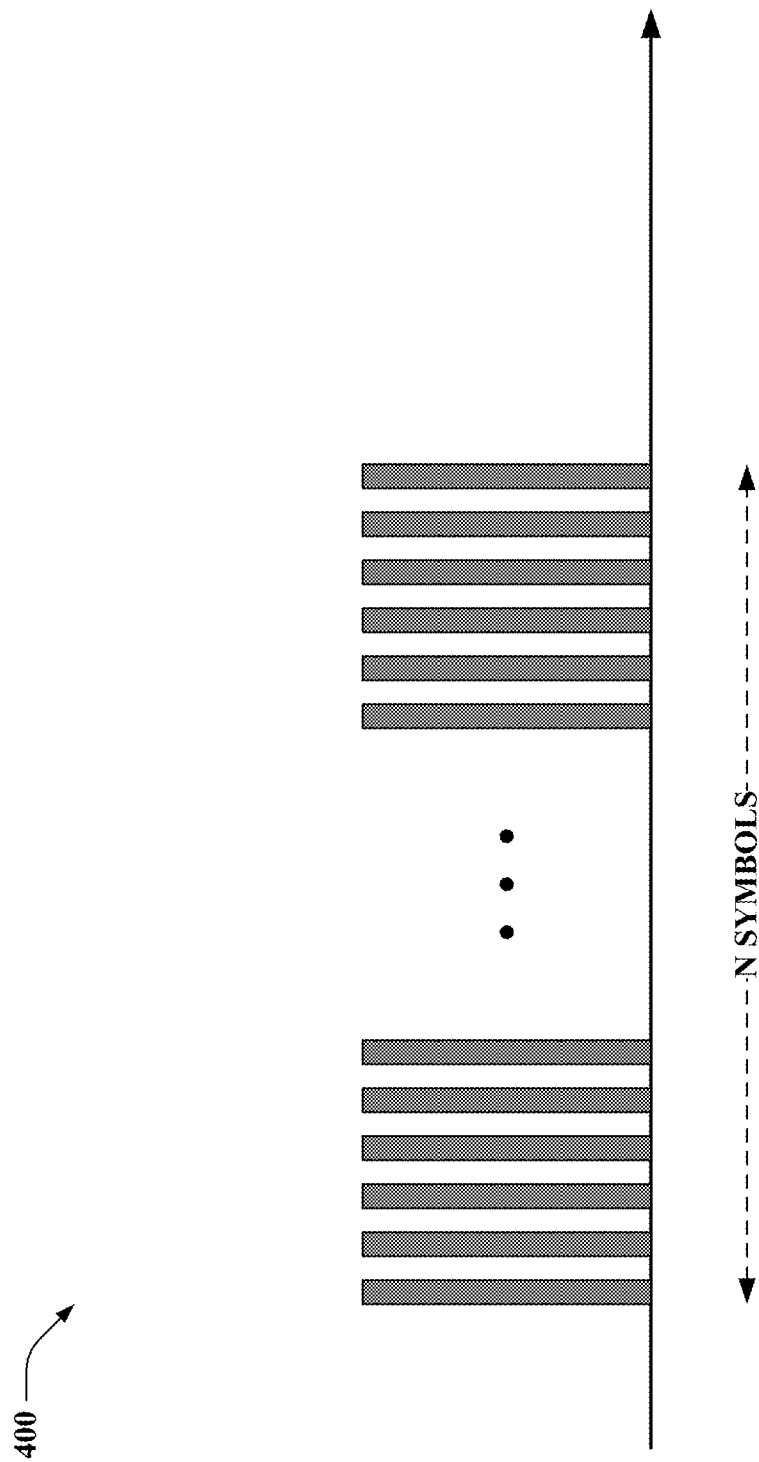
FIG. 4 is an illustration of an example timing diagram of a peer discovery interval.

With reference to FIG. 4, illustrated is an example timing diagram 400 of a peer discovery interval. The peer discovery interval may include a number of possible transmission times during which a wireless terminal can broadcast a signal. For instance, the peer discovery interval may include N symbols (e.g., OFDM symbols), where N may be any integer. Further, each symbol may last 10 μs and N may be 50, 100, 200, etc.; however, the subject claims are not so limited. Each peer within a peer-to-peer network may transmit utilizing one or more of the symbols; the peer may listen to the remainder of the symbols to detect and/or identify other peers within range. In accordance with an example, a peer may transmit on a first symbol at a first time and a second symbol at a second time, where the first time and the second time may or may not be contiguous.

According to an example, the peer discovery interval may include 200 symbols. In one or more embodiments, the 200 symbols may be used for transmitting broadcast signals by the terminals. In other embodiments, every other symbol may be utilized for transmission (e.g., 100 symbols may be employed for transmission). Before the peer discovery interval, each wireless terminal that wishes to engage in peer-to-peer communication may select one or more transmission symbols (e.g., out of the total of 100 transmission symbols pursuant to the above example). During the selected symbol time(s), the wireless terminal transmits a message to disparate wireless terminal(s) (e.g., peer(s)). The message may include one tone in one of the selected transmission symbols. Further, during at least a fraction of the remaining symbol times in the peer discovery interval, the wireless terminal listens and decodes the transmissions of the disparate wireless terminal(s). Since peer-to-peer communication may employ a half-duplex mode, where a wireless terminal either transmits or receives data at a particular time, the wireless terminal may transmit for 10% of the transmission times and receive for the remaining 90% of the time. By way of another example, the wireless terminal may transmit 30% of the time and receive 70% of the time. In accordance with an illustration, the wireless terminal may determine the transmission time(s) and/or the waveform (e.g., the frequency tone transmitted in a selected transmission symbol) to transmit based upon an identifier and/or a notion of time (e.g., derived from a received Beacon). The notion of time is in essence a time-varying variable. All the wireless terminals may get the same notion of time. For example, the wireless terminals may obtain a time-varying variable from the broadcast (e.g., beacon) signal from the base station. The time-varying variable can be some variable transmitted in the broadcast signal. For example, the variable can be some time counter or system time, which varies over time. In this document, the notion of time is referred to as time counter. It is desired that the time counter varies from one peer discovery interval to another. By way of further example, the wireless terminal may utilize a pseudo-random number generator, whose seed can be an identifier of the wireless terminal and a current counter value supplied by a broadcast signal from a base station, to select transmission time(s) and/or the waveform. As the time counter varies, the selected transmission symbol time(s) and/or waveform may also vary from one peer discovery interval to another.

Figure 5:
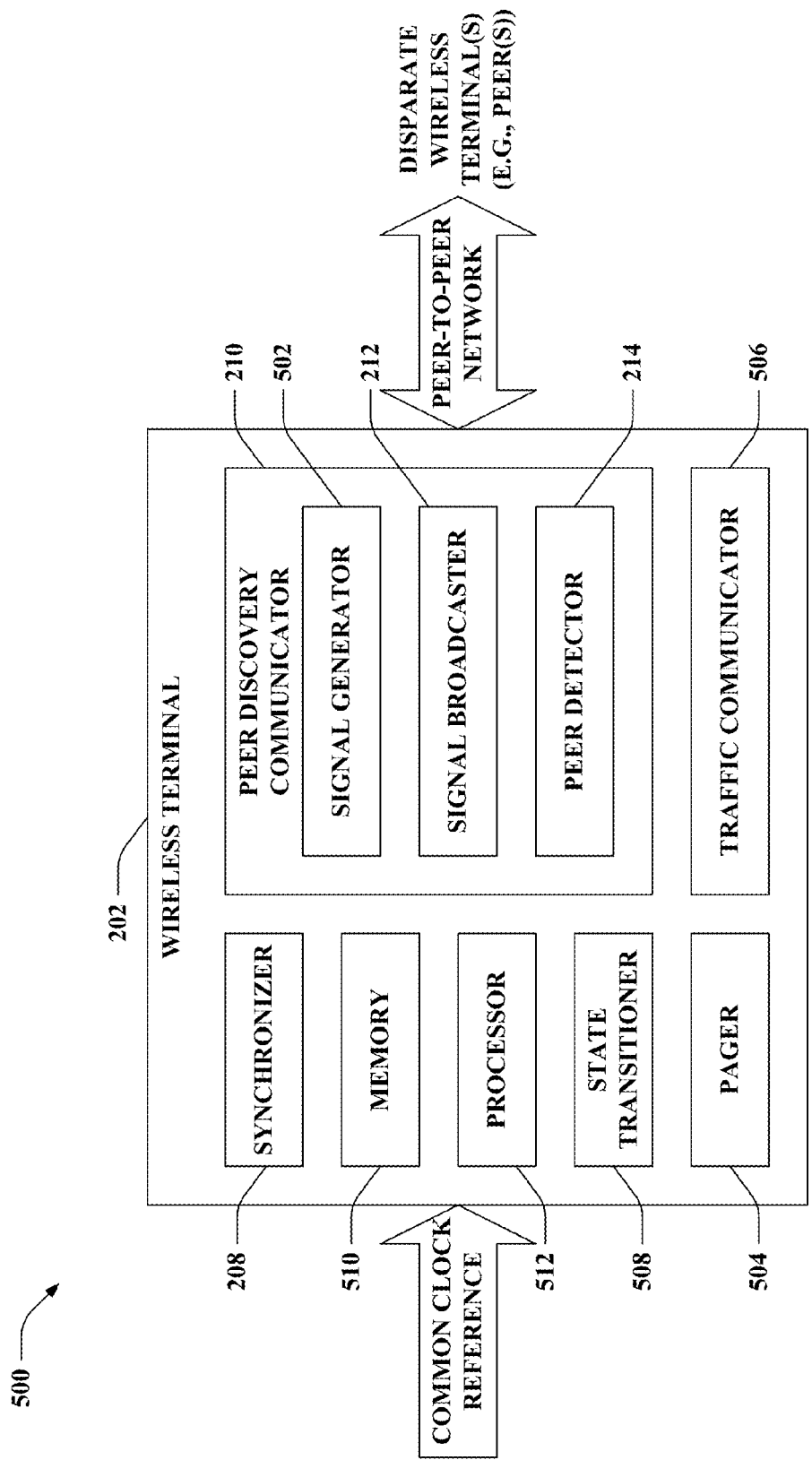
FIG. 5 is an illustration of an example system that effectuates synchronized communications over a peer-to-peer network.

Referring now to FIG. 5, illustrated is a system 500 that effectuates synchronized communications over a peer-to-peer network. System 500 includes wireless terminal 202 that may communicate via a peer-to-peer network with disparate wireless terminal(s) (e.g., peer(s)). Wireless terminal 202 may include synchronizer 208 that coordinates performance of various functions (e.g., peer discovery, paging, traffic). Synchronizer 208 may obtain and analyze a common clock reference to determine a meaningful notion of time. Additionally, the disparate wireless terminal(s) may obtain and analyze the common clock reference to yield the same notion of time; hence, peers within a local area may synchronize with the same common clock reference (e.g., from the same base station). Therefore, peers get the same timing (timing synchronized) without directly communicating with each other. For example, the common clock reference may be a Beacon signal transmitted by a base station within range of wireless terminal 202 and the peers. Further, wireless terminal 202 may comprise peer discovery communicator 210, which further includes signal broadcaster 212 and peer detector 214.

Peer discovery communicator 210 may also include a signal generator 502 that yields a message to be sent by signal broadcaster 212. According to an example, signal generator 502 may determine transmission time(s) within a peer discovery interval and/or waveform(s) to be transmitted. Signal generator 502 may yield transmission time(s) and/or waveform(s) of the message as a function of an identifier (ID) (e.g., corresponding to wireless terminal 202) and a time (e.g., determined from common clock reference).

In accordance with an example, the message yielded by signal generator 502 may be a Beacon signal, which may provide power efficiency; thus, signal generator 502 may effectuate transmitting a particular tone on a selected OFDM symbol. It is contemplated that more than one Beacon signal may be transmitted. Further, due to privacy issues, safeguards may be put into place to mitigate undesired distribution of the ID of wireless terminal 202.

Pursuant to another example, signal generator 502 may provide signal broadcaster 212 with an ID associated with wireless terminal 202 that may be broadcast to peer(s). Peer(s) obtaining the ID may detect and identify wireless terminal 202 by utilizing the received ID. For example, the ID of wireless terminal 202 may be an output of an M-bit hash function whose input is the plain-text name of wireless terminal 202 and a current counter value supplied by a base station broadcast signal (e.g., common clock reference, Beacon, . . . ). The counter value, for instance, may be constant during a current peer discovery interval and may be decodable by all peers. Further, the hash function may be specified a priori by a protocol and known to the peers.

By way of an example, peer detector 214 may maintain a list of plain-text names of buddy peers associated with wireless terminal 202. Further, upon decoding a particular ID, peer detector 214 may hash its plain-text buddy names using the current counter value. If at least one of the output IDs matches the decoded ID, peer detector 214 may conclude that the corresponding buddy peer is present. If no match is found or there are multiple matches, peer detector 214 may be unable to conclude as to the presence of any buddy peers. Moreover, each peer may vary the number of bits, previously denoted by M, of the output of the ID generating hash function in order to ensure that it is eventually discovered. A peer maintains a list of disparate wireless terminals that are detected to be present in the current time. The list may include all disparate wireless terminals or may include those in the predefined buddy list of wireless terminal 202 or the user who is using wireless terminal 202. As the time goes by, the list evolves, because some disparate wireless terminals may disappear (e.g., because the corresponding users move away), or because other disparate wireless terminals may appear (e.g., because the corresponding users move close). The peer may add the new disparate wireless terminals to the list or delete disappearing disparate wireless terminals from the list. In an embodiment, the peer passively maintains the list. In this case, a first peer may detect the presence of a second peer and keep the second peer in its list without informing the second peer. As a result, the second peer may not know that the first peer has already kept the second peer in the list. By symmetry, depending on wireless channel and interference condition, the second peer may also detect the presence of the first peer and keep the first peer in its list without informing the first peer. In another embodiment, after the first peer detects the presence of the second peer, the first peer proactively sends a signal to inform the second peer so that the second peer now knows that the first peer has already kept the second peer in the list, even though the first peer has no data traffic to communicate with the second peer yet. The first peer may selectively decide whether it sends a signal. For example, the first peer may send a signal only to another peer that is in the predefined buddy list.

Wireless terminal 202 may also include a pager 504 and a traffic communicator 506. Based upon the synchronized notion of time yielded by synchronizer 208, pager 504 and traffic communicator 506 may transmit and/or receive signals via the peer-to-peer network during respective, allocated times for such functions. Upon detecting and identifying a peer, pager 504 enables wireless terminal 202 to initiate communication with the peer. Further, during an allotted traffic interval, wireless terminal 202 and the peer may transmit and/or receive traffic by employing traffic communicator 506.

Wireless terminal 202 may additionally include a state transitioner 508. To provide power savings, state transitioner 508 may enable wireless terminal 202 to enter a sleep state during time intervals associated with functions (e.g., paging, traffic) other than peer discovery when wireless terminal 202 is not involved with such functions. Further, state transitioner 508 switches wireless terminal 202 to an on state (e.g., from a sleep state) during peer discovery intervals to enable wireless terminal 202 to discover peer(s) and/or be discovered by peer(s).

Moreover, wireless terminal 202 may include memory 510 and a processor 512. Memory 510 may retain an identifier associated with wireless terminal 202. Further, memory 510 may include a list a buddy peers that may be referenced by peer detector 214. Additionally, memory 510 may retain instructions related to synchronizing time intervals for differing functions with disparate wireless terminals, establishing a common period of time for peer discovery in a local area (e.g., based upon information obtained from a base station), identifying location(s) within a peer discovery interval for broadcasting wireless terminal related signals, generating signals for transmission to disparate wireless terminals, detecting and/or identifying disparate wireless terminals within range, and so forth. Moreover, processor 512 may execute instructions described herein.

Figure 6:
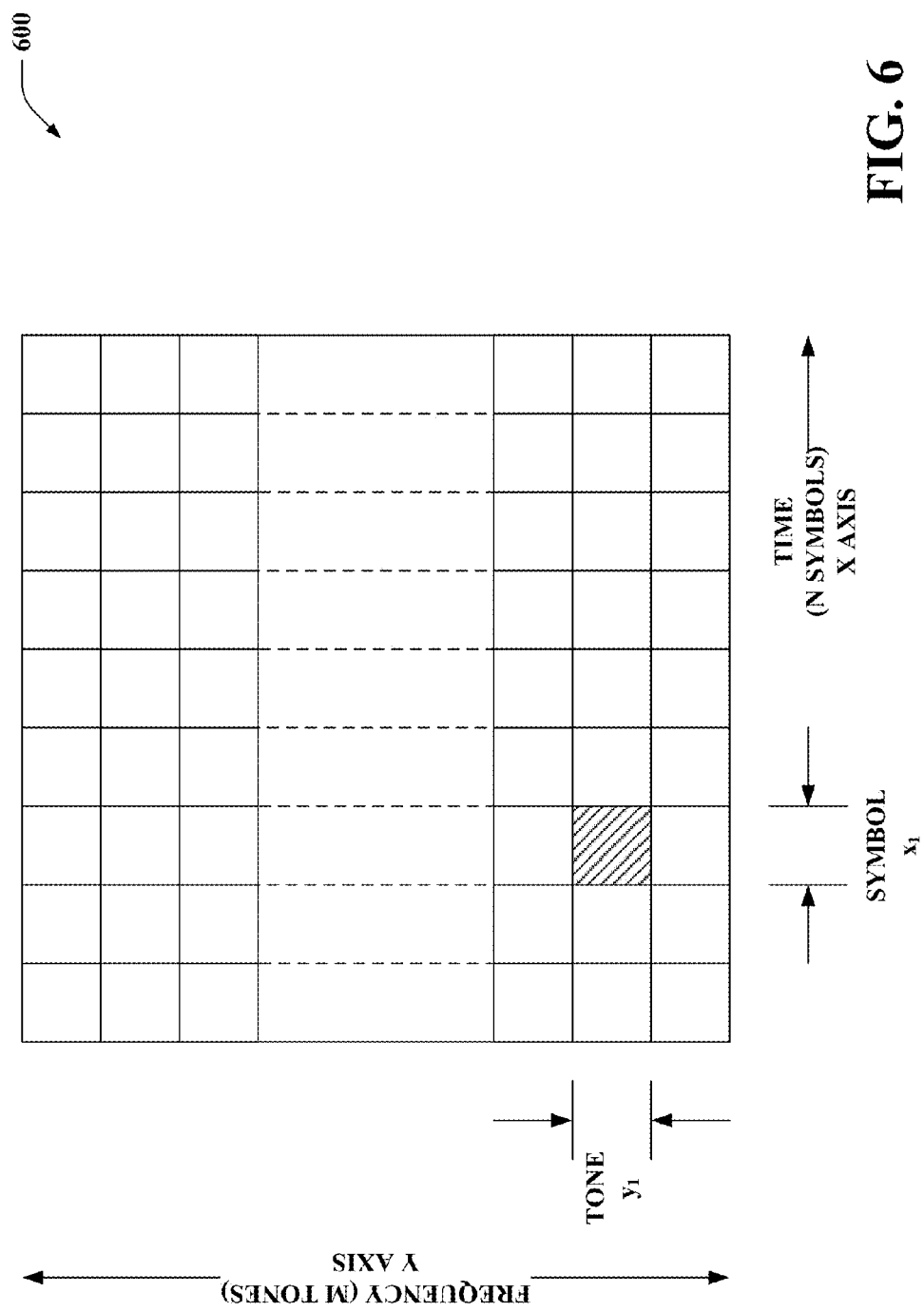
FIG. 6 is an illustration of an example time-frequency grid associated with transmission during a peer discovery interval.

Referring to FIG. 6, illustrated is an example time-frequency grid 600 associated with transmission during a peer discovery interval. The x-axis represents time and may include N symbols (e.g., where N may be any integer), and the y-axis represents frequency and may include M tones (e.g., where M may be any integer). According to an example, a wireless terminal may select a particular symbol (e.g., transmission time) for transmission (e.g., based upon an identifier of the wireless terminal or the user who is using the wireless terminal and/or time counter). Further, a particular tone corresponding to the selected symbol may be determined (e.g., based upon the identifier and/or time). Thus, the x and y coordinates (e.g., $(x_1, y_1)$) within grid 600, as illustrated by the shading, may provide information (e.g., when evaluated by a peer receiving such signal). By transmitting a single symbol, the alphabet employed by the wireless terminal may be $\log_2(M \cdot N)$. According to a further example, more than one symbol may be utilized by the wireless terminal for transmission during the peer discovery interval. Pursuant to this example, the tones (e.g., Beacons) may be transmitted at different times. By way of illustration, if two Beacons are transmitted with coordinates $(x_1, y_1)$ and $(x_2, y_2)$, $x_1$ differs from $x_2$ to mitigate transmitting the two Beacons concurrently.

Figure 7:
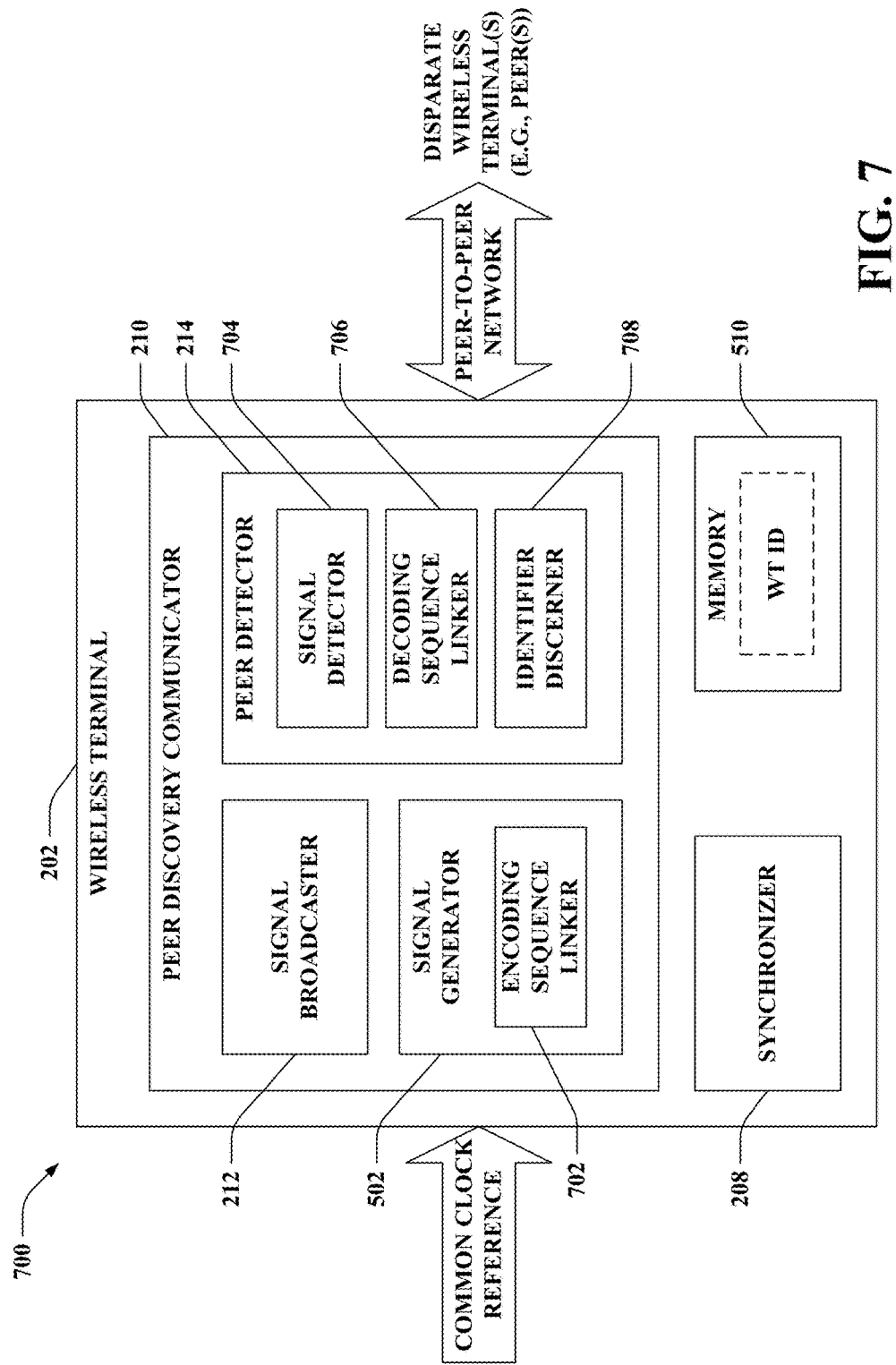
FIG. 7 is an illustration of an example system that enables employing a reversible function for generating a peer discovery signal, where utilization of the reversible function allows identifiers to be deciphered from received signals in a peer-to-peer network.

Now turning to FIG. 7, illustrated is a system 700 that enables employing a reversible function for generating a peer discovery signal, where utilization of the reversible function allows identifiers to be deciphered from received signals in a peer-to-peer network. System 700 includes wireless terminal 202 that communicates via the peer-to-peer network with disparate wireless terminal(s). Wireless terminal 202 may include synchronizer 208, peer discovery communicator 210 and memory 510.

Peer discovery communicator 210 (and similar peer discovery communicator(s) of disparate wireless terminal(s))

may utilize a reversible function for encoding and/or evaluating signals communicated over the peer-to-peer environment. As such, wireless terminal 202 and disparate wireless terminal(s) may abide by a function (e.g., hash function) so that their unique identifiers can be discerned in one peer discovery interval or across a series of peer discovery intervals. Signal generator 502 may employ the reversible function to yield a peer discovery signal based on an identifier of wireless terminal 202 and a time counter, and the signal may be provided to disparate wireless terminal(s) within the peer-to-peer network (e.g., via broadcast). By leveraging the reversible function, the identifier (WT ID) may be deciphered by disparate wireless terminal(s) that detect the peer discovery signal transmitted by wireless terminal 202. For example, the reversible function may be a linear function or a non-linear function. Moreover, signal broadcaster 212 may transmit the peer discovery signal yielded by signal generator 502.

Signal generator 502 may include an encoding sequence linker 702 that links signal formats in successive peer discovery intervals based upon a fixed and predetermined rule (e.g., reversible function). According to an example, the identifier (WT ID) may include 32 bits or more; however, a beacon signal communicated in a peer discovery interval with 200 symbols and 50 tones provides 10 bits. Thus, encoding sequence linker 702 may enable communicating the identifier by providing portions of the identifier via signals sent in more than one peer discovery interval. Encoding sequence linker 702 utilizes the reversible function to enable the identifier to be recognized over R peer discovery intervals, where R may be any integer (e.g., less than 3, 3, less than 20, . . . ). For example, encoding sequence linker 702 may enable sending a first beacon during a first peer discovery interval, a second beacon during a second peer discovery interval, and so forth, where the beacons may be linked according to the reversible function.

Moreover, peer detector 214 may include a signal detector 704, a decoding sequence linker 706, and an identifier discerner 708. Signal detector 704 may obtain signal(s) communicated over the peer-to-peer network during peer discovery intervals. For instance, signal(s) may be generated by disparate wireless terminal(s) (e.g., that employ the reversible function to generate such signals) and/or may correspond to noise or interference. According to an example, signal detector 704 may identify coordinate pairs of symbol(s) and corresponding tone(s) related to the detected signals. Decoding sequence linker 706 may utilize the fixed and predetermined rule to link together signal(s) from successive peer discovery intervals. Further, decoding sequence linker 706 may leverage knowledge of the function employed by an encoding sequence linker of a disparate wireless terminal to identify a sequence of signals from differing peer discovery intervals that correspond to one another. Moreover, identifier discerner 708 may evaluate the sequence of signals to determine the identifier encoded upon such signals. For instance, a list of identified disparate wireless terminals may be updated according to the analysis effectuated by identifier discerner 708.

By leveraging a reversible function, system 700 enables identifying disparate wireless terminals in a peer-to-peer network whether or not wireless terminal 202 has prior knowledge of identifiers related to the disparate wireless terminals (and similarly wireless terminal 202 may be identified by disparate wireless terminal(s)). Such recognition of wireless terminal(s) located within range may enhance coordination of traffic transmission and management of interference among multiple peer-to-peer connections.

According to an illustration, the identifier of wireless terminal 202 (e.g., WT ID retained in memory 510 of wireless terminal 202) may be discoverable from signals transmitted by signal generator 502 of wireless terminal 202. Likewise, unique identifiers respectively corresponding to disparate wireless terminals in the peer-to-peer network may be similarly discoverable (e.g., by peer detector 214 of wireless terminal 202). Further, based upon the determined identifier(s), peer detectors (e.g., peer detector 214) may recognize another wireless terminal as a peer. For example, the signal formats transmitted in successive peer discovery intervals may be linked with each other with a fixed and predetermined rule (e.g., by encoding sequence linkers of wireless terminals), which is applicable across the peer-to-peer network. During a particular peer discovery interval, multiple wireless terminals may transmit their signature signals. However, a signature signal in one peer discovery interval may not uniquely identify a transmitting wireless terminal (e.g., wireless terminal 202, disparate wireless terminal(s)). Thus, the transmitting wireless terminal may form a sequence of signature signals transmitted by that single transmitting wireless terminal over successive peer discovery intervals in order to recover the identifier of the transmitting wireless terminal. Moreover, the fixed and predetermined rule helps a receiving wireless terminal (e.g., wireless terminal 202, disparate wireless terminal(s)) form one sequence of the signature signals so as to construct the identifier of the transmitting wireless terminal.

Substantially any fixed and predetermined rule may be employed when using beacon signals. Pursuant to an example, the signature signals from one transmitting wireless terminal may have the same position of the selected OFDM symbol in successive intervals. The transmitting wireless terminal may choose to skip a subset of the time intervals for transmission so that it can monitor those time intervals and check whether other transmitting wireless terminals are sending signature signals in those time intervals. In another example, the signature signals from one transmitting wireless terminal have the same position of the selected tone in successive time intervals. The positions of the selected symbols may be a function of the identifier of the transmitting wireless terminal. In yet another example, in two successive time intervals, the signature signals from one transmitting wireless terminal may be sent at tone $y_1$ of selected symbol $x_1$ and at tone $y_2$ of selected symbol $x_2$, respectively; according to this example, the rule may be that $y_2=x_1$ or $x_2=y_1$. It is understood that the above equation may be defined in a modulo sense, where the modulus is a predetermined constant. In general, the linking function represents a constraint that $x_1$, $y_1$, $x_2$, $y_2$ have to satisfy, that is $g(x_1, y_1, x_2, y_2)=0$.

Figure 8:
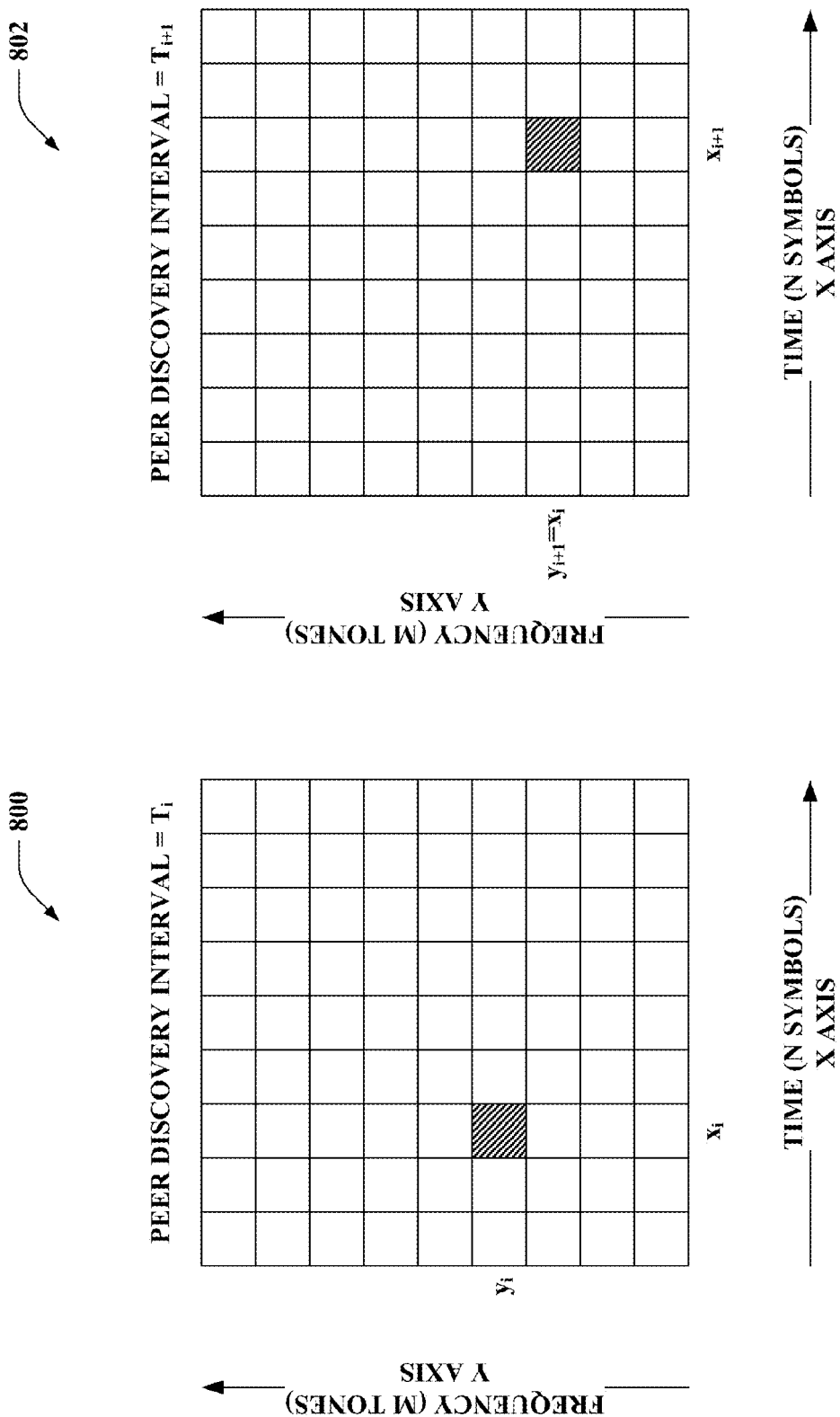
FIG. 8 is an illustration of an example graphical depiction of an evaluation of a linked sequence of peer discovery signals generated with a reversible function.

With reference to FIG. 8, illustrated is an example graphical depiction of an evaluation of a linked sequence of peer discovery signals generated with a reversible function. Time-frequency resource 800 represents a signal (e.g., beacon) generated and/or obtained during a first peer discovery interval, $T_i$, and time-frequency resource 802 represents a signal generated and/or obtained during a second peer discovery interval, $T_{i+1}$. Moreover, the first peer discovery interval, $T_i$, may be the peer discovery interval proceeding the second peer discovery interval, $T_{i+1}$. The time-frequency resources 800-802 may be similar to time-frequency resource 600 of FIG. 6. Further, it is to be appreciated, however, that the claimed subject matter is not limited to these examples.

According to the depicted example, the reversible function may provide information related to the identifier based upon the selected symbol (e.g., x axis). Further, information utilized to link signals from successive peer discovery intervals may be provided by the selected tone (e.g., y axis). For example, the reversible function may provide that $y_{i+1}=x_i$. By way of illustration, a signal may be transmitted during the first peer discovery interval, $T_i$, with a coordinate pair $(x_i, y_i)$. The selected symbol, $x_i$, may provide information associated with a part of the identifier, while the remainder may be included in subsequent signal(s) that may be linked in a sequence. To determine the signal within the next peer discovery interval, $T_{i+1}$, that is included in the sequence, the signal with a selected tone coordinate, $y_{i+1}$, that is equal to $x_i$ is identified. Further, although not shown, during a following peer discovery interval, $T_{i+2}$, $y_{i+2}=x_{i+1}$, and so forth. Although one signal is illustrated during each peer discovery interval, it is contemplated that any number of signals may be transmitted and/or received during each such interval. Additionally, it is to be appreciated that any disparate manner of linking beacon signals between differing peer discovery intervals is intended to fall within the scope of the hereto appended claims. Further, signals from any number of successive peer discovery intervals may be linked to communicate an identifier (e.g., 2, 3, 4, . . . ).

Figure 9:
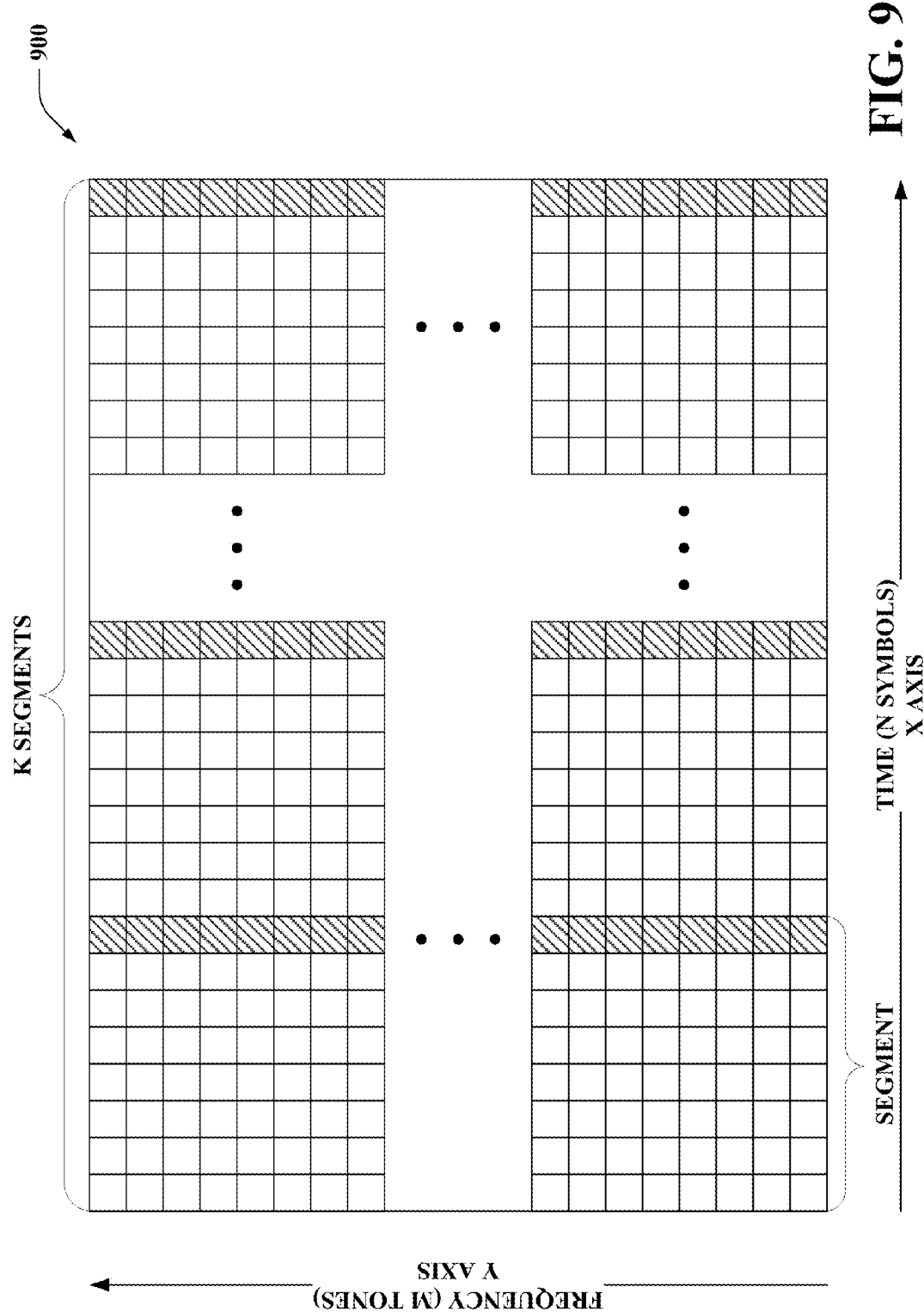
FIG. 9 is an illustration of an example graphical depiction of a resource utilized for a direct signaling coding scheme employed for peer discovery.

Turning to FIG. 9, illustrated is an example graphical depiction of a resource 900 utilized for a direct signaling coding scheme employed for peer discovery. Resource 900 may include N symbols and M tones, where N and M may be substantially any integers. For example, resource 900 may be 64 by 64; however, the claimed subject matter is not so limited. Moreover, resource 900 may be associated with a particular peer discovery interval, and a substantially similar resource may be associated with a next peer discovery interval, etc. Resource 900 can be leveraged by a wireless terminal to transmit a unique ID to disparate wireless terminals as well as listen for IDs from disparate wireless terminals.

The full ID of each wireless terminal can be 32 bits long. A wireless terminal can form a 45 bit coded ID from the unique, raw 32 bit ID by adding another 13 bits. From one peer discovery interval to a next peer discovery interval, the 13 bits can change (e.g., function of time) while the 32 ID bits can remain constant. It is contemplated, for instance, that a portion of the 13 bits can change over time, while a remainder of the 13 bits can be constant; however, the claimed subject matter is not so limited. For example, 10 time-independent parity check bits can be appended to the ID along with an additional 3 time-dependent parity check bits. Moreover, the 13 bits can be generated in substantially any manner. The coded ID (e.g., combining the 32 bits and the 13 bits) can be denoted x. By way of illustration, the 45 bit coded ID can be a concatenation of seven 6 bit symbols, $x_1$, $x_2$, $x_3$, $x_4$, $x_5$, $x_6$, and $x_7$, and one time dependent 3 bit symbol, $x_8(t)$ (e.g., $x(t)=[x_1\ x_2\ x_3\ x_4\ x_5\ x_6\ x_7\ x_8(t)]$).

Further, resource 900 of the peer discovery slot can be divided into K segments, where K can be substantially any integer; thus, resource 900 can be partitioned into K sub-groups. According to an example where resource 900 is a 64 by 64 time-frequency grid (e.g., 64 tones and 64 symbols), resource 900 can be divided into eight segments, where each of the segments includes 8 symbols (e.g., and the 64 tones that respectively correspond to the 8 symbols). Although the following discusses the aforementioned example, it is to be appreciated that the claimed subject matter is not so limited.

During a peer discovery session at time t, the wireless terminal can select one of the eight segments during which to transmit according to $x_8(t)$ (e.g., which includes 3 group selector bits that uniquely determine one of the eight segments of resource 900 to employ for coded ID transmission). Thus, the wireless terminal transmits during one of the eight segments and listens during the remaining seven segments of a particular peer discovery interval (e.g., due to the half duplex nature of peer discovery) at time t. Moreover, since $x_8(t)$ is time dependent, the segment employed by the wireless terminal varies with time (e.g., a wireless terminal can transmit via a first segment during a first peer discovery interval and a second segment during a second peer discovery interval, where the first and second segments can be the same or different). For each column in the selected segment, the wireless terminal can transmit at maximum power on the time-frequency points corresponding to the associated 6 bit symbols; thus, the j th column of a segment is used to convey the symbol $x_j$ from the coded ID x (e.g., where j is between 1 and 7). Further, the eighth symbol in each segment can be a reserved (e.g., unused) symbol to provide a gap between segments (as shown by the shading) (e.g., all tones associated with the reserved symbol can be unused); according to another example, however, it is contemplated that any other symbol within each segment can be the reserved symbol, a plurality of symbols in each segment can be reserved (e.g., odd or even symbols can be reserved), and so forth.

According to an illustration, wireless terminals may not be completely synchronous with one another. For instance, timing estimations can differ between wireless terminals (e.g., based upon the common clock reference). According to another example, an offset in timing associated with disparate wireless terminals can result from the disparate wireless terminals synchronizing within differing base stations, and therefore, having slightly different notions of time. The offset, for instance, can be less than an amount of time associated with a symbol; however, the claimed subject matter is not so limited. Thus, the reserved symbol (or reserved symbol(s)) can be employed to resolve this timing ambiguity.

Figure 10:
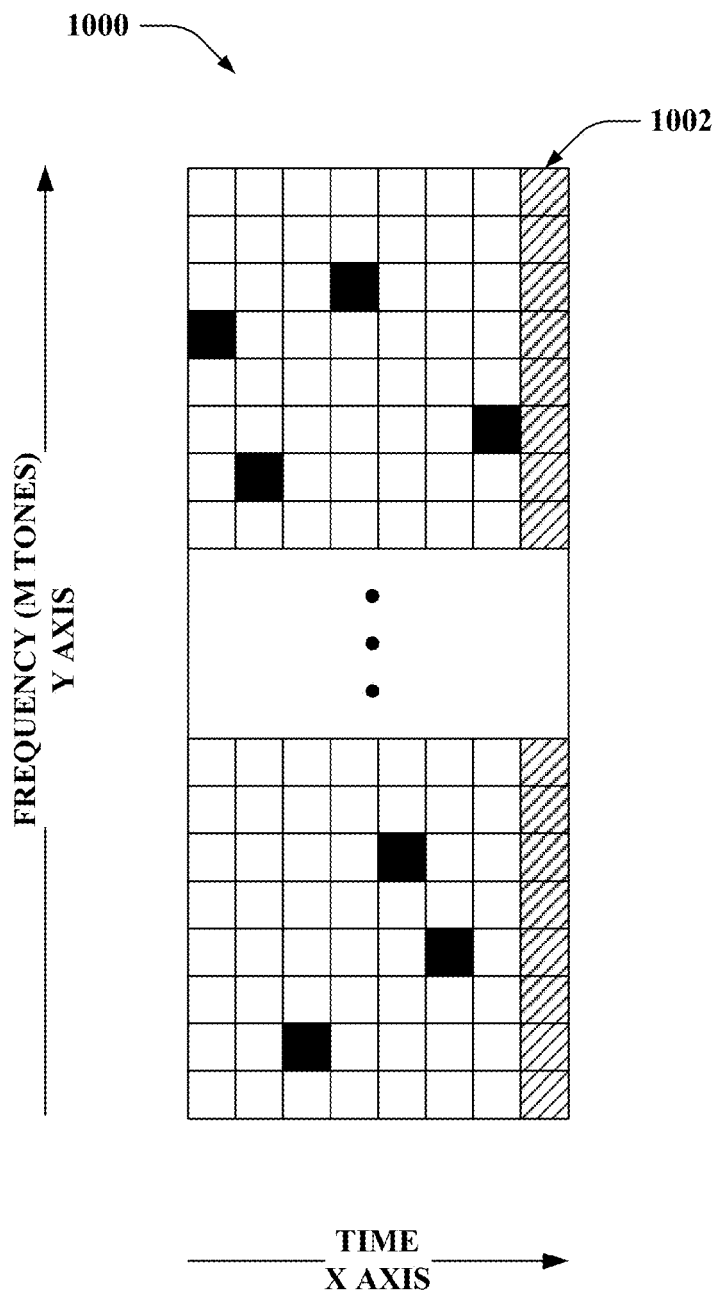
FIG. 10 is an illustration of an example segment selected from a peer discovery interval.

Referring now to FIG. 10, illustrated is an example segment 1000 selected from a peer discovery interval (e.g., from resource 900 of FIG. 9) for transmission of an identifier according to a direct signaling coding scheme during peer discovery. Segment 1000 can include 8 symbols and 64 tones; however, the claimed subject matter is not so limited. Further, segment 1000 can include a reserved symbol 1002 (e.g., or a plurality of reserved symbols (not shown)). Moreover, a tone can be transmitted for each of the seven non-reserved symbols in segment 1000 as depicted. Since one out of 64 tones for each symbol can be selected, transmission of a single tone on each symbol can provide 6 bits of information (e.g., each related to the symbol $x_j$ from the coded ID x). Thus, the first 42 bits of the 45 bit coded ID can be conveyed using seven 6 bit symbols. Further, the last 3 bits can be conveyed via the choice of segment 1000 from a set of segments (e.g., from the 8 segments included in resource 900). The wireless terminal that transmits during segment 1000 can additionally listen for ID(s) transferred by disparate wireless terminals during the remaining segments (e.g., during the remaining seven segments of resource 900) other than segment 1000 associated with a peer discovery interval. Moreover, selection of segment 1000 from the set of segments can vary over time (e.g., during a different peer discovery interval, a differing segment from resource 900 can be utilized for transmitting the ID).

Coding for direct signaling can be effectuated upon obtaining and/or generating the coded ID, which can include 32 ID bits and 13 additional bits. It is contemplated that the coded ID or a portion thereof can be time varying (e.g., a portion of the coded ID for a particular wireless terminal can differ between peer discovery intervals). Moreover, the coded ID can be split into two portions: a first portion of the coded ID can enable selecting a segment from a set of segments to employ for transferring data (e.g., a resource can be partitioned into the set of segments) and the second portion of the coded ID can relate to the seven 6 bit symbols to be generated and/or sent during the selected segment. According to an example, the first portion of the coded ID that relates to the selected segment can signal 3 bits, while the second portion can signal the remaining 42 bits. Moreover, it is contemplated that the 42 bits can be signaled in any manner within the selected segment (e.g., employing phase-shift keying (PSK), differential phase-shift keying (DPSK), quadrature phase-shift keying (QPSK), quadrature amplitude modulation (QAM), . . . ), and the claimed subject matter is not limited to signaling via utilizing the seven 6 bit symbols as described herein.

Decoding can be performed as follows. For each segment and each column, a tone with the most energy can be identified. Thus, the identified tones for the seven symbols in the segment can be concatenated and the segment symbol $x_8(t)$ can be appended to form an estimate of x(t). Thereafter, parity checks can be performed utilized a subset or all of the 13 bits added to the 32 ID bits. If the parity checks pass, the 13 added bits can be removed and the remaining 32 bit ID can be included in a peer discovery list. If one or more of the parity checks fail, however, the ID can be discarded. Next, for each segment and each column, the tone with the second greatest energy can be identified. The second highest energy tones can be concatenated as described above and the corresponding 32 bit ID can be added to the peer discovery list of all parity checks are passed. Additional rounds (e.g., third highest energy, fourth highest energy, . . . ) can be performed as well. The probability of adding a false ID to the peer discovery list in each discovery slot can be roughly $2^{-10} \times$[number of rounds]. According to another example, it is contemplated that the power obtained from a common transmitting wireless terminal can have some correlation; hence, tone power should not exhibit significant variation, else a tone upon one symbol that varies to a large degree from tones upon other symbols can be discarded (e.g., if these tones are determined to have the highest energy, second highest energy, . . . ).

This peer discovery technique can initially identify the strongest peers, while later, due to the random nature of segment selection, more distant peers can be identified. Moreover, decoding performance can be improved while increasing computational complexity. Rather than identifying only the maximum energy tones, for each column the two tones with the most energy can be identified. This can create $2^7$ potential IDs. For each ID, the parity bits can be checked. If all parity checks pass, then the ID can be added to the peer discovery list, and if any fail the ID can be discarded. This improved decoding technique can on average discover more peers as compared to the aforementioned decoding technique. The probability of adding a false ID employing this decoding technique can be roughly $2^{-3}$.

Figure 11:
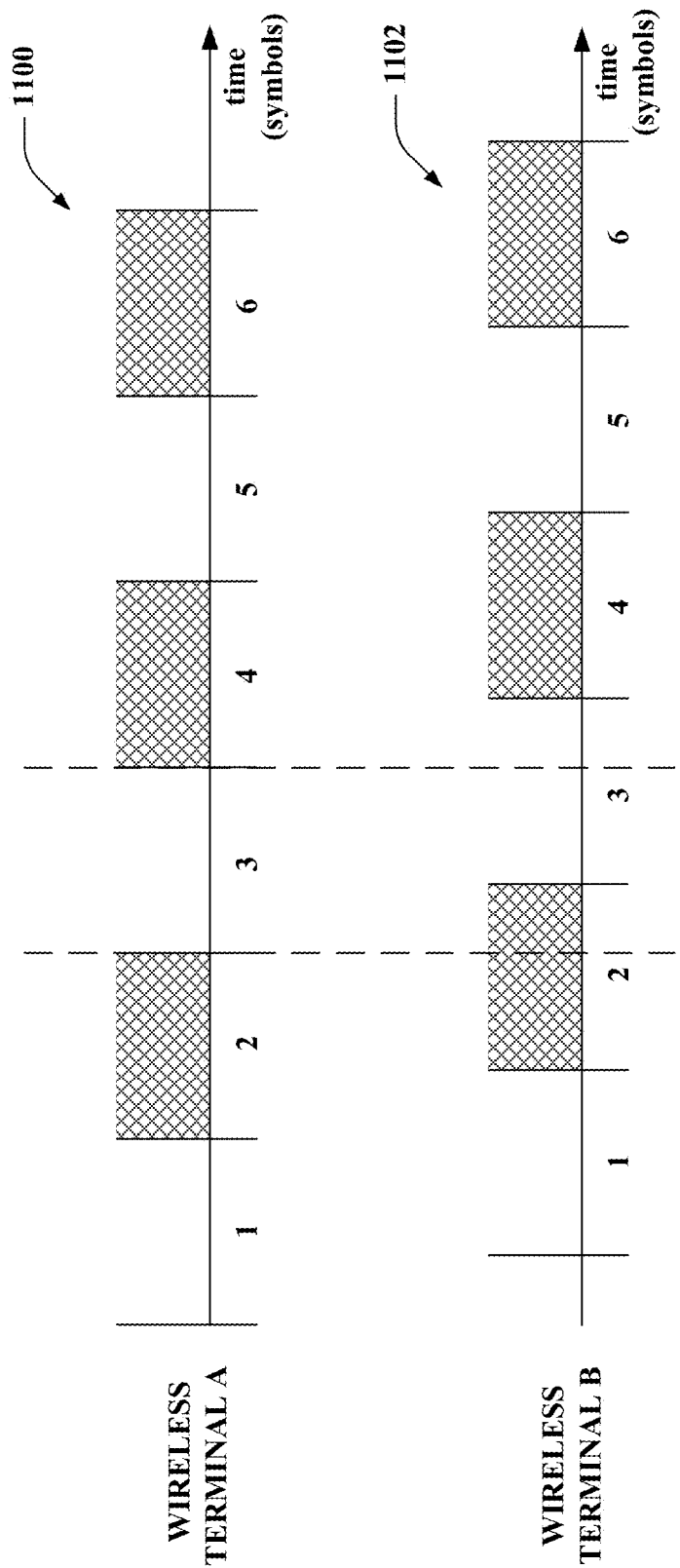
FIG. 11 is an illustration of an example timing offset between wireless terminals during peer discovery.

With reference to FIG. 11, illustrated is a graphical representation of timing offset between wireless terminals during peer discovery. According to the depicted illustration, wireless terminal A and wireless terminal B can exhibit timing offset (e.g., between a timing 1100 of wireless terminal A and a timing 1102 of wireless terminal B). For instance, the timing offset can result from each of the wireless terminals synchronizing with disparate base stations or variations in timing estimations yielded by each of the wireless terminals based upon a common clock reference; however, the claimed subject matter is not so limited. As shown, timing 1100 of wireless terminal A can be shifted ahead of timing 1102 of wireless terminal; however, it is to be appreciated that timing 1100 can lag behind and/or can be synchronized with timing 1102.

Any number of reserved (e.g., unused) symbols can be employed by the wireless terminals during a peer discovery interval. The reserved symbols can be nulls. As described above, a peer discovery interval can be partitioned into any number (e.g., eight) of segments, and each of the segments can include a reserved symbol; yet, it is to be appreciated that each of the segments can include a plurality of reserved symbols. In the depicted example, even numbered symbols can be reserved symbols (as shown by the shading) and odd numbered symbols can be utilized to communicate identifier related information.

According to the example shown, wireless terminal A can transmit a signal (e.g., a tone) on symbol 3 (e.g., as specified by a notion of time of wireless terminal A set forth by timing 1100), and wireless terminal B can receive the signal. Since the tone location and the corresponding time index (e.g., symbol) for a transferred signal enable the receiving wireless terminal to decode the ID of the transmitting wireless terminal, differences between the wireless terminals notions of time can detrimentally impact performance. By way of further illustration, wireless terminal B can determine a time index associated with the transferred signal. Since an offset can exist between timing 1100 of wireless terminal A and timing 1102 of wireless terminal B (e.g., wireless terminal A can have a differing time notion from wireless terminal B), wireless terminal B can receive the signal partially during symbol 2 and the remainder during symbol 3, yet symbol 2 can be a reserved symbol in this illustrated example. Since the signal can be partially received at wireless terminal B during such a reserved symbol, wireless terminal B can determine that the transmitting wireless terminal (e.g., wireless terminal A) has a different timing from wireless terminal B. Moreover, wireless terminal B can recover from the difference in timing by adjusting timing 1102 to mitigate such misalignment between timing 1100 and timing 1102. For example, wireless terminal B can quantize the signal received over symbols 2 and 3 as being associated with symbol 3. Moreover, while performing the quantization, wireless terminal B can employ a parity check to evaluate whether the received signal should be quantized to symbol 3 (or any disparate symbol). Accordingly, utilization of the reserved symbols can mitigate an impact associated with timing ambiguity since inserted space can be used to detect timing offset and/or recover from the timing offset.

In accordance with the example where a segment can include one reserved symbol and seven symbols for communicating ID information, the reserved symbol can enable adjusting timing of the seven symbols at the receiving wireless terminal. Thus, if the receiving wireless terminal detects that a received symbol starts and/or ends during the reserved symbol of the segment, the seven symbols can be shifted to recover from the symbol offset. Accordingly, the receiving wireless terminal can employ the reserved symbol to determine an appropriate shift to apply to obtained signals to account for offset, and thereby allow for deciphering the identifier of the transmitting wireless terminal during peer discovery. Moreover, it is to be appreciated that any ratio of reserved symbols to non-reserved symbols can be employed, and the reserved symbols can enable detecting and/or recovering from timing offset.

Figure 12:
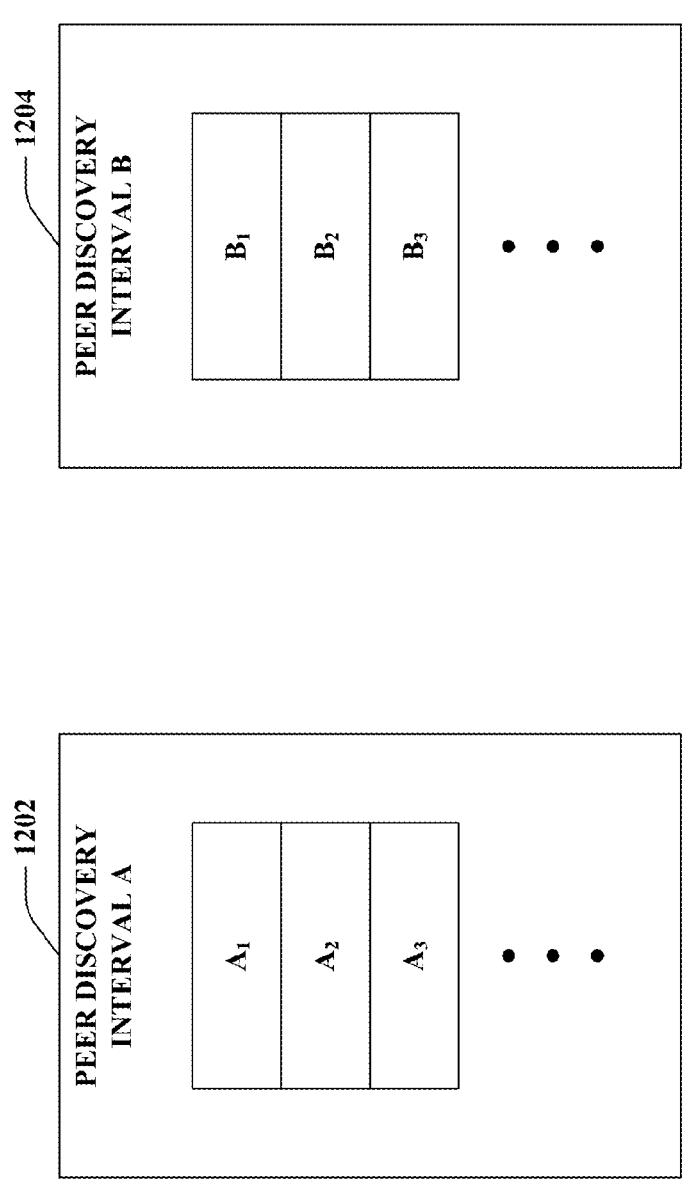
FIG. 12 is an illustration of a graphical example depicting transfer of partial identifiers over a plurality of peer discovery intervals to communicate a complete identifier for peer discovery.

Turning to FIG. 12, illustrated is a graphical example 1200 depicting transfer of partial identifiers over a plurality of peer discovery intervals to communicate a complete identifier for peer discovery. Pursuant to an illustration, an identifier (e.g., with or without parity bits) of a wireless terminal can be larger than an available amount of space associated with a resource of a peer discovery interval, and thus, more than one peer discovery interval can be utilized to signal portions of the identifier (e.g., any number of partial identifiers). Following this illustration, 32 bits can be reserved for communicating the identifier of a wireless terminal, yet the identifier can be larger than 32 bits (e.g., all bits of the complete identifier are unable to fit into the limited space). According to another example, wireless terminals can have multiple identifiers (e.g., related to work life, social life, virtual life, etc. of users of the wireless terminals). Moreover, these multiple identifiers can be transmitted one at a time, hashed into a common identifier, etc., and accordingly, a number of bits greater than a size of available space provided by a resource of a peer discovery interval can be transferred.

A receiving wireless terminal can observe partial identifiers during two peer discovery intervals pursuant to the illustrated example; however, it is to be appreciated that the claimed subject matter is not so limited as identifiers can be communicated over any number of peer discovery intervals. During peer discovery interval A 1202, any number of partial identifiers (e.g., $A_1, A_2, A_3, \ldots$) can be obtained. Moreover, during peer discovery interval B 1204, any number of partial identifiers (e.g., $B_1, B_2, B_3, \ldots$) can be obtained. Peer discovery interval A 1202 and peer discovery interval 1204 can be adjacent to one another in time. It is contemplated that the number of partial identifiers observed in peer discovery interval A 1202 can be the same and/or different from the number of partial identifiers observed in peer discovery interval B 1204. However, determining correspondence at the receiving wireless terminal between a first partial identifier communicated during peer discovery interval A 1202 and a second partial identifier communicated during peer discovery interval B 1204 can be difficult at best employing conventional techniques. For example, partial identifier $A_1$ and partial identifier $B_3$ can be related such that a common source (e.g., transmitting wireless terminal) generated and/or signaled such information; however, while employing traditional techniques, the receiving wireless terminal can be unable to decipher such correlation (e.g., link) there between. According to an illustration, coding set forth in relation to FIG. 8 can be employed to link information between peer discovery intervals; however, the claimed subject matter is not so limited.

Figure 13:
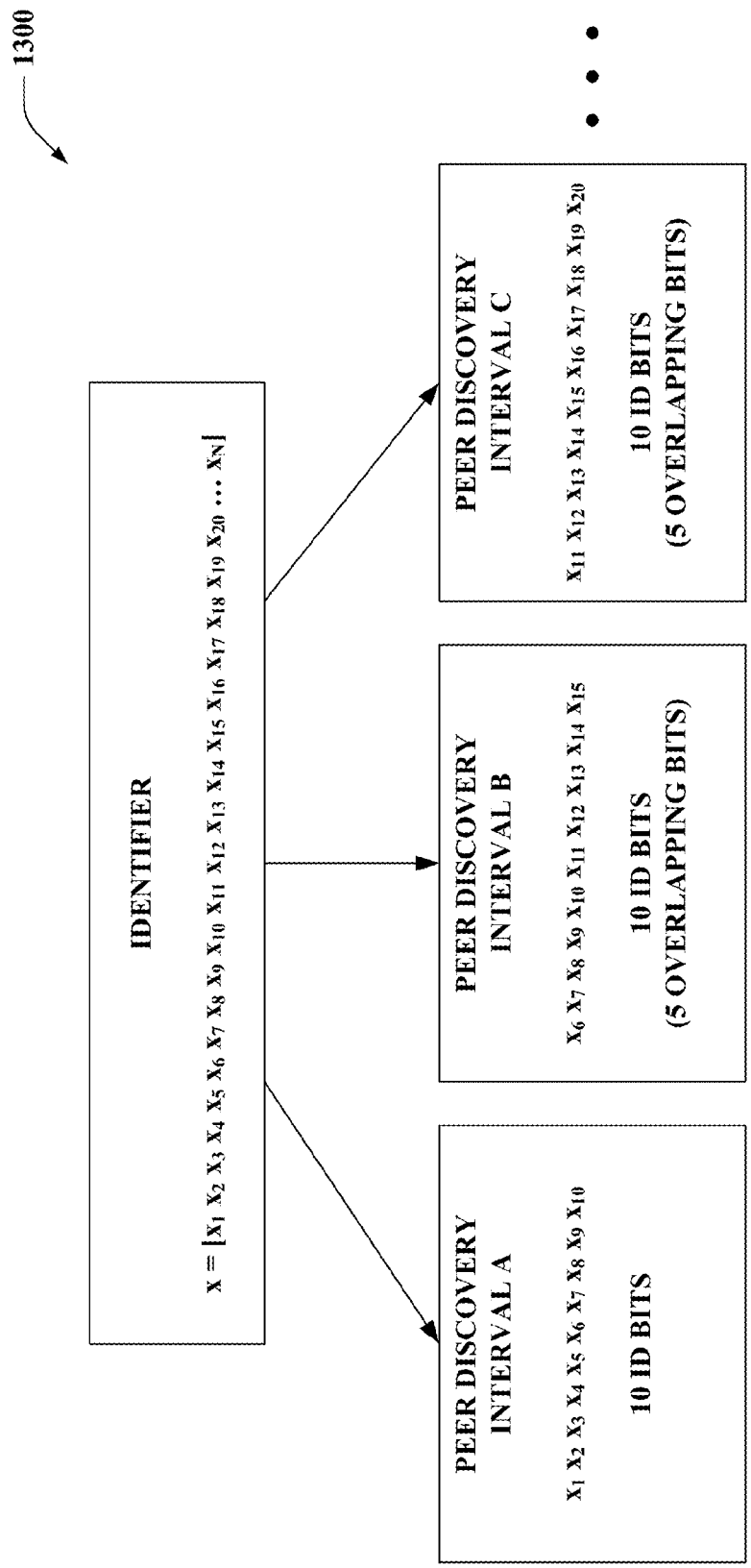
FIG. 13 is an illustration of another example graphical depiction of a linking scheme for communicating an identifier over a plurality of peer discovery intervals.

Referring to FIG. 13, illustrated is another example graphical depiction of a linking scheme 1300 for communicating an identifier over a plurality of peer discovery intervals. The identifier can include N bits, where N can be any integer. For example, the identifier can be a coded ID, a raw ID, a plurality of identifiers, a hash value associated with a plurality of identifiers, and so forth. The N bit identifier can be signaled as a sequence of partial identifiers over a series of any number of peer discovery intervals (e.g., peer discovery interval A, peer discovery interval B, peer discovery interval C, . . . ) such that a receiving wireless terminal can obtain, reassemble and/or decode the sequence of partial identifiers to determine the identifier there from.

According to this example, a first 10 bits of the identifier can be signaled in a first peer discovery interval (e.g., peer discovery interval A); although this example describes signaling 10 bits during each peer discovery interval, it is contemplated that any number of bits other than 10 can be communicated during each peer discovery interval. Further, for instance, any type of mapping scheme can be employed to communicate the 10 bits transferred during peer discovery interval A (and any of the subsequent peer discovery intervals). During a next (e.g., second) peer discovery interval (e.g., peer discovery interval B), 10 bits of the identifier can be signaled. A subset of the 10 bits signaled during the second peer discovery interval can overlap with a portion of the first 10 bits signaled during the first peer discovery interval. For example, a first 5 bits signaled during the second peer discovery interval can match the last 5 bits signaled during the first peer discovery interval; however, it is contemplated that any amount of overlap between peer discovery intervals can be employed. For instance, any type of linear constraint (e.g., any number of bits of a partial identifier can overlap with bits from a previous and/or subsequent partial identifier) can be employed when generating the partial identifiers to enable the receiving wireless terminal to understand how to reassemble the partial identifiers communicated over a plurality of peer discovery intervals to recreate the identifier. Thereafter, during a third peer discovery interval (e.g., peer discovery interval C), 10 bits of the identifier can be signaled, where a subset of the 10 bits (e.g., 5 bits) can overlap with bits included in peer discovery interval B. Moreover, any number of partial identifiers can be signaled thereafter in any number of peer discovery intervals to enable communicating the set of bits included in the identifier.

Figure 14:
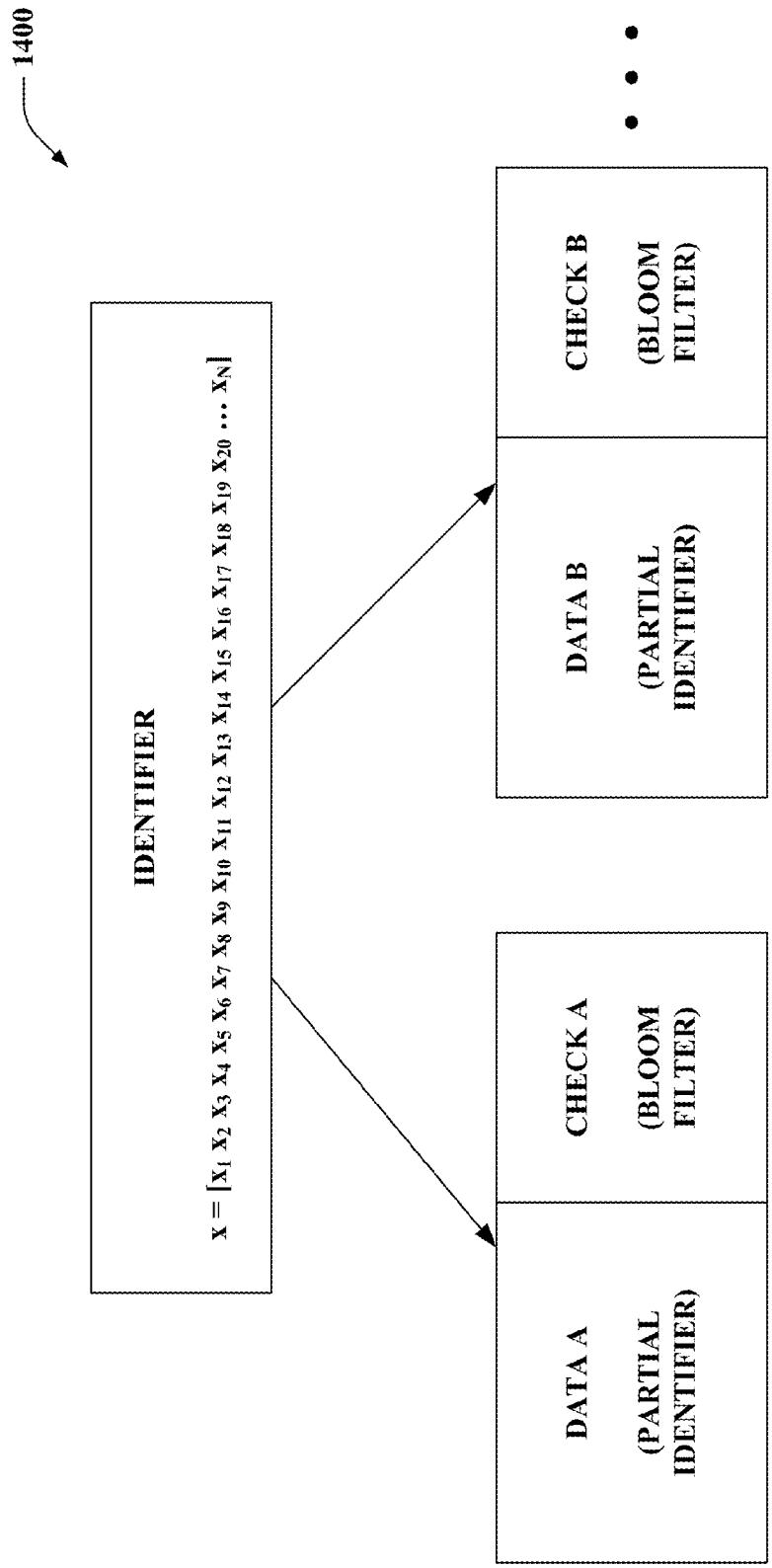
FIG. 14 is an illustration of an example graphical depiction of a scheme that employs a bloom filter to verify whether an identifier is communicated during peer discovery.

Turning to FIG. 14, illustrated is an example graphical depiction of a scheme 1400 that employs a bloom filter to verify whether an identifier is communicated during peer discovery. The bloom filter can be employed to determine whether the identifier is transmitted or not. According to an illustration, a transmitting wireless terminal can input its identifier into the bloom filter to yield a corresponding sequence (e.g., of ones and zeros); in particular, location(s) of ones in the sequence can be checked at a receiving wireless terminal to determine with a certain probability that such identifier was transmitted. In particular, the bloom filter can be employed to enable linking partial identifiers.

As illustrated, a first partial identifier can be transferred during peer discovery interval A and a second partial identifier can be transferred during a next peer discovery interval B; also, any number of additional partial identifiers can be communicated during subsequent peer discovery intervals. For instance, the first partial identifier can include 10 bits and the second partial identifier can include another 10 bits; yet, it is contemplated that the partial identifiers can include any number of bits as the claimed subject matter is not so limited. The partial identifiers can overlap such that X bits of the first partial identifier are to match X bits of the second partial identifier; however, it is contemplated that the partial identifiers can be non-overlapping (e.g., the first partial identifier includes a first 10 bits of an identifier and the second partial identifier includes the next 10 bits of the identifier).

Additionally, bloom filter information can be signaled along with the partial identifier during each peer discovery interval. For instance, check B can relate to the partial identifier communicated during peer discovery interval B (e.g., data B) as well as the partial identifier communicated during the previous peer discovery interval (e.g., data A signaled during peer discovery interval A). Thus, the combination of these partial identifiers can be verified based upon the bloom filter information in check B. Hence, if two non-matching partial identifiers are combined at the receiving wireless terminal and evaluated through a bloom filter, the resultant derived information can differ from the bloom filter information included in the check B (e.g., to determine that such a combination of partial identifiers is incorrect). Moreover, it is to be appreciated that a combination of any number of partial identifiers can be evaluated with a particular bloom filter check to link the partial identifiers signaled during differing peer discovery intervals, and the claimed subject matter is not limited to checking two partial identifiers as described above. Pursuant to another illustration, the bloom filter check information can be signaled with a subset of the partial identifiers as opposed to with each partial identifier as shown.

The following provides an additional example; however, it is contemplated that the claimed subject matter is not so limited. A peer discovery slot can be divided into two halves. In the first half, wireless terminals can advertise a portion of their ID by transmitting on the corresponding time-frequency square. Between peer discovery slots there can be a certain amount of overlap in the ID portions advertised. By looking at several peer discovery slots, wireless terminals can link together the ID portions of their peers. The second half of the slot can have a particular structure that can assist in the linkage procedure. Also, overlapped sections of the ID portions can also assist in the linkage procedure.

Each wireless terminal can take its 32 bit ID and append 8 parity checks to an end to form a 40 bit coded ID. The coded ID can be denoted $x=[x_0, \ldots, x_{39}]$. In discovery slot t, each wireless terminal can form a 10 bit segment of its ID: $y_t=[x_{5t \bmod 39}, x_{5t+1 \bmod 39}, \ldots, x_{5t+9 \bmod 39}]$. Note that segments $y_t$ and $y_{t+1}$ overlap by 5 bits and that $y_t$ is periodic in t. Denote $z_t=[x_{5t \bmod 39}, x_{5t+1 \bmod 39}, \ldots, x_{5t+14 \bmod 39}]$.

The peer discovery slot can be divided into two halves: A and B. The first half can be further subdivided into two sections: A1 and A2. In sections A1 and A2, there can be 64×16=1024 time-frequency squares. The time-frequency squares of section A1 can be associated with a random permutation of the integers {0, ..., 1023}. The time-frequency squares of section A2 can be associated with a different random permutation of the integers {0, ..., 1023}.

During the A half of the discovery slot t, each wireless terminal transmits once in section A1 and once in section A2, each time on the time-frequency square corresponding to its 10 bit ID segment, $y_t$. Note that these squares tend to be different (with high probability).

The B half of the discovery slot can include 64×32=2048 time-frequency squares. Each 15 bit ID segment can be associated with a random 5 square subset of the 2048 squares. Note that there are 2048 choose 5 such subsets and $2^{20}$ possible 20 bit ID segments. During the B half of discovery slot t, each wireless terminal can transmit on the 5 time-frequency squares of the subset associated with its 15 bit ID segment $z_t$.

To decode the IDs of its peers, a receiving wireless terminal can make a list of all 10 bit ID segments observed in either the A1 section or the A2 section of the first discovery slot it listens to. Further, the receiving wireless terminal can form a similar list for the second discovery slot. Then, the receiving wireless terminal can attempt to link the two collections of 10 bit IDs. For example, the receiving wireless terminal can look for pairs of IDs for which the last 5 bits of the first ID match the first 5 bits of the second ID.

Once a match is located, a check can be performed upon the associated 5 time-frequency squares in the B section of the second discovery window. If all 5 squares are received with sufficient power, the associated 15 bit ID can be written into a concatenation list. If one or more of the 5 squares in the B section are not received with sufficient power, the 15 bit ID can be discarded. For those squares that cannot be checked due to the wireless terminal simultaneously transmitting during that symbol time, the wireless terminal can assume the transmission took place. Once two ID segments have been linked, the wireless terminal can proceed to a third discovery slot. The wireless terminal can create a list of all 10 bit ID segments observed in either the A1 or the A2 sections. For those 10 bit ID segments whose last 5 bits overlap with the last five bits of one of the ID on the concatenation list, the mobile checks the B section of the current discovery slot. If the 5 time frequency squares associated with the bit ID are all checked, the wireless terminal can extend the 15 bit ID to a 20 bit ID by adding the last 5 bits of the current segment. The wireless terminal can then proceed to the fourth window, and so forth, until the IDs in the concatenation list are 40 bits long (or any length associated with a coded ID utilized in connection therewith). At this point, the wireless terminal can check the 8 parity bits of the 40 bit ID on the concatenation list. If all parity checks pass, the 32 bit ID can be written into a peer discovery list. Then, the discovery procedure can restart again to add additional IDs to the peer discovery list, and so forth.

Figure 15:
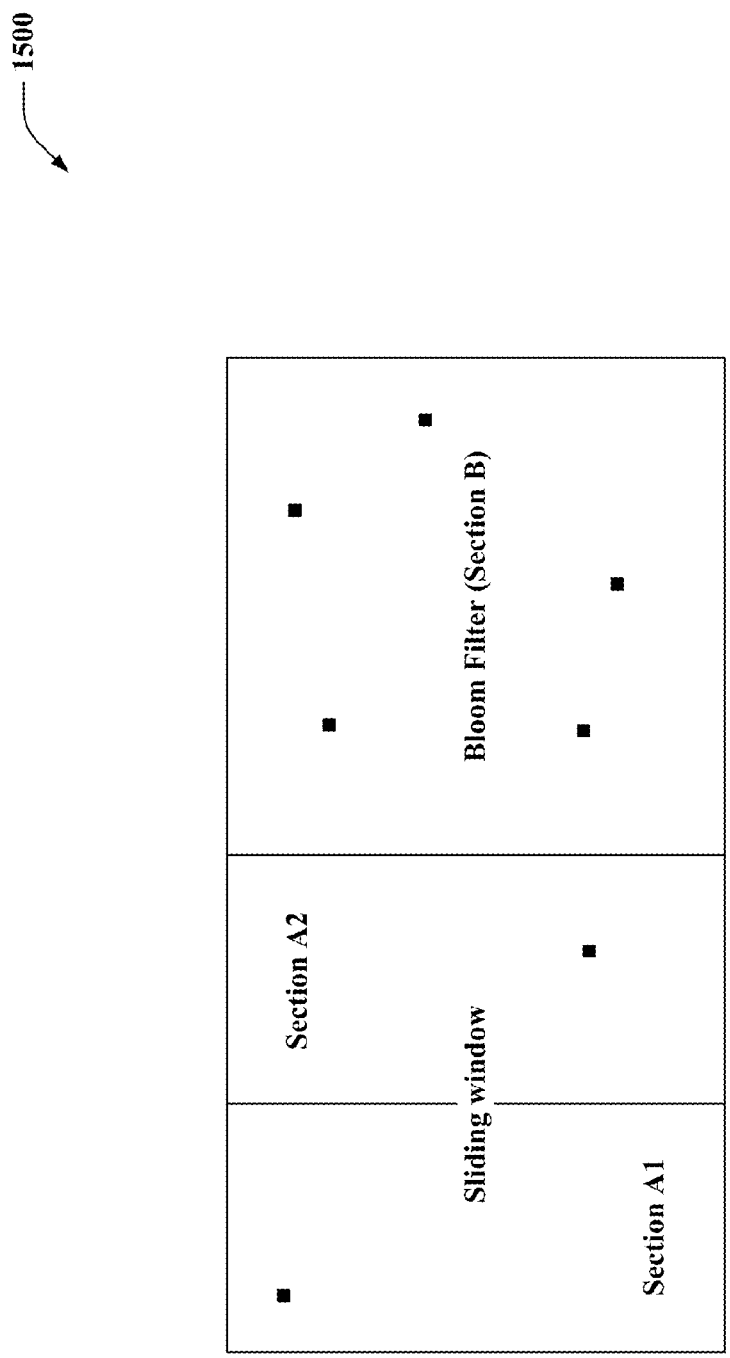
FIG. 15 is an illustration of an example graphical depiction of a sliding window and a bloom filter.

With reference to FIG. 15, illustrated is an example graphical depiction 1500 of a sliding window and a bloom filter. A time-frequency square corresponding to the 10 bit ID segment $y_t$ can be included in each section A1 and A2. Additionally, a subset of time-frequency squares corresponding to a 15 bit ID segment $z_t$ can be included in section B. The A half can be referred to as the sliding window component of the discovery slot as peers use it to advertise a segment of their ID corresponding to a sliding window. The B half can be referred to as the bloom filter component as this can implement the bloom filter operation. Both the sliding window and the bloom filter can be used to link the 10 bit ID segments. The 8 parity check bits can be used to reduce the false alarm rate. The reason the sliding window component can be repeated in two halves, A1 and A2, is for frequency diversity. When the channel is frequency selective and the tone of one of the sliding window transmissions of a particular peer falls into a null, the entire seven discovery slots can be wasted (for the purpose of learning the full ID of that peer).

Referring to FIGS. 16-23, methodologies relating to performing peer discovery within a peer-to-peer network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 16:
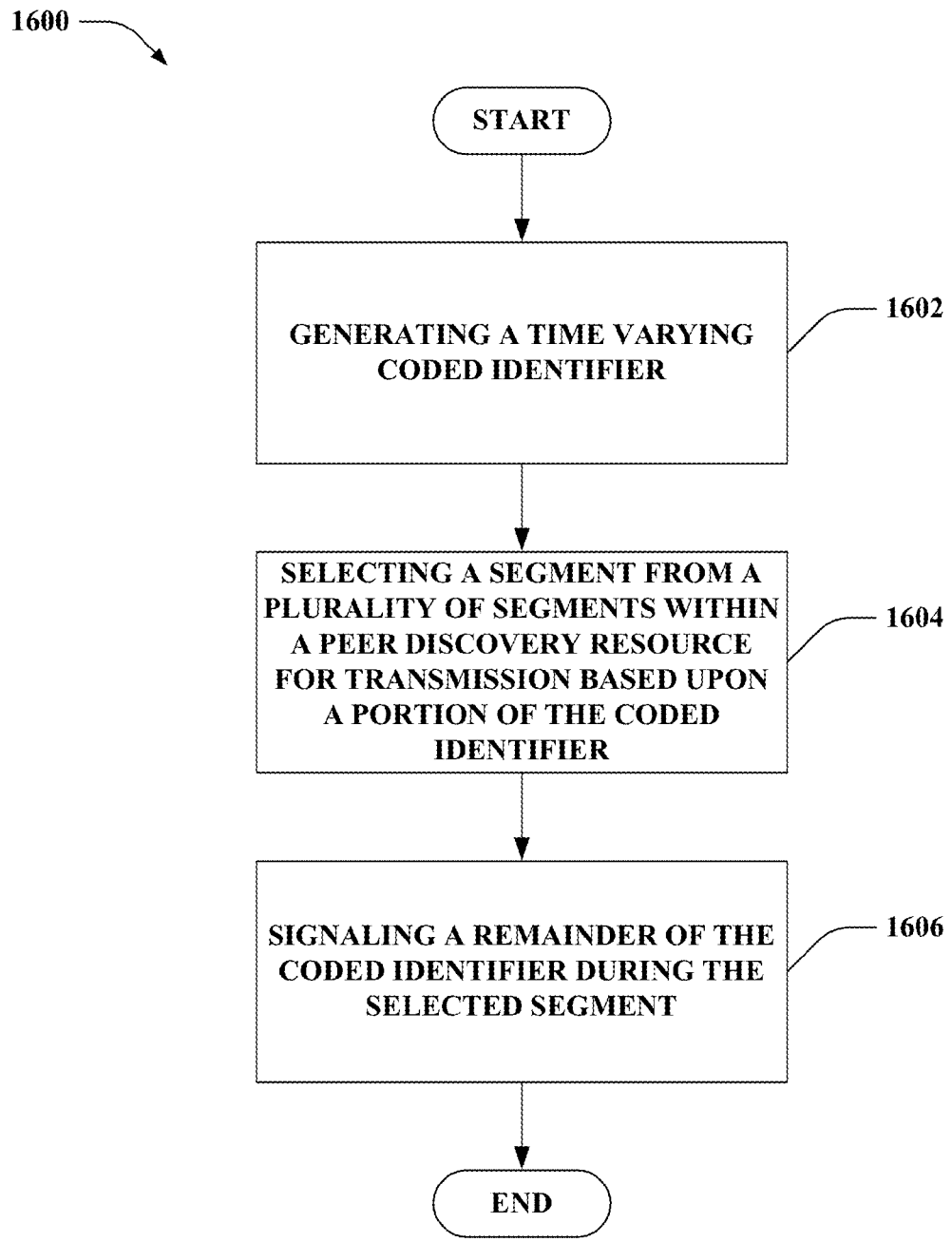
FIG. 16 is an illustration of an example methodology that facilitates directly signaling an identifier during peer discovery.

Turning to FIG. 16, illustrated is a methodology 1600 that facilitates directly signaling an identifier during peer discovery. At 1602, a time varying coded identifier can be generated. For example, a transmitting wireless terminal can be associated with a 32 bit identifier. Moreover, an additional 13 bits that can vary with time (or a portion of which can be time varying) can be added to the original 32 bit identifier to yield a 45 bit coded identifier. However, it is contemplated that the claimed subject matter is not so limited. Further, for instance, the coded identifier can be partitioned into seven 6 bit groups and one 3 bit group. At 1604, a segment from a plurality of segments with a peer discovery resource can be selected based upon a portion of the coded identifier. According to an illustration, the resource can be 64 tones by 64 symbols. Further, the resource can be partitioned into 8 segments, each of which can include 8 symbols (e.g., and the corresponding tones). For example, the segment can be selected based upon the 3 bit group included in the coded identifier; therefore, the segment selected can signal the 3 bit group of the coded identifier. Moreover, the selected segment can vary during differing peer discovery intervals; thus, colliding wireless terminals that transmit concurrently during a peer discovery interval can obtain identifiers of each other during a subsequent peer discovery interval (e.g., due to the half duplex nature of peer discovery where a wireless terminal either transmits or receives at a particular time). At 1606, the remainder of the coded identifier can be signaled during the selected segment. For example, seven tones can be transmitted during the selected segment, where each tone can be signaled upon a disparate symbol within such segment; thus, each tone can provide 6 bits of the identifier thereby enabling communication of the seven 6 bit groups of the coded identifier. Additionally, the eighth symbol in the segment can be a reserved (e.g., unused) symbol.

Figure 17:
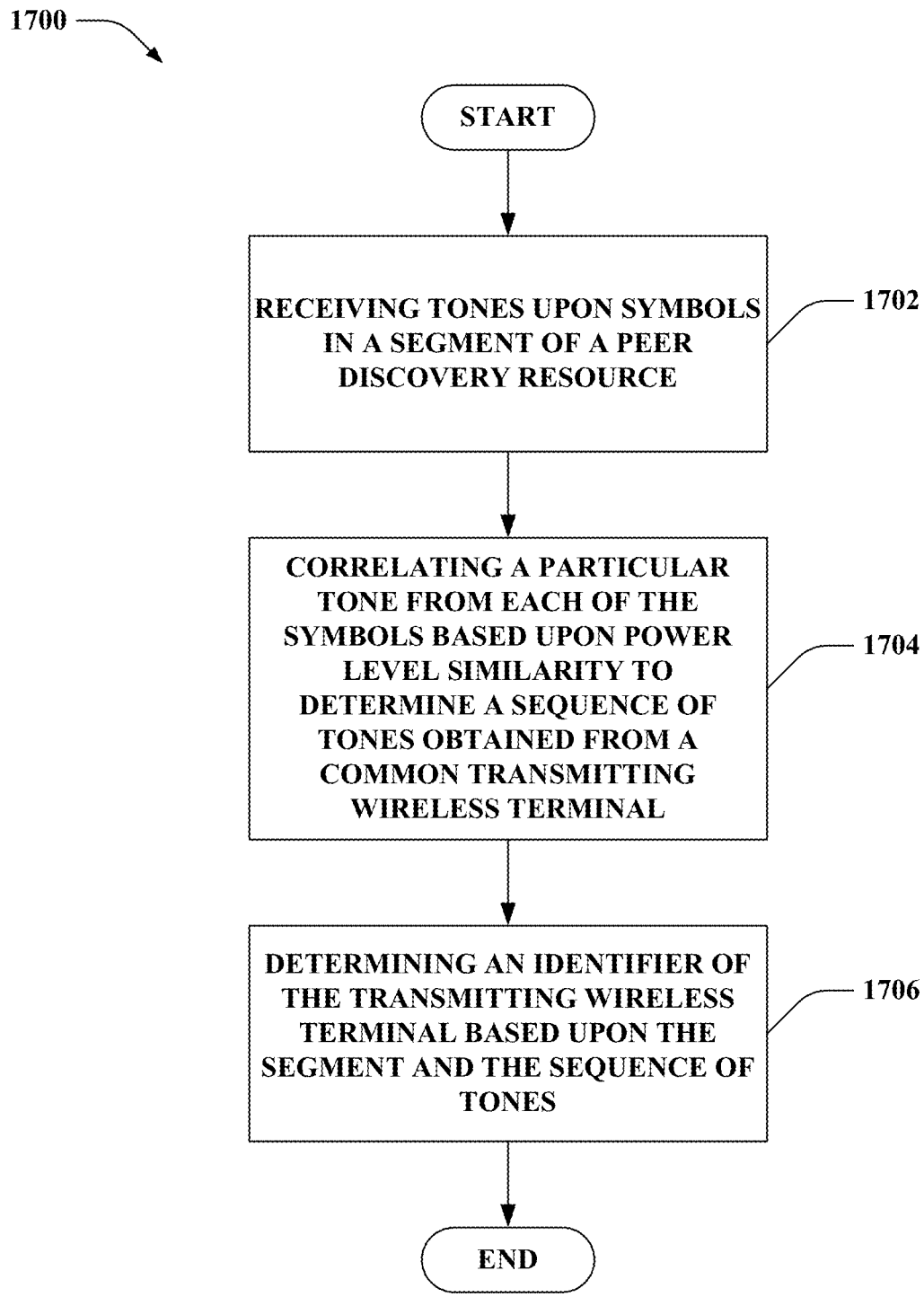
FIG. 17 is an illustration of an example methodology that facilitates decoding a directly signaled identifier during peer discovery.

Now turning to FIG. 17, illustrated is a methodology 1700 that facilitates decoding a directly signaled identifier during peer discovery. At 1702, tones can be received upon symbols in a segment of a peer discovery resource. For example, the segment can include 8 symbols, and the resource can include 8 segments; yet, the claimed subject matter is not so limited. It is contemplated that any number of tones can be obtained upon each of the symbols. At 1704, a particular tone from each of the symbols can be correlated based upon power level similarity to determine a sequence of tones obtained from a common transmitting wireless terminal. For example, the highest energy tone upon each of the symbols in the segment can form the sequence. Moreover, any tone with a substantially different energy level can be removed from the sequence as energy levels of tones from a common source tend to be similar (e.g., since a transmitting wireless terminal sends the tones at a substantially similar energy level). It is contemplated that any number of sequences can be formed from within the segment, and each of these sequences can yield a disparate peer identifier. At 1706, an identifier of the transmitting wireless terminal can be determined based upon the segment and the sequence of tones. For example, identity of the segment out of a set of segments within the peer discovery resource can be decoded to yield a portion of the identifier. Moreover, the tones in the sequence can be decoded to obtain the remainder of the identifier. Additionally, parity checks upon the coded identifier can be performed and, if successful, a raw identifier corresponding to the coded identifier can be added to a peer list.

Figure 18:
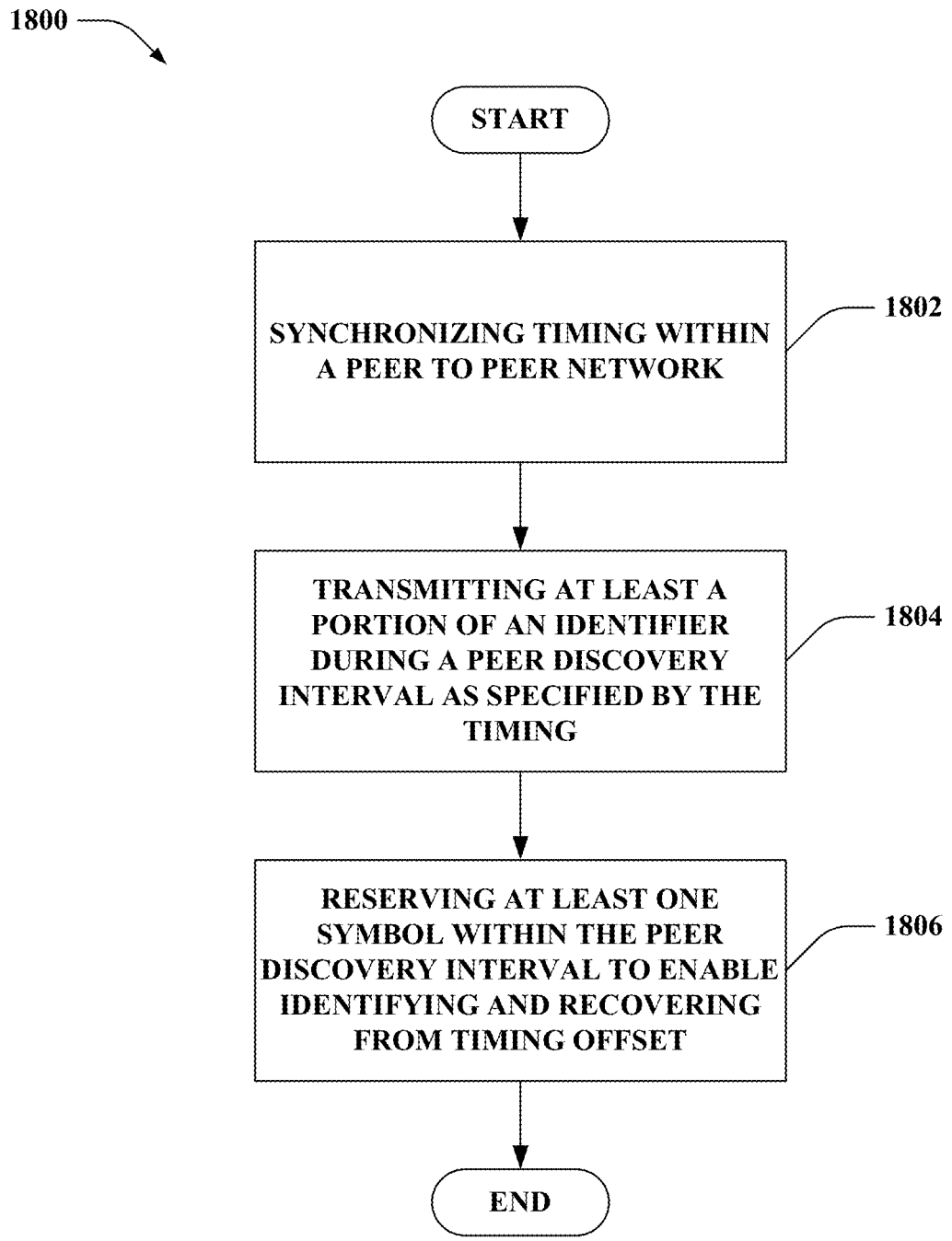
FIG. 18 is an illustration of an example methodology that facilitates incorporating reserved symbols within a peer discovery interval.

Referring to FIG. 18, illustrated is a methodology 1800 that facilitates incorporating reserved symbols within a peer discovery interval. At 1802, timing within a peer to peer network can be synchronized. For example, a transmitting wireless terminal and a receiving wireless terminal can synchronize operation (e.g., based upon a common clock reference); however, offset can exist between timing of these wireless terminals. At 1804, at least a portion of an identifier can be transmitted during a peer discovery interval as specified by the timing (e.g., of the transmitting wireless terminal). For example, a coded identifier can be generated by including time varying bits therein. Moreover, it is contemplated that the identifier can be signaled in any manner (e.g., utilizing direct signaling, transfer partial identifiers with overlap and/or that employ bloom filter information, . . . ). At 1806, at least one symbol within the peer discovery interval can be reserved to enable identifying and recovering from timing offset. The reserved symbol can be an unused (e.g., null) symbol. According to an example, one symbol within a segment (e.g., a last symbol in each segment) can be reserved for direct signaling.

Figure 19:
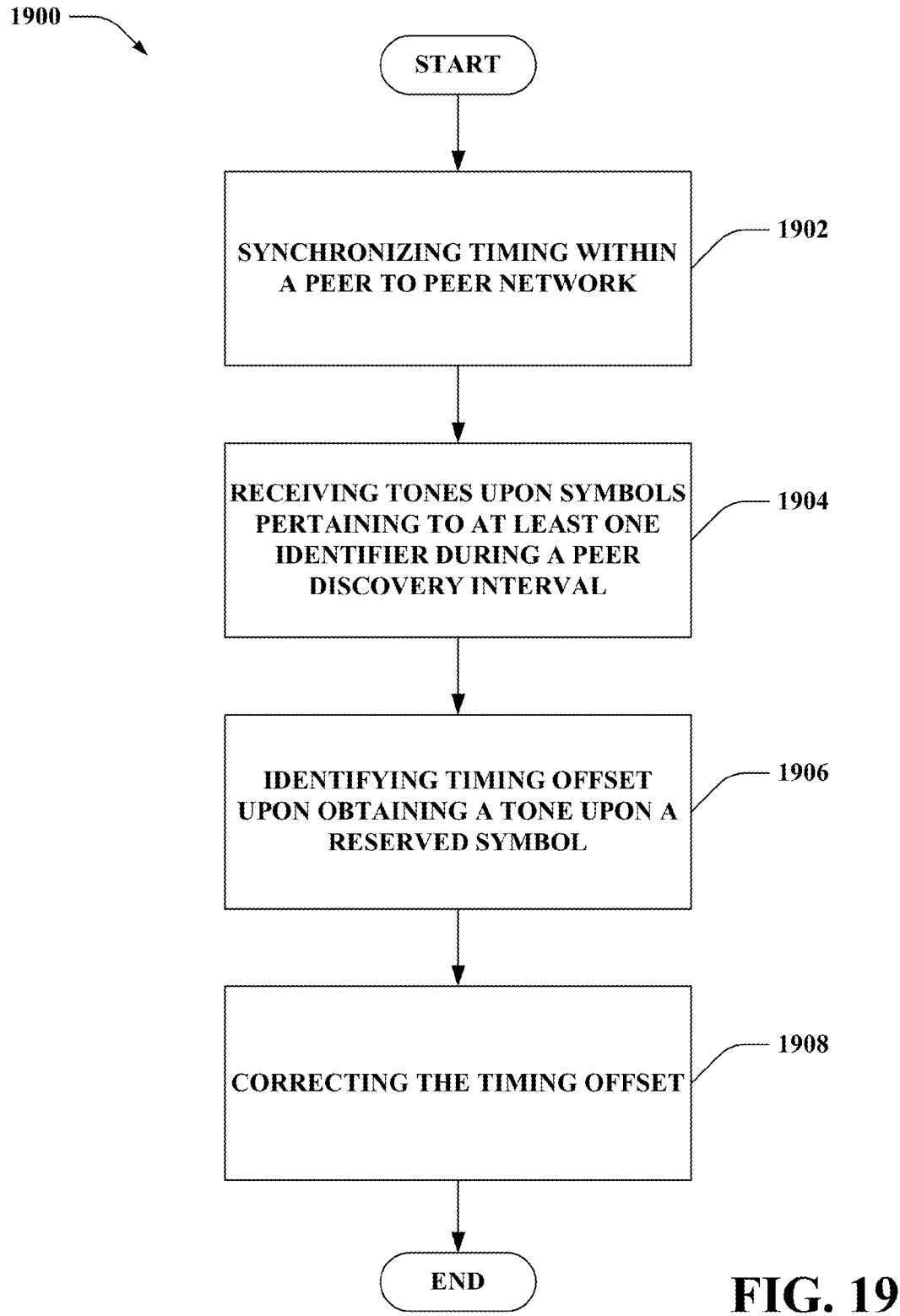
FIG. 19 is an illustration of an example methodology that facilitates shifting timing to mitigate offset within peer discovery.

Turning to FIG. 19, illustrated is a methodology 1900 that facilitates shifting timing to mitigate offset within peer discovery. At 1902, timing within a peer to peer network can be synchronized. At 1904, tones can be received upon symbols pertaining to at least one identifier during a peer discovery interval. At 1906, timing offset can be identified upon obtaining a tone upon a reserved symbol. For example, if a tone is obtained during a time associated with the reserved symbol, offset can be recognized. At 1908, the timing offset can be corrected. For example, the timing of the received tones can be shifted to align a received null with an expected null associated with the reserved symbol.

Figure 20:
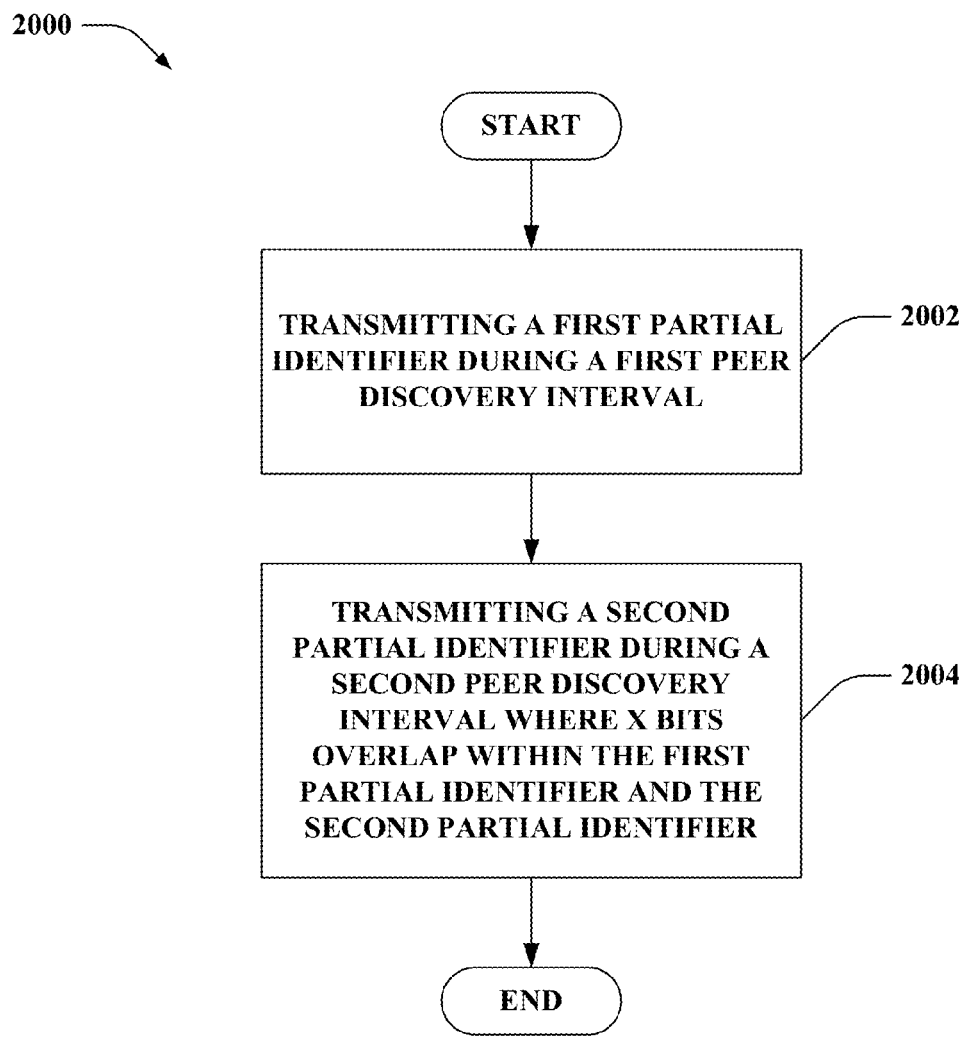
FIG. 20 is an illustration of an example methodology that facilitates signaling an identifier over a plurality of peer discovery intervals.

With reference to FIG. 20, illustrated is a methodology 2000 that facilitates signaling an identifier over a plurality of peer discovery intervals. At 2002, a first partial identifier can be transmitted during a first peer discovery interval. For example, an uncoded identifier can include 32 bits, and 8 parity bits can be added thereto to form a 40 bit coded identifier. However, it is contemplated that any size identifier (or plurality of identifiers) can be utilized in connection with the claimed subject matter. Moreover, the first partial identifier can include a first Y bits of the identifier (e.g., coded identifier, . . . ), where Y can be any integer. According to an example, Y can be 10; yet, the claimed subject matter is not so limited. At 2004, a second partial identifier can be transmitted during a second peer discovery interval where X bits overlap within the first partial identifier and the second partial identifier. Further, X can be any integer less than or equal to Y. Moreover, the second partial identifier can comprise Y bits (e.g., 10 bits) in total including the X (e.g., 5) overlapping bits. Additionally, the overlapping bits can enable a receiving wireless terminal to link the first partial identifier and the second partial identifier together.

Figure 21:
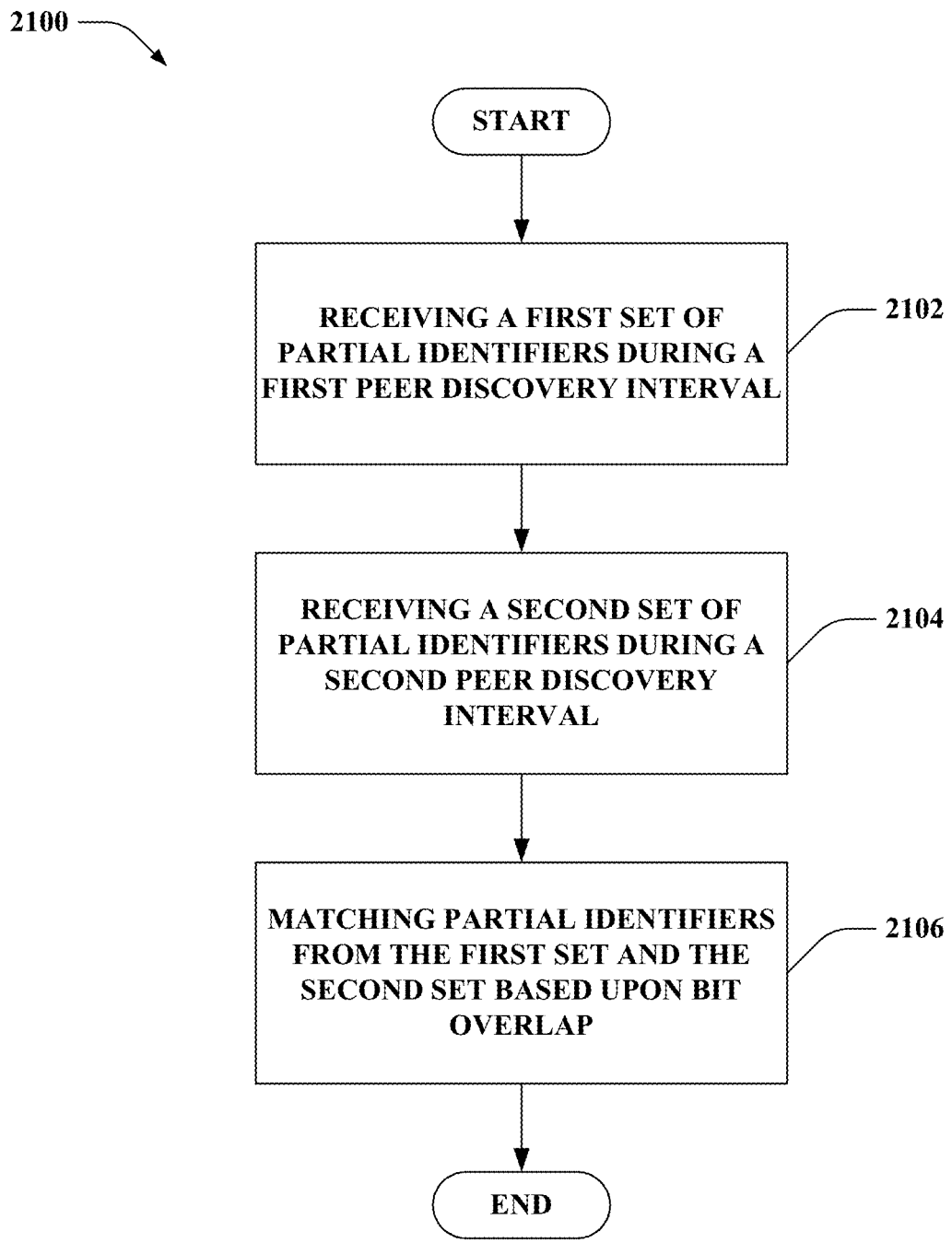
FIG. 21 is an illustration of an example methodology that facilitates linking partial identifiers obtained during differing peer discovery intervals based upon overlapping information.

Referring now to FIG. 21, illustrated is a methodology 2100 that facilitates linking partial identifiers obtained during differing peer discovery intervals based upon overlapping information. At 2102, a first set of partial identifiers can be received during a first peer discovery interval. At 2104, a second set of partial identifiers can be received during a second peer discovery interval. For example, the first peer discovery interval and the second peer discovery interval can be adjacent peer discovery intervals. Moreover, it is contemplated that any number of partial identifiers can be included in the first set and the second set, and the sets can be of equal or differing size. At 2106, partial identifiers from the first set and the second set can be matched based upon bit overlap. For example, a last X bits of a partial identifier in the first set can match a first X bits of a partial identifier in the second set; hence, these partial identifiers can be linked to one another. Moreover, any number of additional sets of partial identifiers can be similarly received and linked to yield complete identifiers of peers.

Figure 22:
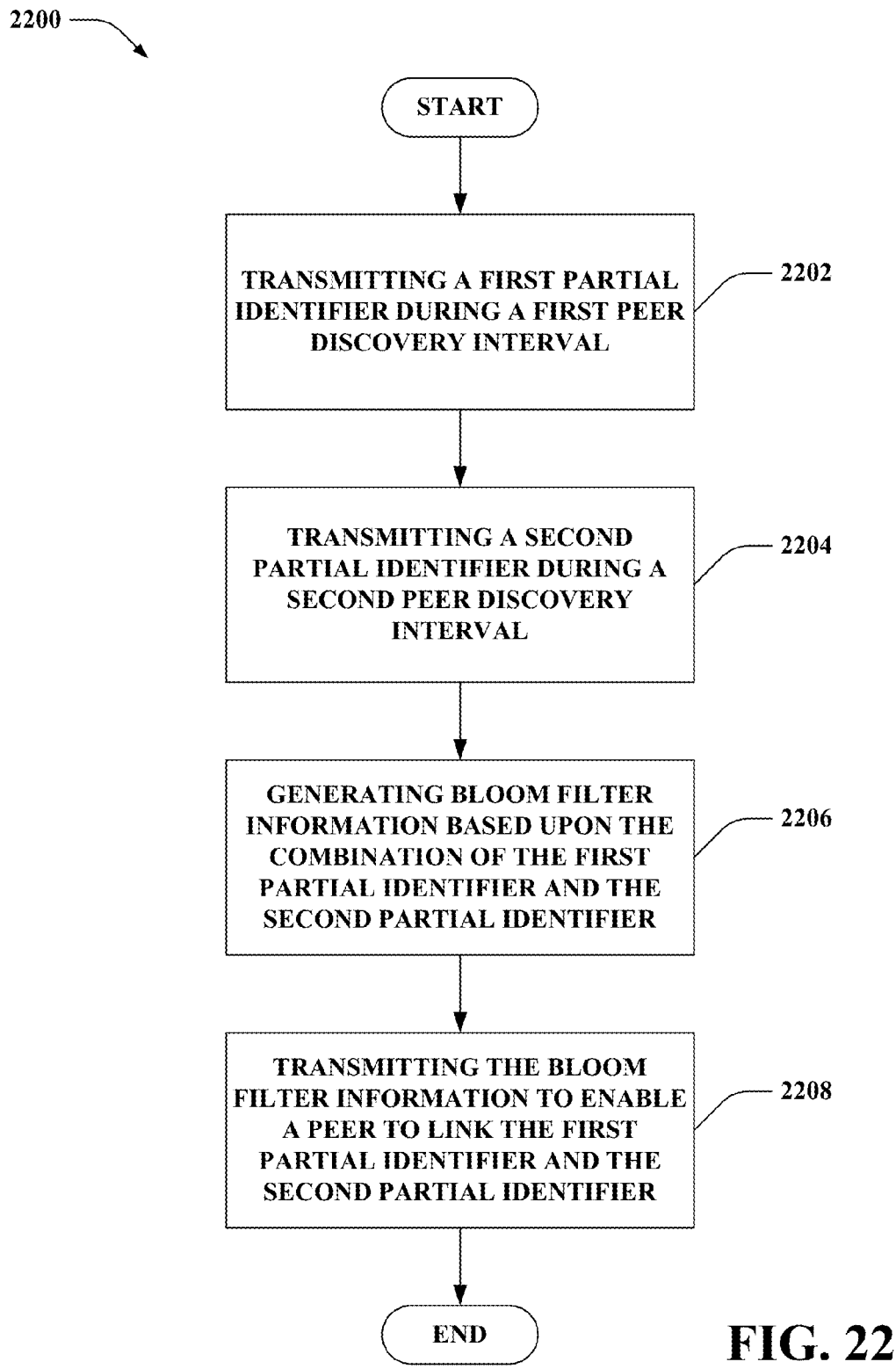
FIG. 22 is an illustration of an example methodology that facilitates employing a bloom filter while signaling partial identifiers for peer discovery.

Now turning to FIG. 22, illustrated is a methodology 2200 that facilitates employing a bloom filter while signaling partial identifiers for peer discovery. At 2202, a first partial identifier can be transmitted during a first peer discovery interval. At 2204, a second partial identifier can be transmitted during a second peer discovery interval. For example, the first partial identifier can include a first Y bits of an identifier, the second partial identifier can include a next Y bits of the identifier, and so forth, where Y can be any integer (e.g., Y can be 10). According to another illustration, the partial identifiers can overlap one another (e.g., X bits can overlap between partial identifiers communicated during adjacent peer discovery intervals). At 2206, bloom filter information can be generated based upon the combination of the first partial identifier and the second partial identifier. For example, the combination of the partial identifiers can be input to the bloom filter to yield the bloom filter information. At 2208, the bloom filter information can be transmitted to enable a peer to link the first partial identifier and the second partial identifier. For example, the bloom filter information can be transmitted during the second peer discovery interval along with the second partial identifier; however, the claimed subject matter is not so limited. Moreover, the aforementioned can be repeated for additional partial identifiers to communicate the entirety of the identifier.

Figure 23:
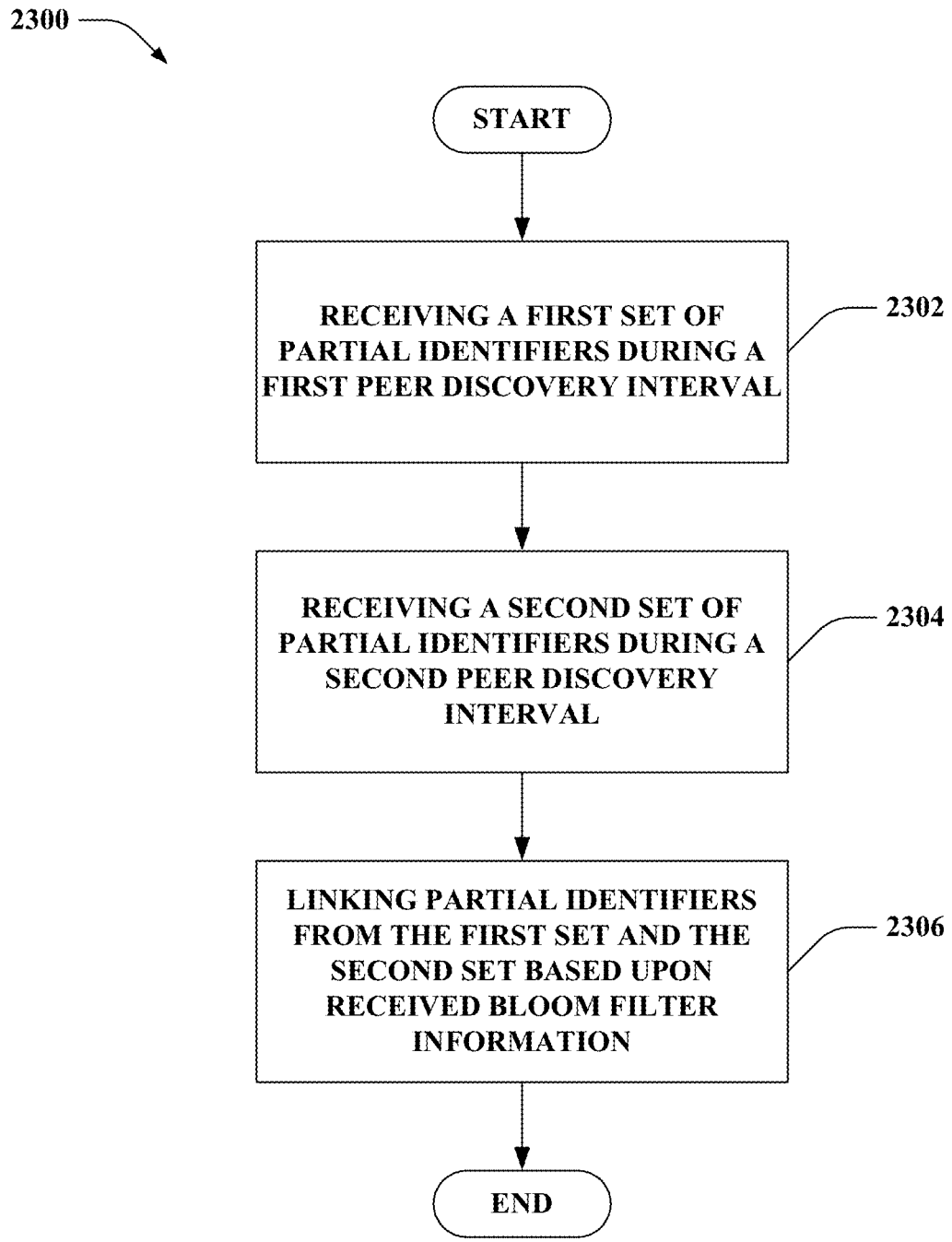
FIG. 23 is an illustration of an example methodology that facilitates employing a bloom filter to match partial identifiers.

Referring to FIG. 23, illustrated is a methodology 2300 that facilitates employing a bloom filter to match partial identifiers. At 2302, a first set of partial identifiers can be received during a first peer discovery interval. At 2304, a second set of partial identifiers can be received during a second peer discovery interval. It is contemplated that any number of partial identifiers can be received during the first peer discovery interval and/or the second peer discovery interval. At 2306, partial identifiers from the first set and the second set can be linked based upon received bloom filter information. For example, an identifier from the first set and an identifier from the second set can be combined and inputted to a bloom filter at the receiving wireless terminal, and the resultant information can be compared to the received bloom filter information. If the resultant information exists within the received bloom filter information, then a link is identified between such identifiers.

It will be appreciated that, in accordance with one or more aspects described herein, inferences can be made regarding discovering and identifying peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to synchronizing a peer discovery interval for utilization in connection with communicating via the peer-to-peer network. In accordance with another example, an inference may be made related to estimating a common notion of time from a broadcast signal in the peer-to-peer network. It will be appreciated that the foregoing examples are illustrative in nature and are not intended to limit the number of inferences that can be made or the manner in which such inferences are made in conjunction with the various embodiments and/or methods described herein.

Figure 24:
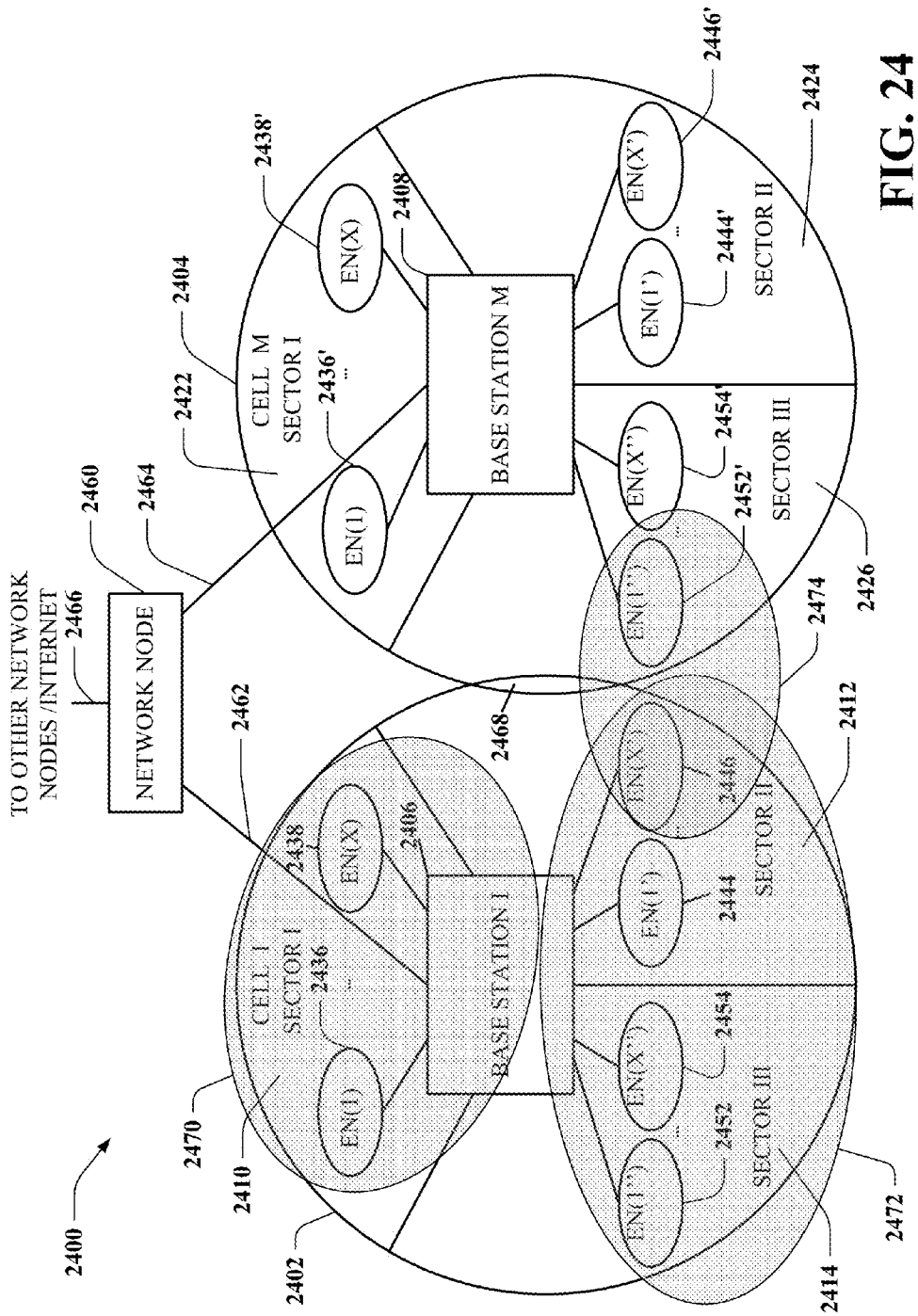
FIG. 24 is an illustration of an example communication system implemented in accordance with various aspects including multiple cells.

FIG. 24 depicts an example communication system 2400 implemented in accordance with various aspects including multiple cells: cell I2402, cell M 2404. Note that neighboring cells 2402, 2404 overlap slightly, as indicated by cell boundary region 2468. Each cell 2402, 2404 of system 2400 includes three sectors. Cells which have not been subdivided into multiple sectors (N=1), cells with two sectors (N=2) and cells with more than 3 sectors (N>3) are also possible in accordance with various aspects. Cell 2402 includes a first sector, sector I2410, a second sector, sector II 2412, and a third sector, sector III 2414. Each sector 2410, 2412, 2414 has two sector boundary regions; each boundary region is shared between two adjacent sectors.

Cell I 2402 includes a base station (BS), base station I 2406, and a plurality of end nodes (ENs) (e.g., wireless terminals) in each sector 2410, 2412, 2414. Sector I 2410 includes EN(1) 2436 and EN(X) 2438; sector II 2412 includes EN(1') 2444 and EN(X') 2446; sector III 2414 includes EN(1") 2452 and EN(X") 2454. Similarly, cell M 2404 includes base station M 2408, and a plurality of end nodes (ENs) in each sector 2422, 2424, 2426. Sector I 2422 includes EN(1) 2436' and EN(X) 2438'; sector II 2424 includes EN(1') 2444' and EN(X') 2446'; sector 3 2426 includes EN(1") 2452' and EN(X") 2454'.

System 2400 also includes a network node 2460 which is coupled to BS I 2406 and BS M 2408 via network links 2462, 2464, respectively. Network node 2460 is also coupled to other network nodes, e.g., other base stations, AAA server nodes, intermediate nodes, routers, etc. and the Internet via network link 2466. Network links 2462, 2464, 2466 may be, e.g., fiber optic cables. Each end node, e.g., EN(1) 2436 may be a wireless terminal including a transmitter as well as a receiver. The wireless terminals, e.g., EN(1) 2436 may move through system 2400 and may communicate via wireless links with the base station in the cell in which the EN is currently located. The wireless terminals, (WTs), e.g., EN(1) 2436, may communicate with peer nodes, e.g., other WTs in system 2400 or outside system 2400 via a base station, e.g., BS 2406, and/or network node 2460. WTs, e.g., EN(1) 2436 may be mobile communications devices such as cell phones, personal data assistants with wireless modems, etc.

Local area peer-to-peer communication may also be supported by communication system 2400. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 2470, 2472, and 2474. Although three peer-to-peer networks 2470-2474 are depicted, it is to be appreciated that any number, size, shape, etc. of peer-to-peer networks may be supported. For instance, each peer-to-peer network 2470-2474 may support transfer of signals directly between wireless terminals. Further, each peer-to-peer network 2470-2474 may include wireless terminals within a similar geographic area (e.g., within range of one another). For example, EN(1) 2436 may communicate with EN(X) 2438 by way of the local area peer-to-peer network 2470. However, it is to be appreciated that wireless terminals need not be associated with the same sector and/or cell to be included in a common peer-to-peer network. Further, peer-to-peer networks may overlap (e.g., EN(X') 2446 may leverage peer-to-peer networks 2472 and 2474). Additionally, some wireless terminals may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 25:
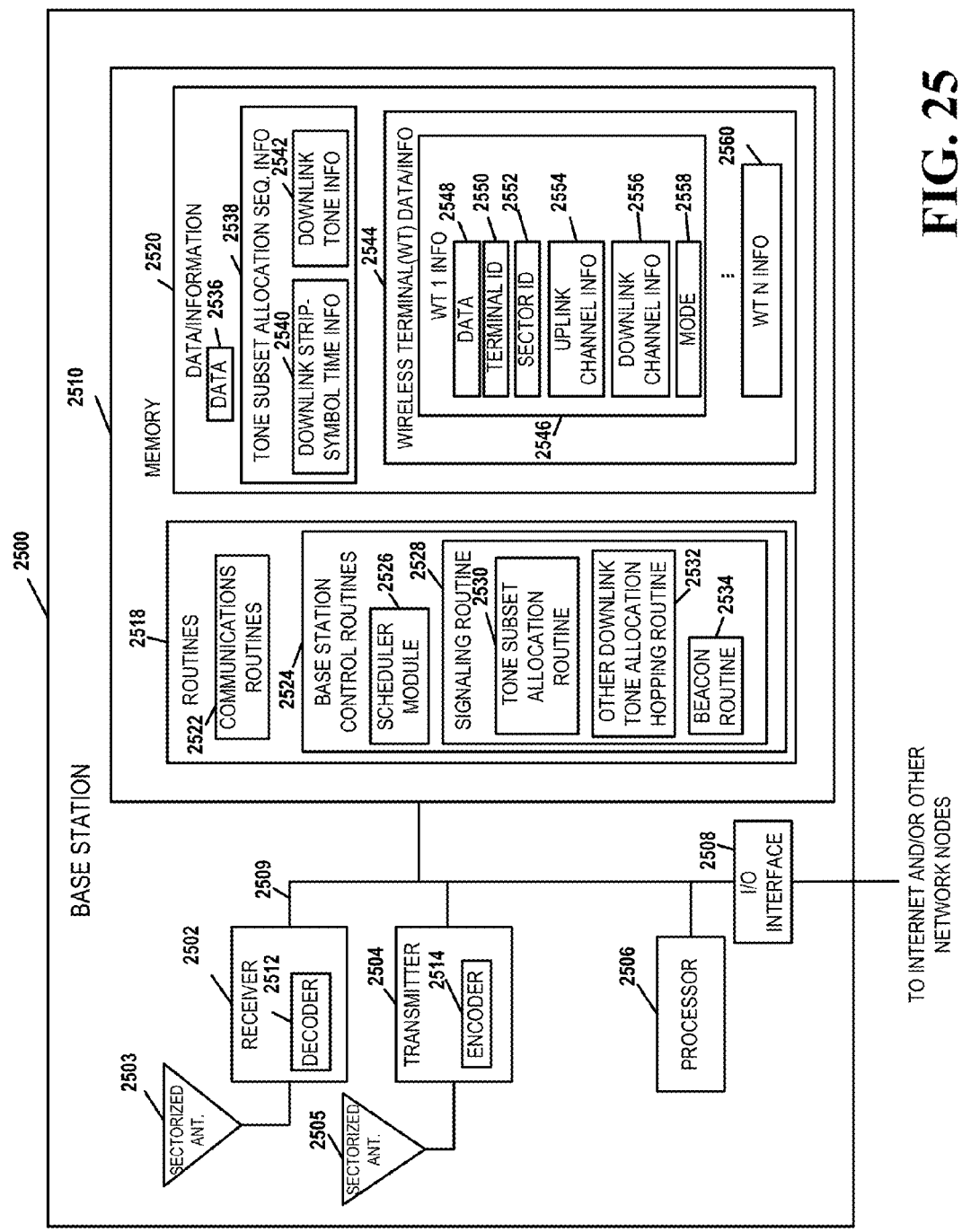
FIG. 25 is an illustration of an example base station in accordance with various aspects.

FIG. 25 illustrates an example base station 2500 in accordance with various aspects. Base station 2500 implements tone subset allocation sequences, with different tone subset allocation sequences generated for respective different sector types of the cell. Base station 2500 may be used as any one of base stations 2406, 2408 of the system 2400 of FIG. 24. The base station 2500 includes a receiver 2502, a transmitter 2504, a processor 2506, e.g., CPU, an input/output interface 2508 and memory 2510 coupled together by a bus 2509 over which various elements 2502, 2504, 2506, 2508, and 2510 may interchange data and information.

Sectorized antenna 2503 coupled to receiver 2502 is used for receiving data and other signals, e.g., channel reports, from wireless terminals transmissions from each sector within the base station's cell. Sectorized antenna 2505 coupled to transmitter 2504 is used for transmitting data and other signals, e.g., control signals, pilot signal, beacon signals, etc. to wireless terminals 2600 (see FIG. 26) within each sector of the base station's cell. In various aspects, base station 2500 may employ multiple receivers 2502 and multiple transmitters 2504, e.g., an individual receiver 2502 for each sector and an individual transmitter 2504 for each sector. Processor 2506, may be, e.g., a general purpose central processing unit (CPU). Processor 2506 controls operation of base station 2500 under direction of one or more routines 2518 stored in memory 2510 and implements the methods. I/O interface 2508 provides a connection to other network nodes, coupling the BS 2500 to other base stations, access routers, AAA server nodes, etc., other networks, and the Internet. Memory 2510 includes routines 2518 and data/information 2520.

Data/information 2520 includes data 2536, tone subset allocation sequence information 2538 including downlink strip-symbol time information 2540 and downlink tone information 2542, and wireless terminal (WT) data/info 2544 including a plurality of sets of WT information: WT 1 info 2546 and WT N info 2560. Each set of WT info, e.g., WT 1 info 2546 includes data 2548, terminal ID 2550, sector ID 2552, uplink channel information 2554, downlink channel information 2556, and mode information 2558.

Routines 2518 include communications routines 2522 and base station control routines 2524. Base station control routines 2524 includes a scheduler module 2526 and signaling routines 2528 including a tone subset allocation routine 2530 for strip-symbol periods, other downlink tone allocation hopping routine 2532 for the rest of symbol periods, e.g., non strip-symbol periods, and a beacon routine 2534.

Data 2536 includes data to be transmitted that will be sent to encoder 2514 of transmitter 2504 for encoding prior to transmission to WTs, and received data from WTs that has been processed through decoder 2512 of receiver 2502 following reception. Downlink strip-symbol time information 2540 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 2542 includes information including a carrier frequency assigned to the base station 2500, the number and frequency of tones, and the set of tone subsets to be allocated to the strip-symbol periods, and other cell and sector specific values such as slope, slope index and sector type.

Data 2548 may include data that WT1 2600 has received from a peer node, data that WT 1 2600 desires to be transmitted to a peer node, and downlink channel quality report feedback information. Terminal ID 2550 is a base station 2500 assigned ID that identifies WT 1 2600. Sector ID 2552 includes information identifying the sector in which WT1 2600 is operating. Sector ID 2552 can be used, for example, to determine the sector type. Uplink channel information 2554 includes information identifying channel segments that have been allocated by scheduler 2526 for WT1 2600 to use, e.g., uplink traffic channel segments for data, dedicated uplink control channels for requests, power control, timing control, etc. Each uplink channel assigned to WT1 2600 includes one or more logical tones, each logical tone following an uplink hopping sequence. Downlink channel information 2556 includes information identifying channel segments that have been allocated by scheduler 2526 to carry data and/or information to WT1 2600, e.g., downlink traffic channel segments for user data. Each downlink channel assigned to WT1 2600 includes one or more logical tones, each following a downlink hopping sequence. Mode information 2558 includes information identifying the state of operation of WT1 2600, e.g. sleep, hold, on.

Communications routines 2522 control the base station 2500 to perform various communications operations and implement various communications protocols. Base station control routines 2524 are used to control the base station 2500 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 2528 controls the operation of receiver 2502 with its decoder 2512 and transmitter 2504 with its encoder 2514. The signaling routine 2528 is responsible for controlling the generation of transmitted data 2536 and control information. Tone subset allocation routine 2530 constructs the tone subset to be used in a strip-symbol period using the method of the aspect and using data/information 2520 including downlink strip-symbol time info 2540 and sector ID 2552. The downlink tone subset allocation sequences will be different for each sector type in a cell and different for adjacent cells. The WTs 2600 receive the signals in the strip-symbol periods in accordance with the downlink tone subset allocation sequences; the base station 2500 uses the same downlink tone subset allocation sequences in order to generate the transmitted signals. Other downlink tone allocation hopping routine 2532 constructs downlink tone hopping sequences, using information including downlink tone information 2542, and downlink channel information 2556, for the symbol periods other than the strip-symbol periods. The downlink data tone hopping sequences are synchronized across the sectors of a cell. Beacon routine 2534 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 26:
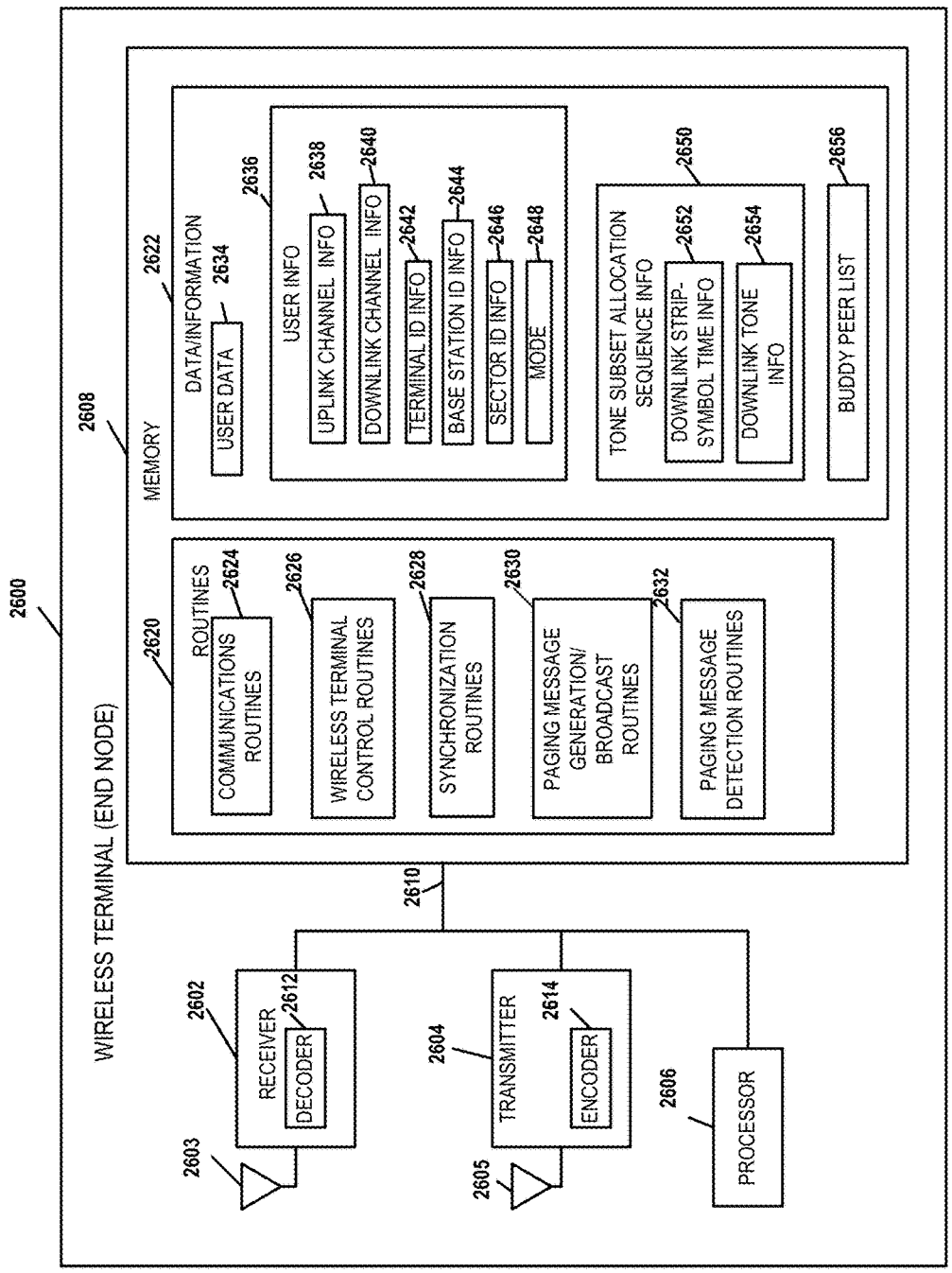
FIG. 26 is an illustration of an example wireless terminal (e.g., mobile device, end node, . . . ) implemented in accordance with various aspects described herein.

FIG. 26 illustrates an example wireless terminal (e.g., end node, mobile device, . . . ) 2600 which can be used as any one of the wireless terminals (e.g., end nodes, mobile devices, . . . ), e.g., EN(1) 2436, of the system 2400 shown in FIG. 24. Wireless terminal 2600 implements the tone subset allocation sequences. Wireless terminal 2600 includes a receiver 2602 including a decoder 2612, a transmitter 2604 including an encoder 2614, a processor 2606, and memory 2608 which are coupled together by a bus 2610 over which the various elements 2602, 2604, 2606, 2608 can interchange data and information. An antenna 2603 used for receiving signals from a base station 2500 (and/or a disparate wireless terminal) is coupled to receiver 2602. An antenna 2605 used for transmitting signals, e.g., to base station 2500 (and/or a disparate wireless terminal) is coupled to transmitter 2604.

The processor 2606 (e.g., a CPU) controls operation of wireless terminal 2600 and implements methods by executing routines 2620 and using data/information 2622 in memory 2608.

Data/information 2622 includes user data 2634, user information 2636, tone subset allocation sequence information 2650, and a buddy peer list 2656. User data 2634 may include data, intended for a peer node, which will be routed to encoder 2614 for encoding prior to transmission by transmitter 2604 to base station 2500, and data received from the base station 2500 which has been processed by the decoder 2612 in receiver 2602. User information 2636 includes uplink channel information 2638, downlink channel information 2640, terminal ID information 2642, base station ID information 2644, sector ID information 2646, and mode information 2648. Uplink channel information 2638 includes information identifying uplink channels segments that have been assigned by base station 2500 for wireless terminal 2600 to use when transmitting to the base station 2500. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 2640 includes information identifying downlink channel segments that have been assigned by base station 2500 to WT 2600 for use when BS 2500 is transmitting data/information to WT 2600. Downlink channels may include downlink traffic channels and assignment channels, each downlink channel including one or more logical tone, each logical tone following a downlink hopping sequence, which is synchronized between each sector of the cell.

User info 2636 also includes terminal ID information 2642, which is a base station 2500 assigned identification, base station ID information 2644 which identifies the specific base station 2500 that WT has established communications with, and sector ID info 2646 which identifies the specific sector of the cell where WT 2500 is presently located. Base station ID 2644 provides a cell slope value and sector ID info 2646 provides a sector index type; the cell slope value and sector index type may be used to derive tone hopping sequences. Mode information 2648 also included in user info 2636 identifies whether the WT 2600 is in sleep mode, hold mode, or on mode.

Tone subset allocation sequence information 2650 includes downlink strip-symbol time information 2652 and downlink tone information 2654. Downlink strip-symbol time information 2652 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 2654 includes information including a carrier frequency assigned to the base station 2500, the number and frequency of tones, and the set of tone subsets to be allocated to the strip-symbol periods, and other cell and sector specific values such as slope, slope index and sector type.

Routines 2620 include communications routines 2624, wireless terminal control routines 2626, synchronization routines 2628, paging message generation/broadcast routines 2630, and paging message detection routines 2632. Communications routines 2624 control the various communications protocols used by WT 2600. For example, communications routines 2624 may enable communicating via a wide area network (e.g., with base station 2500) and/or a local area peer-to-peer network (e.g., directly with disparate wireless terminal(s)). By way of further example, communications routines 2624 may enable receiving a broadcast signal (e.g., from base station 2500). Wireless terminal control routines 2626 control basic wireless terminal 2600 functionality including the control of the receiver 2602 and transmitter 2604. Synchronization routines 2628 control synchronizing wireless terminal 2600 to a received signal (e.g., from base station 2500). Peers within a peer-to-peer network may also be synchronized to the signal. For example, the received signal may be a Beacon, a PN (pseudo random) sequence signal, a pilot signal, etc. Further, the signal may be periodically obtained and a protocol (e.g., associated with synchronization routines 2628) also known to peers may be utilized to identify intervals corresponding to distinct functions (e.g., peer discovery, paging, traffic). Paging message generation/broadcast routines 2630 control creating a message for transmission during an identified peer paging interval. A symbol and/or tone associated with the message may be selected based upon a protocol (e.g., associated with paging message generation/broadcast routines 2630). Moreover, paging message generation/broadcast routines 2630 may control sending the message to peers within the peer-to-peer network. Paging message detection routines 2632 control detection and identification of peers based upon messages received during an identified peer paging interval. Further, paging message detection routines 2632 may identify peers based at least in part upon information retained in buddy peer list 2656.

Figure 27:
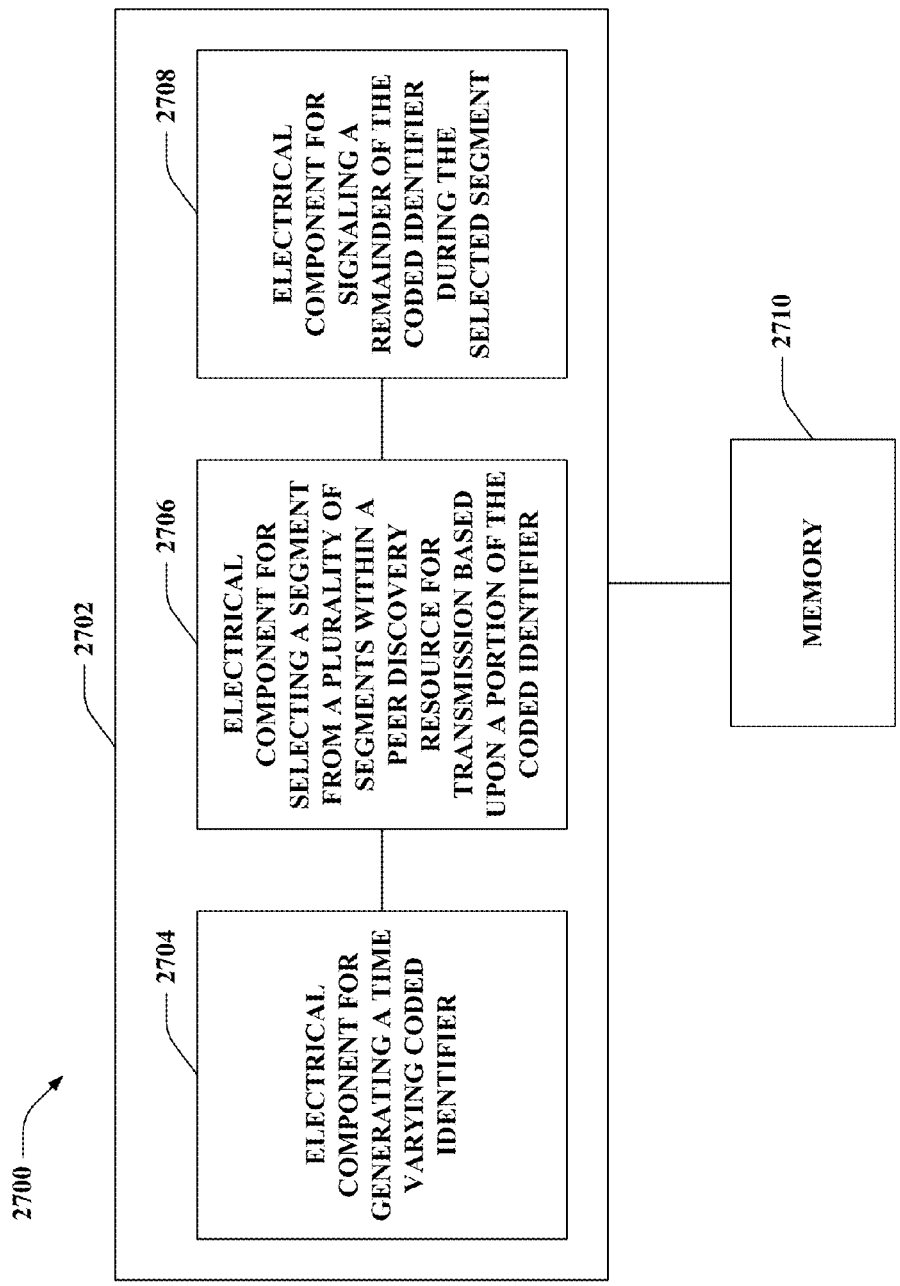
FIG. 27 is an illustration of an example system that enables directly signaling an identifier during peer discovery.

With reference to FIG. 27, illustrated is a system 2700 that enables directly signaling an identifier during peer discovery. For example, system 2700 may reside at least partially within a wireless terminal. It is to be appreciated that system 2700 is represented as including functional blocks, which may be functional blocks that represent functions implemented by a processor, software, or combination thereof (e.g., firmware). System 2700 includes a logical grouping 2702 of electrical components that can act in conjunction. For instance, logical grouping 2702 may include an electrical component for generating a time varying coded identifier 2704. Further, logical grouping 2702 may comprise an electrical component for selecting a segment from a plurality of segments within a peer discovery resource for transmission based upon a portion of the coded identifier 2706. Moreover, logical grouping 2702 may include an electrical component for signaling a remainder of the coded identifier during the selected segment 2708. Additionally, system 2700 may include a memory 2710 that retains instructions for executing functions associated with electrical components 2704, 2706, and 2708. While shown as being external to memory 2710, it is to be understood that one or more of electrical components 2704, 2706, and 2708 may exist within memory 2710.

Figure 28:
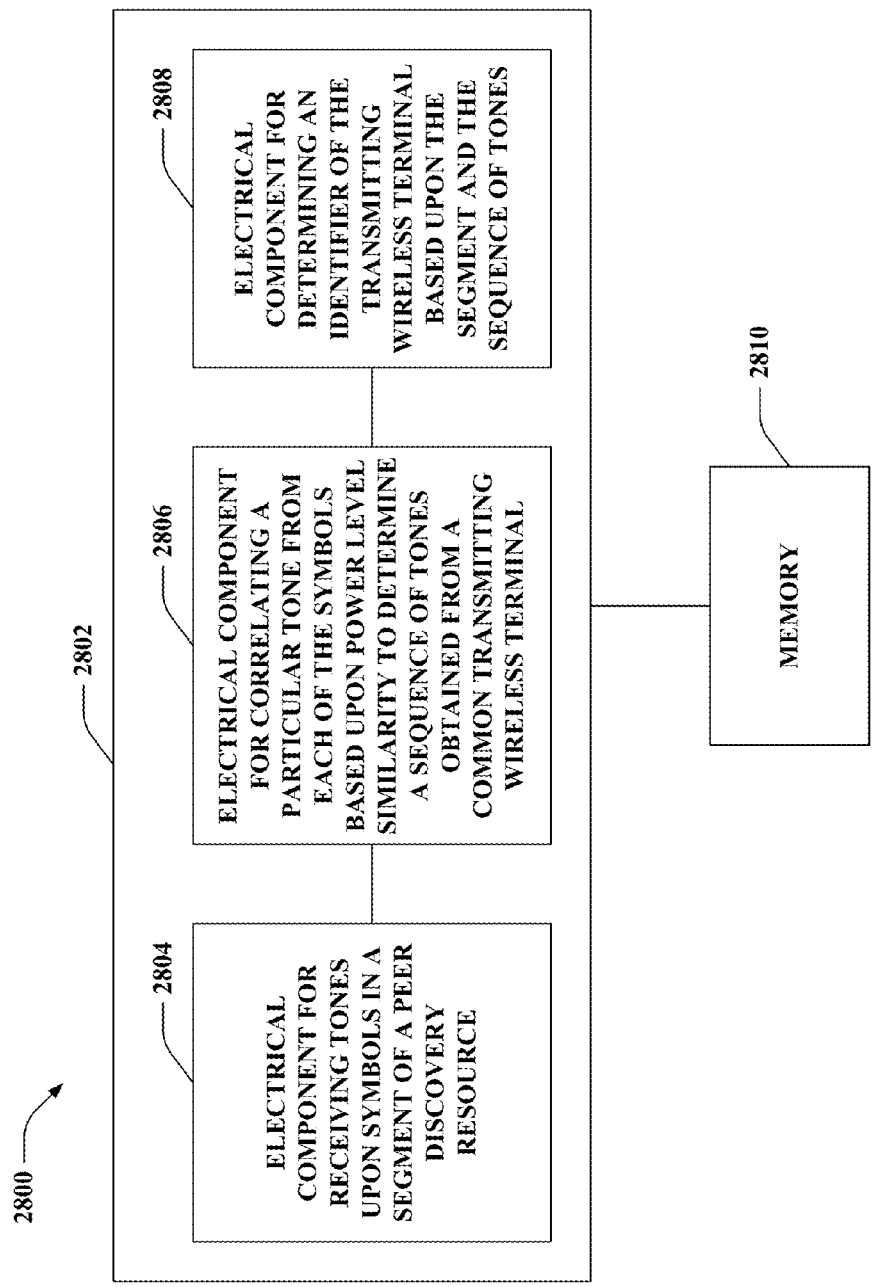
FIG. 28 is an illustration of an example system that enables decoding a directly signaled identifier during peer discovery.

With reference to FIG. 28, illustrated is a system 2800 that enables decoding a directly signaled identifier during peer discovery. For example, system 2800 may reside at least partially within a wireless terminal. It is to be appreciated that system 2800 is represented as including functional blocks, which may be functional blocks that represent functions implemented by a processor, software, or combination thereof (e.g., firmware). System 2800 includes a logical grouping 2802 of electrical components that can act in conjunction. For instance, logical grouping 2802 may include an electrical component for receiving tones upon symbols in a segment of a peer discovery resource 2804. Further, logical grouping 2802 may comprise an electrical component for correlating a particular tone from each of the symbols based upon power level similarity to determine a sequence of tones obtained from a common transmitting wireless terminal 2806. Moreover, logical grouping 2802 may include an electrical component for determining an identifier of the transmitting wireless terminal based upon the segment and the sequence of tones 2808. Additionally, system 2800 may include a memory 2810 that retains instructions for executing functions associated with electrical components 2804, 2806, and 2808. While shown as being external to memory 2810, it is to be understood that one or more of electrical components 2804, 2806, and 2808 may exist within memory 2810.

Figure 29:
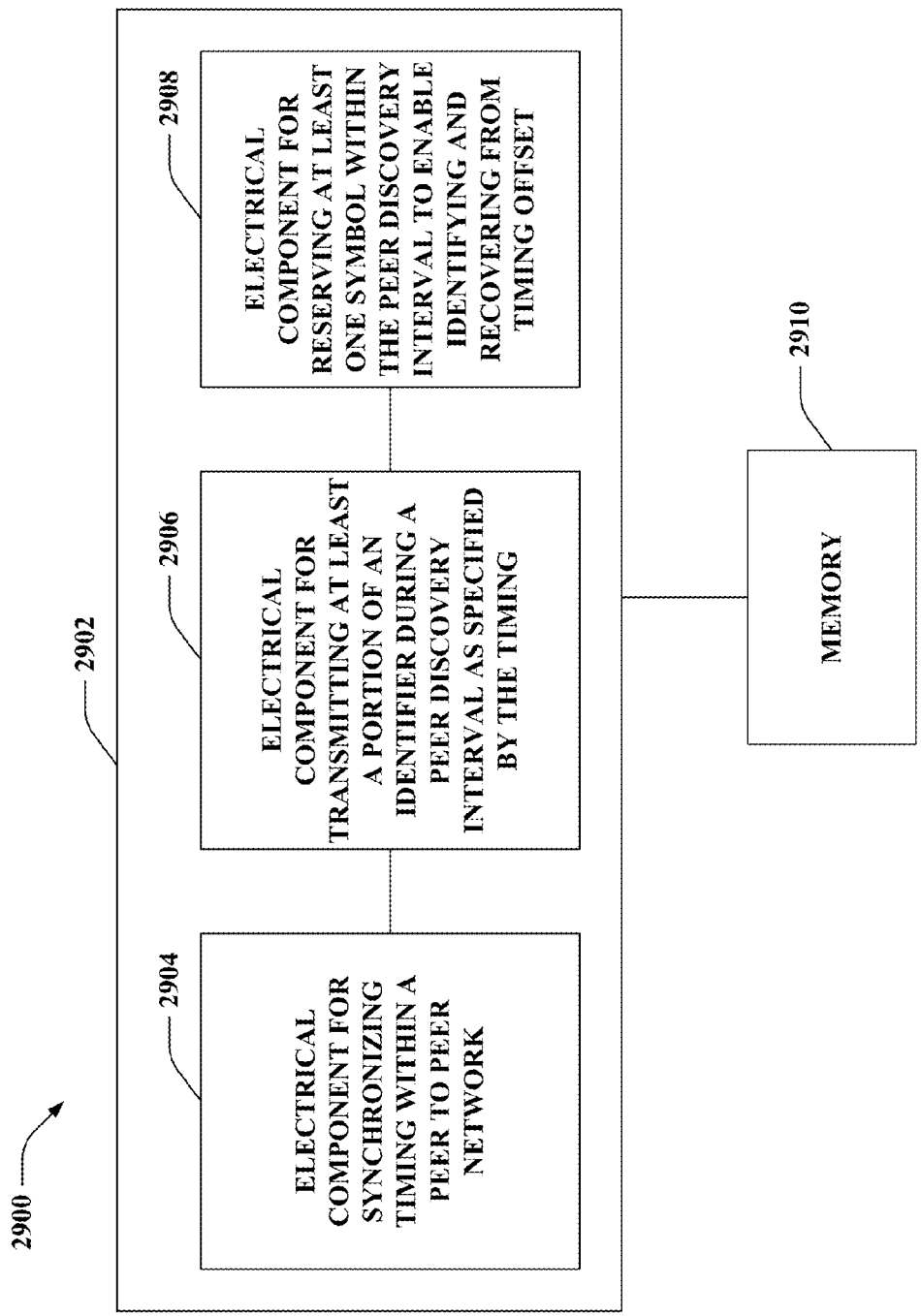
FIG. 29 is an illustration of an example system that enables incorporating reserved symbols within a peer discovery interval.

With reference to FIG. 29, illustrated is a system 2900 that enables incorporating reserved symbols within a peer discovery interval. For example, system 2900 may reside at least partially within a wireless terminal. It is to be appreciated that system 2900 is represented as including functional blocks, which may be functional blocks that represent functions implemented by a processor, software, or combination thereof (e.g., firmware). System 2900 includes a logical grouping 2902 of electrical components that can act in conjunction. For instance, logical grouping 2902 may include an electrical component for synchronizing timing within a peer to peer network 2904. Further, logical grouping 2902 may comprise an electrical component for transmitting at least a portion of an identifier during a peer discovery interval as specified by the timing 2906. Moreover, logical grouping 2902 may include an electrical component for reserving at least one symbol within the peer discovery interval to enable identifying and recovering from timing offset 2908. Additionally, system 2900 may include a memory 2910 that retains instructions for executing functions associated with electrical components 2904, 2906, and 2908. While shown as being external to memory 2910, it is to be understood that one or more of electrical components 2904, 2906, and 2908 may exist within memory 2910.

Figure 30:
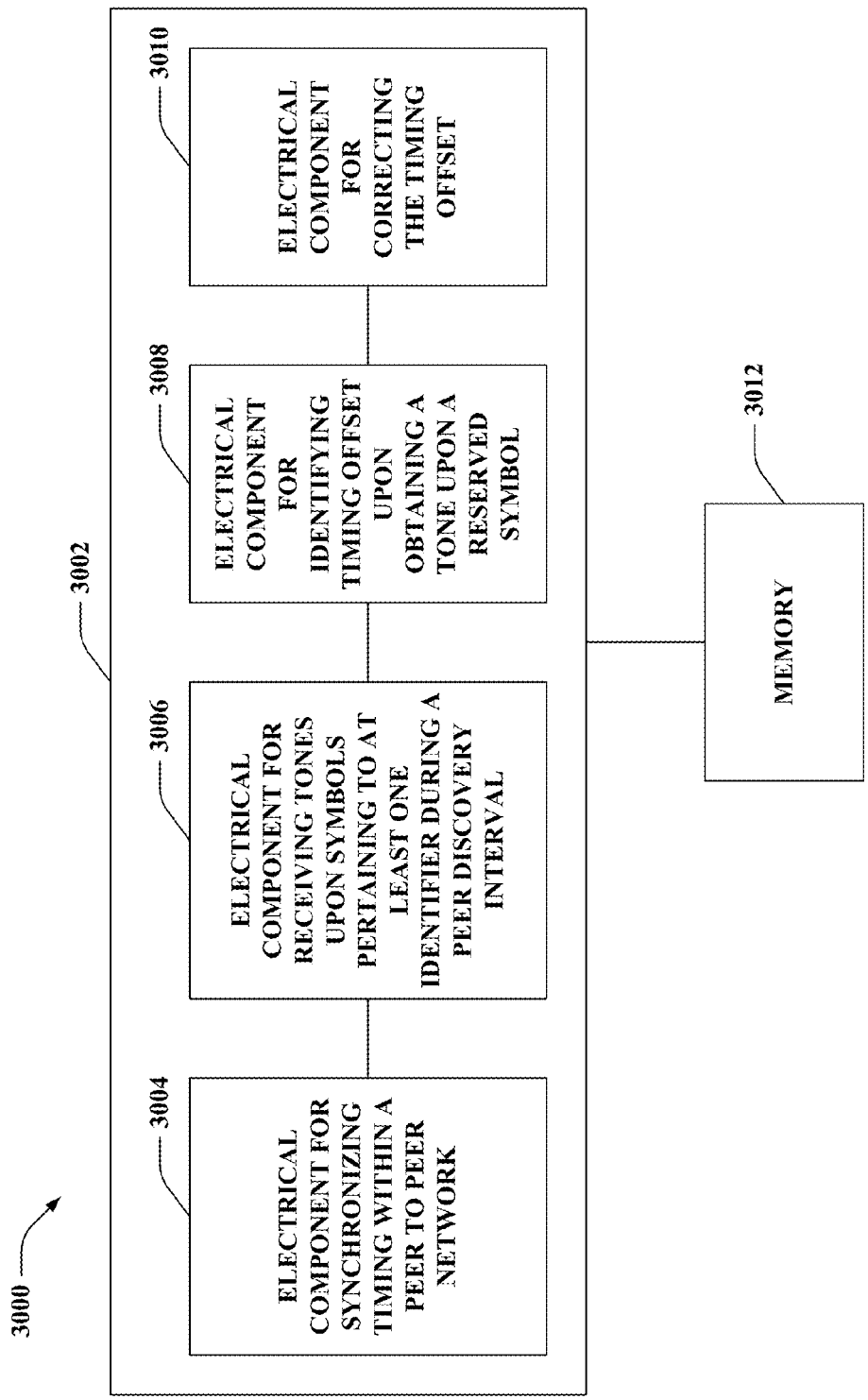
FIG. 30 is an illustration of an example system that enables shifting timing to mitigate offset within peer discovery.

With reference to FIG. 30, illustrated is a system 3000 that enables shifting timing to mitigate offset within peer discovery. For example, system 3000 may reside at least partially within a wireless terminal. It is to be appreciated that system 3000 is represented as including functional blocks, which may be functional blocks that represent functions implemented by a processor, software, or combination thereof (e.g., firmware). System 3000 includes a logical grouping 3002 of electrical components that can act in conjunction. For instance, logical grouping 3002 may include an electrical component for synchronizing timing within a peer to peer network 3004. Further, logical grouping 3002 may comprise an electrical component for receiving tones upon symbols pertaining to at least one identifier during a peer discovery interval 3006. Moreover, logical grouping 3002 may include an electrical component for identifying timing offset upon obtaining a tone upon a reserved symbol 3008. Logical grouping 3002 may also include an electrical component for correcting the timing offset 3010. Additionally, system 3000 may include a memory 3012 that retains instructions for executing functions associated with electrical components 3004, 3006, 3008, and 3010. While shown as being external to memory 3012, it is to be understood that one or more of electrical components 3004, 3006, 3008, and 3010 may exist within memory 3012.

Figure 31:
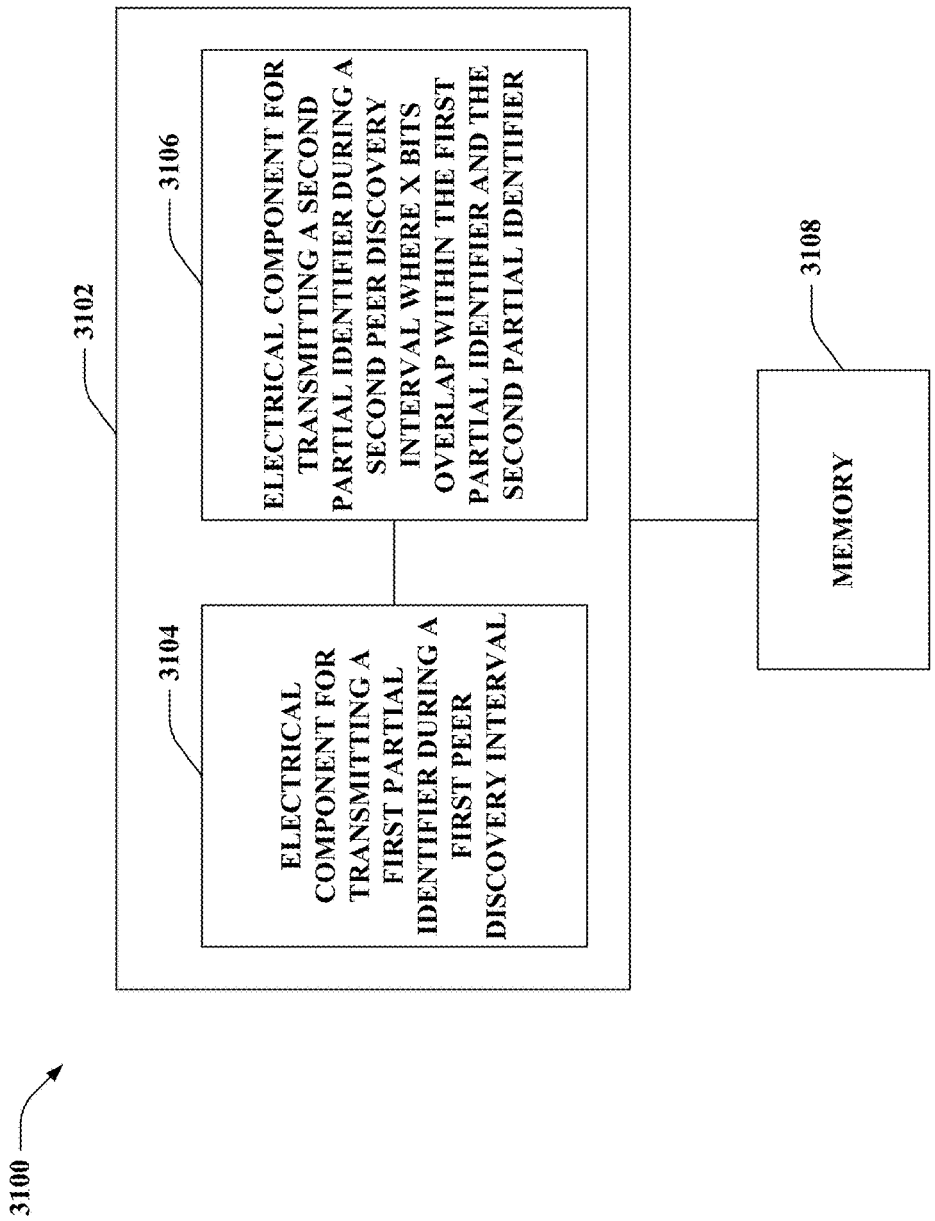
FIG. 31 is an illustration of an example system that enables signaling an identifier over a plurality of peer discovery intervals.

With reference to FIG. 31, illustrated is a system 3100 that enables signaling an identifier over a plurality of peer discovery intervals. For example, system 3100 may reside at least partially within a wireless terminal. It is to be appreciated that system 3100 is represented as including functional blocks, which may be functional blocks that represent functions implemented by a processor, software, or combination thereof (e.g., firmware). System 3100 includes a logical grouping 3102 of electrical components that can act in conjunction. For instance, logical grouping 3102 may include an electrical component for transmitting a first partial identifier during a peer discovery interval 3104. Further, logical grouping 3102 may comprise an electrical component for transmitting a second partial identifier during a second peer discovery interval where X bits overlap within the first partial identifier and the second partial identifier 3106. Additionally, system 3100 may include a memory 3108 that retains instructions for executing functions associated with electrical components 3104 and 3106. While shown as being external to memory 3108, it is to be understood that one or more of electrical components 3104 and 3106 may exist within memory 3108.

Figure 32:
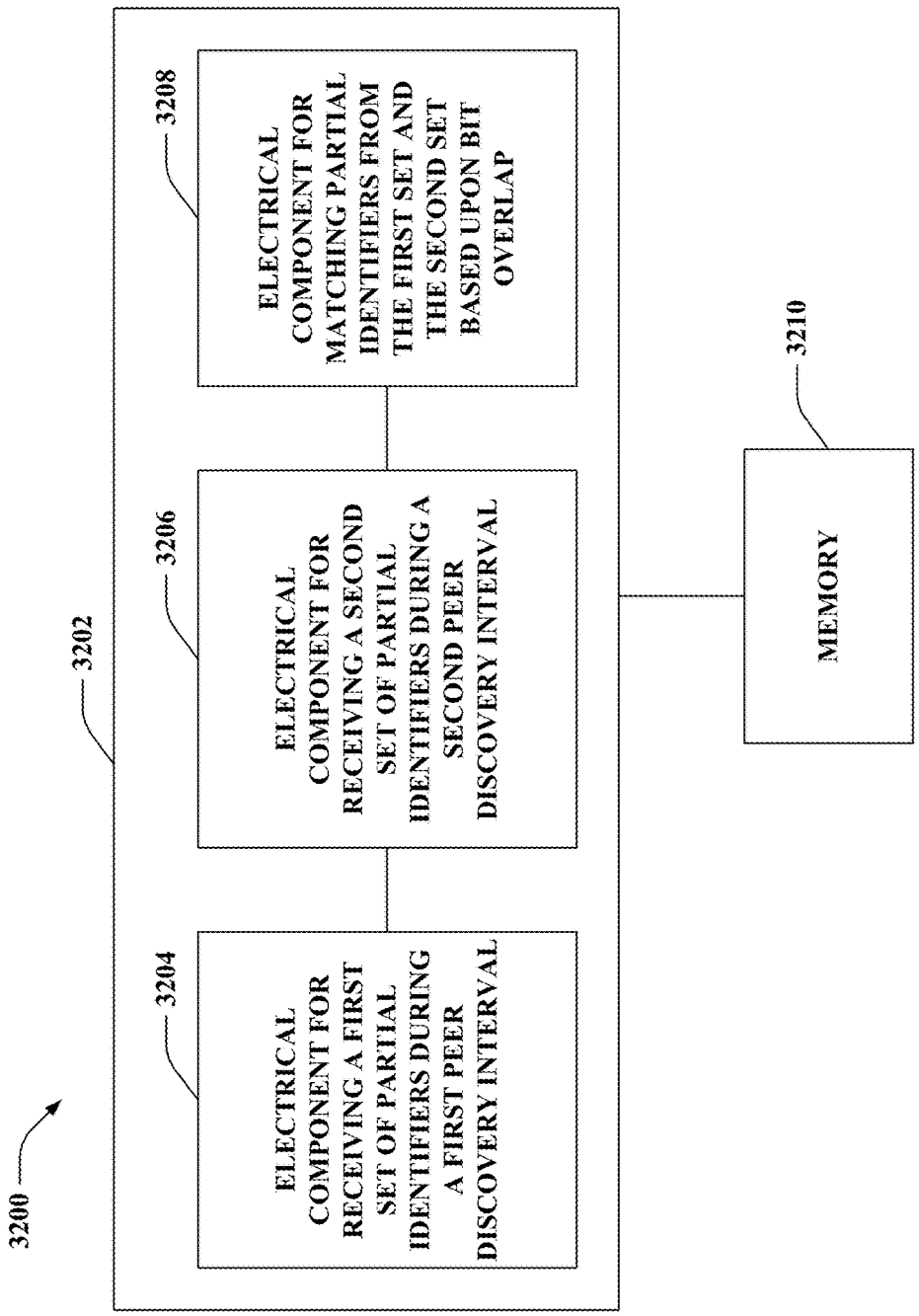
FIG. 32 is an illustration of an example system that enables linking partial identifiers obtained during differing peer discovery intervals based upon overlapping information.

With reference to FIG. 32, illustrated is a system 3200 that enables linking partial identifiers obtained during differing peer discovery intervals based upon overlapping information. For example, system 3200 may reside at least partially within a wireless terminal. It is to be appreciated that system 3200 is represented as including functional blocks, which may be functional blocks that represent functions implemented by a processor, software, or combination thereof (e.g., firmware). System 3200 includes a logical grouping 3202 of electrical components that can act in conjunction. For instance, logical grouping 3202 may include an electrical component for receiving a first set of partial identifiers during a first peer discovery interval 3204. Further, logical grouping 3202 may comprise an electrical component for receiving a second set of partial identifiers during a second peer discovery interval 3206. Moreover, logical grouping 3202 may include an electrical component for matching partial identifiers from the first set and the second set based upon bit overlap 3208. Additionally, system 3200 may include a memory 3210 that retains instructions for executing functions associated with electrical components 3204, 3206, and 3208. While shown as being external to memory 3210, it is to be understood that one or more of electrical components 3204, 3206, and 3208 may exist within memory 3210.

Figure 33:
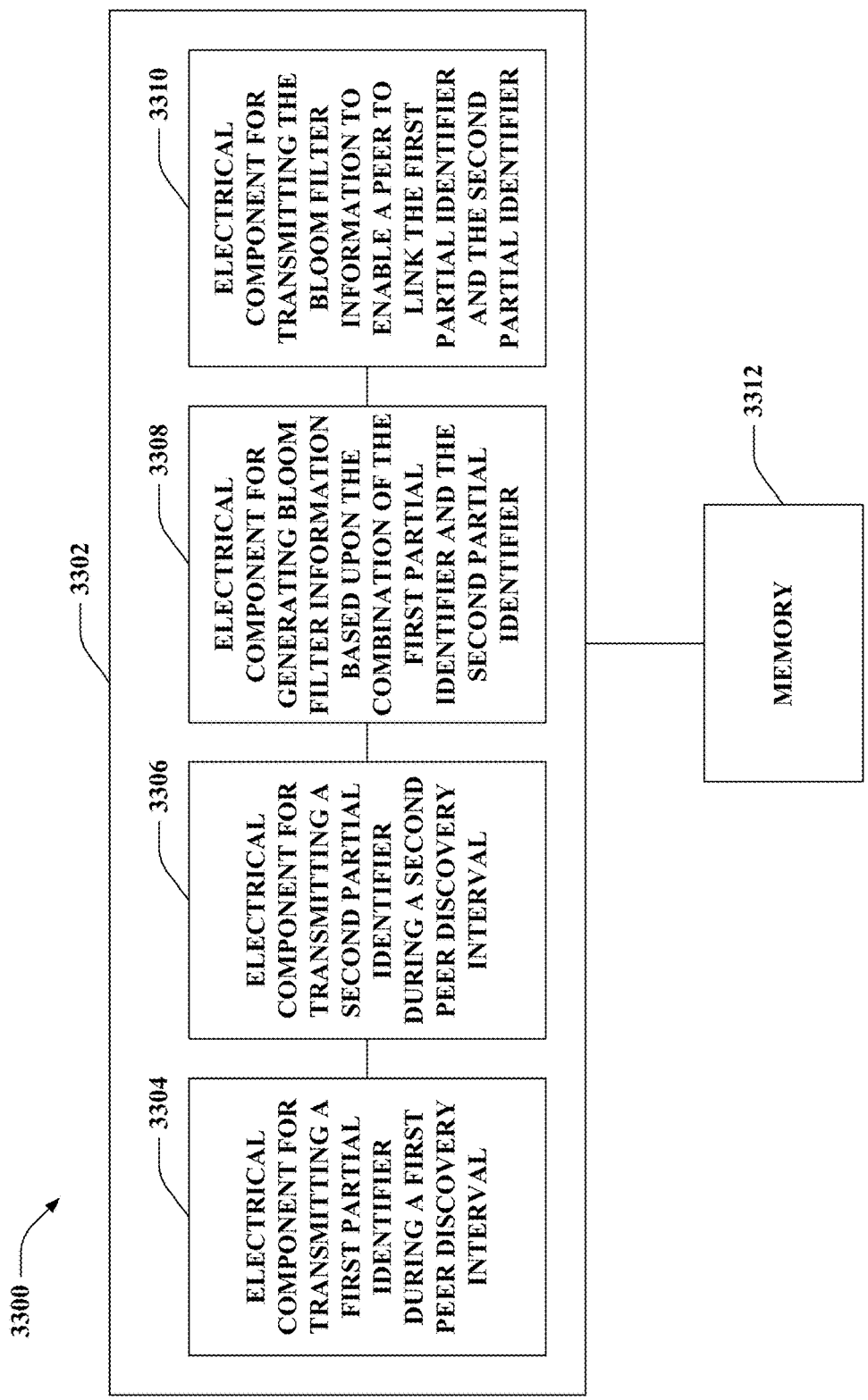
FIG. 33 is an illustration of an example system that enables employing a bloom filter while signaling partial identifiers for peer discovery.

With reference to FIG. 33, illustrated is a system 3300 that enables employing a bloom filter while signaling partial identifiers for peer discovery. For example, system 3300 may reside at least partially within a wireless terminal. It is to be appreciated that system 3300 is represented as including functional blocks, which may be functional blocks that represent functions implemented by a processor, software, or combination thereof (e.g., firmware). System 3300 includes a logical grouping 3302 of electrical components that can act in conjunction. For instance, logical grouping 3302 may include an electrical component for transmitting a first partial identifier during a first peer discovery interval 3304. Further, logical grouping 3302 may comprise an electrical component for transmitting a second partial identifier during a second peer discovery interval 3306. Moreover, logical grouping 3302 may include an electrical component for generating bloom filter information based upon the combination of the first partial identifier and the second partial identifier 3308. Logical grouping 3302 may also include an electrical component for transmitting the bloom filter information to enable a peer to link the first partial identifier and the second partial identifier 3310. Additionally, system 3300 may include a memory 3312 that retains instructions for executing functions associated with electrical components 3304, 3306, 3308, and 3310. While shown as being external to memory 3312, it is to be understood that one or more of electrical components 3304, 3306, 3308, and 3310 may exist within memory 3312.

Figure 34:
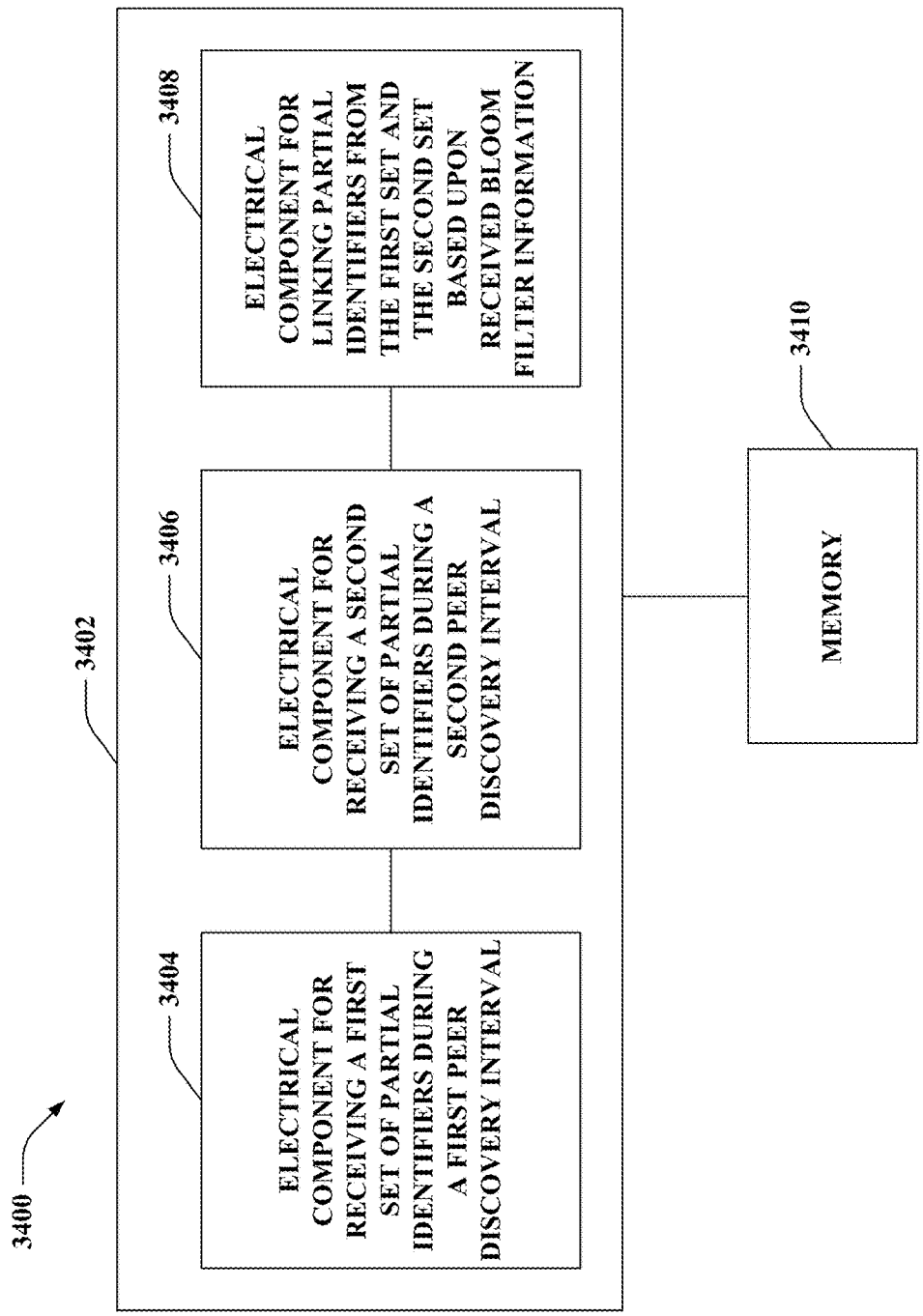
FIG. 34 is an illustration of an example system that enables employing a bloom filter to match partial identifiers.

With reference to FIG. 34, illustrated is a system 3400 that enables employing a bloom filter to match partial identifiers. For example, system 3400 may reside at least partially within a wireless terminal. It is to be appreciated that system 3400 is represented as including functional blocks, which may be functional blocks that represent functions implemented by a processor, software, or combination thereof (e.g., firmware). System 3400 includes a logical grouping 3402 of electrical components that can act in conjunction. For instance, logical grouping 3402 may include an electrical component for receiving a first set of partial identifiers during a first peer discovery interval 3404. Further, logical grouping 3402 may comprise an electrical component for receiving a second set of partial identifiers during a second peer discovery interval 3406. Moreover, logical grouping 3402 may include an electrical component for linking partial identifiers from the first set and the second set based upon received bloom filter information 3408. Additionally, system 3400 may include a memory 3410 that retains instructions for executing functions associated with electrical components 3404, 3406, and 3408. While shown as being external to memory 3410, it is to be understood that one or more of electrical components 3404, 3406, and 3408 may exist within memory 3410.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates linking partial identifiers obtained during differing peer discovery intervals based upon overlapping information, comprising:
   wirelessly receiving, at a first wireless terminal, a first set of partial identifiers in a first wireless transmission directly from a second wireless terminal during a first peer discovery interval;
   wirelessly receiving, at the first wireless terminal, a second set of partial identifiers in a second wireless transmission directly from the second wireless terminal, during a second peer discovery interval; and
   matching partial identifiers from the first set and the second set based upon bit overlap in order to identify at least the second wireless terminal within direct transmission range of the first wireless terminal, such that the first wireless terminal can wirelessly transmit directly to the second wireless terminal and linking additional partial identifiers from disparate sets related to differing peer discovery intervals to form a complete identifier of a transmitting wireless terminal,
   wherein a peer discovery interval is a specified time interval during which wireless terminals capable of direct peer-to-peer wireless communication detect each other using direct wireless communication.

2. The method of claim 1, wherein the first peer discovery interval and the second peer discovery interval are adjacent peer discovery intervals.

3. The method of claim 1, matching the partial identifiers further comprises evaluating a constraint applied to the partial identifiers.

4. The method of claim 1, wherein the constraint is a linear constraint.

5. The method of claim 1, further comprising linking a particular partial identifier from the first set with a corresponding partial identifier from the second set when a last X bits of the particular identifier match a first X bits of the corresponding partial identifier.

6. The method of claim 1, further comprising evaluating received bloom filter information to verify linking of the partial identifiers from the first set and the second set.

7. A wireless communications apparatus, comprising:
   a memory that retains instructions related to wirelessly receiving, at a first wireless terminal, a first set of partial identifiers in a first wireless transmission directly from a second wireless terminal during a first peer discovery interval, wirelessly receiving, at the first wireless terminal, a second set of partial identifiers in a second wireless transmission directly from the second wireless terminal during a second peer discovery interval, and matching partial identifiers from the first set and the second set based upon bit overlap in order to identify at least the second wireless terminal within direct transmission range of the first wireless terminal, such that the first wireless terminal can wirelessly transmit directly to the second wireless terminal and linking additional partial identifiers from disparate sets related to differing peer discovery intervals to form a complete identifier of a transmitting wireless terminal, wherein a peer discovery interval is a specified time interval during which wireless terminals capable of direct peer-to-peer wireless communication detect each other using direct wireless communication; and at least one processor, coupled to the memory, configured to execute the instructions retained in the memory.

8. The wireless communications apparatus of claim 7, wherein the first peer discovery interval and the second peer discovery interval are adjacent peer discovery intervals.

9. The wireless communications apparatus of claim 7, wherein the memory further retains instructions for matching the partial identifiers further comprises evaluating a constraint applied to the partial identifiers.

10. The wireless communications apparatus of claim 9, wherein the constraint is a linear constraint.

11. The wireless communications apparatus of claim 7, wherein the memory further retains instructions for linking a particular partial identifier from the first set with a corresponding partial identifier from the second set when a last X bits of the particular identifier match a first X bits of the corresponding partial identifier.

12. The wireless communications apparatus of claim 7, wherein the memory further retains instructions for evaluating received bloom filter information to verify linking of the partial identifiers from the first set and the second set.

13. A wireless communications apparatus that enables linking partial identifiers obtained during differing peer discovery intervals based upon overlapping information, comprising:

means for wirelessly receiving, at a first wireless terminal, a first set of partial identifiers in a first wireless transmission directly from a second wireless terminal during a first peer discovery interval;

means for wirelessly receiving, at the first wireless terminal, a second set of partial identifiers in a second wireless transmission directly from the second wireless terminal during a second peer discovery interval; and means for matching partial identifiers from the first set and the second set based upon bit overlap in order to identify at least the second wireless terminal within direct transmission range of the first wireless terminal, such that the first wireless terminal can wirelessly transmit directly to the second wireless terminal and means for linking additional partial identifiers from disparate sets related to differing peer discovery intervals to form a complete identifier of a transmitting wireless terminal, wherein a peer discovery interval is a specified time interval during which wireless terminals capable of direct peer-to-peer wireless communication detect each other using direct wireless communication.

14. The wireless communications apparatus of claim 13, wherein the first peer discovery interval and the second peer discovery interval are adjacent peer discovery intervals.

15. The wireless communications apparatus of claim 13, further comprising means for matching the partial identifiers further comprises evaluating a constraint applied to the partial identifiers.

16. The wireless communications apparatus of claim 15, wherein the constraint is a linear constraint.

17. The wireless communications apparatus of claim 13, further comprising means for linking a particular partial identifier from the first set with a corresponding partial identifier from the second set when a last X bits of the particular identifier match a first X bits of the corresponding partial identifier.

18. The wireless communications apparatus of claim 13, further comprising means for evaluating received bloom filter information to verify linking of the partial identifiers from the first set and the second set.

19. A non-transitory computer-readable medium storing computer-executable code, comprising code to:

wirelessly receive, at a first wireless terminal, a first set of partial identifiers in a first wireless transmission directly from a second wireless terminal during a first peer discovery interval;

wirelessly receive, at the first wireless terminal, a second set of partial identifiers in a second wireless transmission directly from the second wireless terminal during a second peer discovery interval; and match partial identifiers from the first set and the second set based upon bit overlap in order to identify at least the second wireless terminal within direct transmission range of the first wireless terminal, such that the first wireless terminal can wirelessly transmit directly to the second wireless terminal and link additional partial identifiers from disparate sets related to differing peer discovery intervals to form a complete identifier of a transmitting wireless terminal, wherein a peer discovery interval is a specified time interval during which wireless terminals capable of direct peer-to-peer wireless communication detect each other using direct wireless communication.

20. The computer-readable medium of claim 19, wherein the first peer discovery interval and the second peer discovery interval are adjacent peer discovery intervals.

21. The computer-readable medium of claim 19, the partial identifiers further comprises evaluating a constraint applied to the partial identifiers.

22. The computer-readable medium of claim 21, wherein the constraint is a linear constraint.

23. The computer-readable medium of claim 19, further comprising code to link a particular partial identifier from the first set with a corresponding partial identifier from the second set when a last X bits of the particular identifier match a first X bits of the corresponding partial identifier.

24. The computer-readable medium of claim 19, further comprising code to evaluate received bloom filter information to verify linking of the partial identifiers from the first set and the second set.

25. In a wireless communication system, an apparatus comprising:

at least one processor configured to:

wirelessly receive, at a first wireless terminal, a first set of partial identifiers in a first wireless transmission directly from a second wireless terminal during a first peer discovery interval;

wirelessly receive, at the first wireless terminal, a second set of partial identifiers in a second wireless transmission directly from the second wireless terminal during a second peer discovery interval; and match partial identifiers from the first set and the second set based upon bit overlap in order to identify at least the second wireless terminal within direct transmission range of the first wireless terminal, such that the first wireless terminal can wirelessly transmit directly to the second wireless terminal and link additional partial identifiers from disparate sets related to differing peer discovery intervals to form a complete identifier of a transmitting wireless terminal, wherein a peer discovery interval is a specified time interval during which wireless terminals capable of direct peer-to-peer wireless communication detect each other using direct wireless communication.

26. The method of claim 1, further comprising:

transmitting a response from the first wireless terminal to the transmission of the first partial identifier and the second partial identifier; and establishing a peer-to-peer link between the first wireless terminal and the second wireless terminal based on the response, wherein the peer-to-peer link involves direct wireless transmission between the first wireless terminal and the second wireless terminal.

27. The method of claim 1, wherein receiving the first partial identifier and the second partial identifier comprises receiving a wireless broadcast of the first partial identifier and the second partial identifier from the second wireless terminal.

28. The method of claim 1, wherein the peer discovery interval is a specified time interval during which the first wireless terminal monitors for a wireless signal transmitted directly from another wireless terminal capable of direct peer-to-peer wireless communication with the first wireless terminal without traversing a base station.

* * * * *